United States Patent
Hagiwara

(10) Patent No.: US 11,928,794 B2
(45) Date of Patent: Mar. 12, 2024

(54) IMAGE PROCESSING DEVICE, IMAGE PROCESSING PROGRAM, IMAGE PROCESSING METHOD, AND IMAGING DEVICE

(71) Applicant: NIKON CORPORATION, Tokyo (JP)

(72) Inventor: Tsuneyuki Hagiwara, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 361 days.

(21) Appl. No.: 17/353,539

(22) Filed: Jun. 21, 2021

(65) Prior Publication Data

US 2021/0312596 A1 Oct. 7, 2021

Related U.S. Application Data

(63) Continuation of application No. PCT/JP2019/023772, filed on Jun. 14, 2019.

(30) Foreign Application Priority Data

Dec. 18, 2018 (JP) ................. 2018-236689

(51) Int. Cl.
*G06T 5/00* (2006.01)
*G06T 3/20* (2006.01)
*G06T 3/60* (2006.01)
*G06T 5/50* (2006.01)
*G06T 7/571* (2017.01)
(Continued)

(52) U.S. Cl.
CPC ............ *G06T 5/002* (2013.01); *G06T 3/20* (2013.01); *G06T 3/60* (2013.01); *G06T 5/003* (2013.01); *G06T 5/50* (2013.01); *G06T 7/571* (2017.01); *H04N 13/156* (2018.05); *H04N 23/676* (2023.01); *G06T 2207/10024* (2013.01);
(Continued)

(58) Field of Classification Search
CPC .. G06T 5/002; G06T 3/20; G06T 3/60; G06T 5/003; G06T 5/50; G06T 7/571; G06T 2207/10024; G06T 2207/10148; G06T 2207/20221; G06T 2207/10056; H04N 13/156; H04N 23/676; H04N 13/261; H04N 23/80; H04N 13/117; H04N 13/211; H04N 13/239
See application file for complete search history.

(56) References Cited

U.S. PATENT DOCUMENTS 6,571,023 B1 * 5/2003 Aizawa ................. H04N 13/236
348/E5.045

OTHER PUBLICATIONS

Sep. 3, 2019 Search Report issued in International Patent Application No. PCT/JP2019/023772.

* cited by examiner

*Primary Examiner* — Girumsew Wendmagegn

(74) *Attorney, Agent, or Firm* — Oliff PLC

(57) ABSTRACT

An image processing device includes a first processing unit which executes blurring processing in a common focus position on each of plural images in mutually different focus positions, an integration unit which generates an integrated image resulting from integration of the plural images on which the blurring processing is executed, and a second processing unit which generates a composite image having a predetermined blur degree by executing sharpening processing on the integrated image generated by the integration unit based on information in which optical information indicating optical characteristics of an optical system in which the plural images are acquired and a blur degree of the blurring processing in the common focus position are composited together along a depth direction of the plural image.

20 Claims, 31 Drawing Sheets

(51) Int. Cl.
*H04N 13/156* (2018.01)
*H04N 23/67* (2023.01)
(52) U.S. Cl.
CPC ............... *G06T 2207/10148* (2013.01); *G06T 2207/20221* (2013.01)

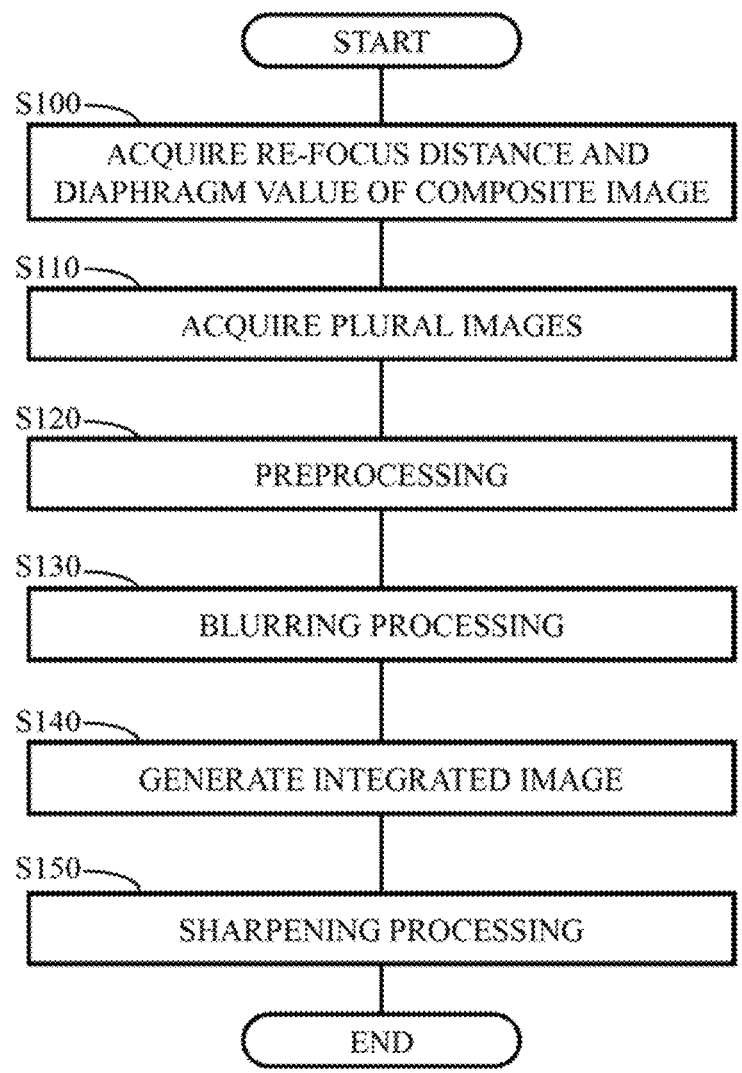

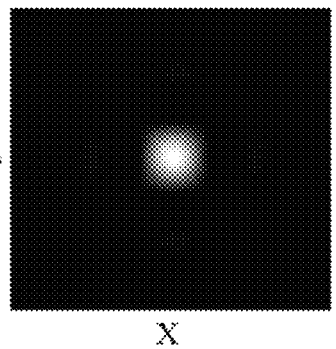
FIG. 9A
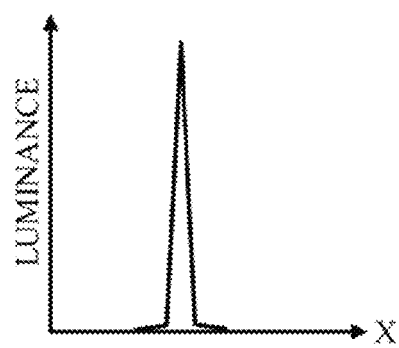
FIG. 9B
FIG. 9C 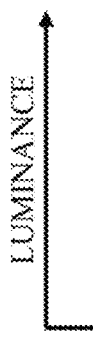 FIG. 9D  FIG. 9E 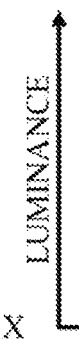
FIG. 9F
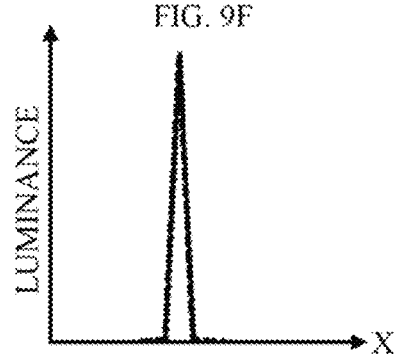

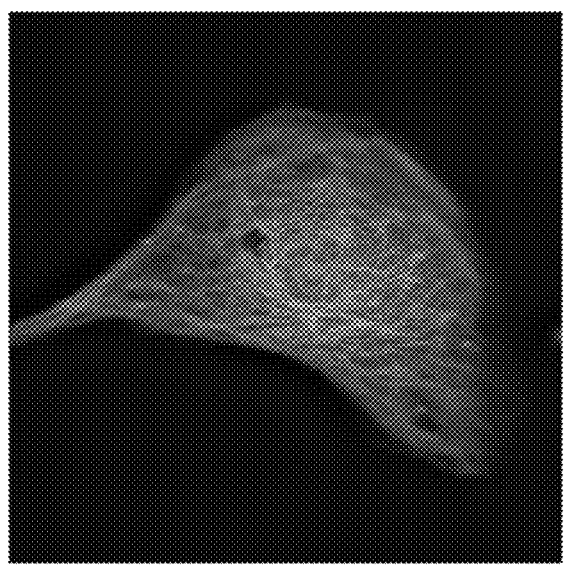 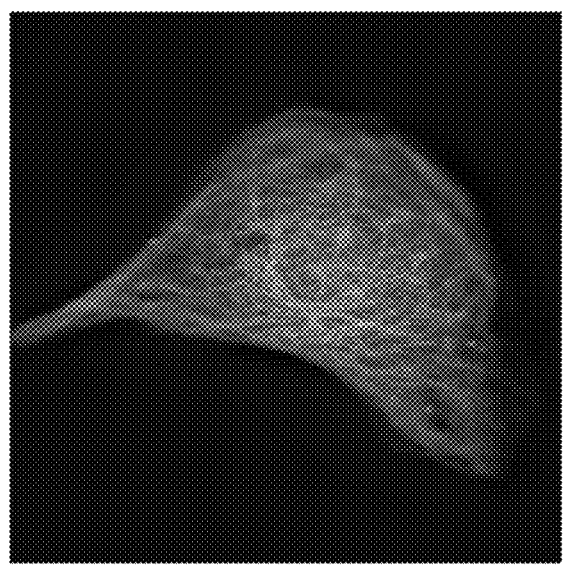
FIG. 14A                     FIG. 14B

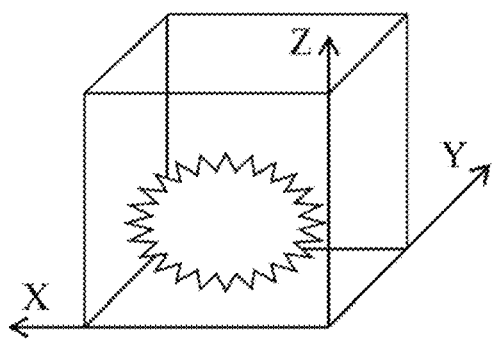
FIG. 20A  OBJECT RECTANGULAR CUBOID DATA
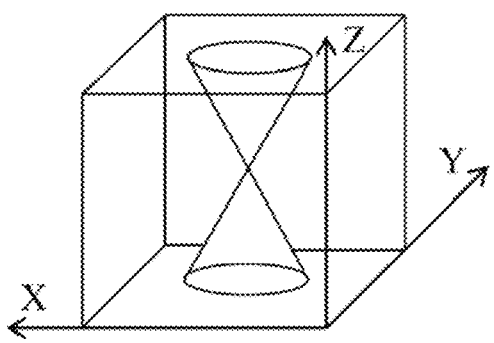
FIG. 20B  ARBITRARY BLURRING FUNCTION XY
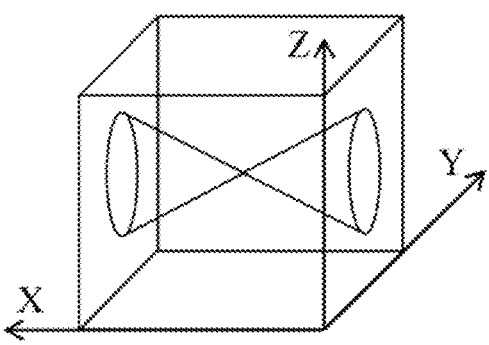
FIG. 20C  ARBITRARY BLURRING FUNCTION YZ
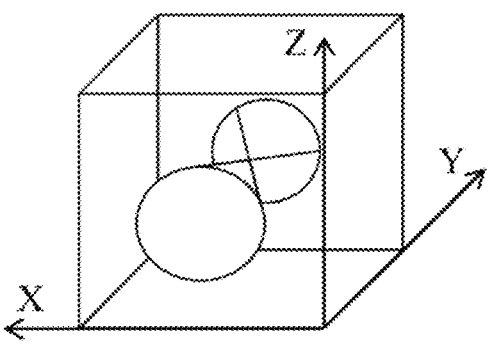
FIG. 20D  ARBITRARY BLURRING FUNCTION XZ

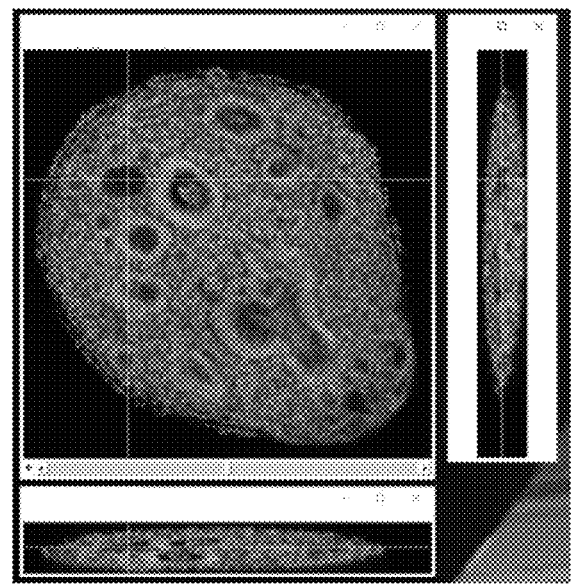
FIG. 21A  ORIGINAL IMAGE
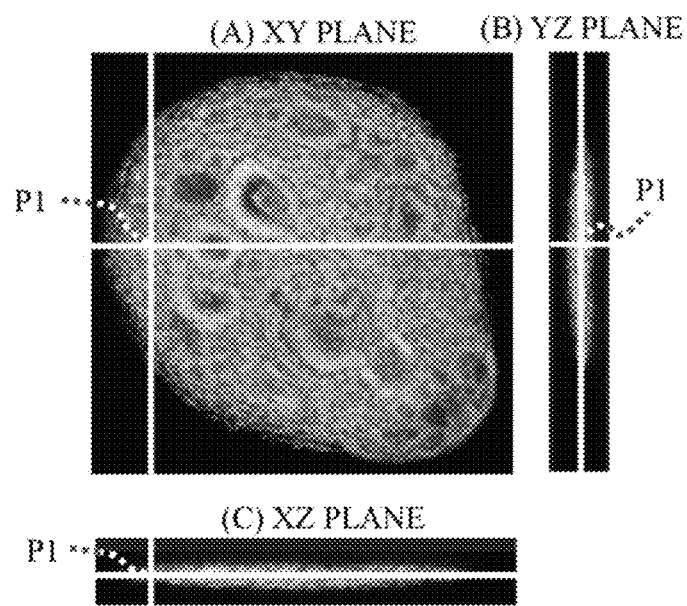
FIG. 21B  COMPOSITE IMAGE (CF_NA0.1)

OBJECT RECTANGULAR CUBOID DATA

PSF RECTANGULAR CUBOID DATA

ROTATED OBJECT
RECTANGULAR CUBOID DATA

ROTATED PSF
RECTANGULAR CUBOID DATA

ENLARGE FOCUS DEPTH
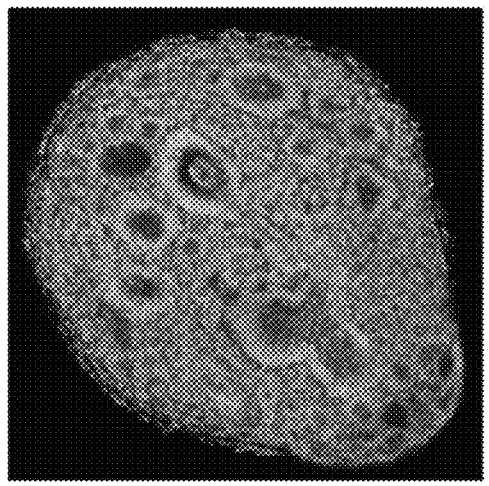 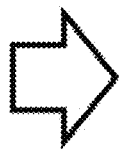 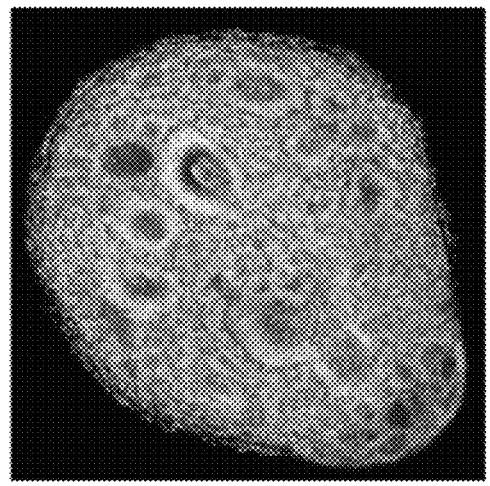
FIG. 24A
ORIGINAL IMAGE
FIG. 24B
IMAGE GENERATED AT CF_NA0.1
(IMAGE WITHOUT PARALLAX)

CF_NA0.1 IMAGE WITHOUT PARALLAX

CF_NA0.1 LEFT-EYE IMAGE

CF_NA0.1 RIGHT-EYE IMAGE

Conv_NA0.1 IMAGE WITHOUT PARALLAX

Conv_NA0.1 LEFT-EYE IMAGE

Conv_NA0.1 RIGHT-EYE IMAGE

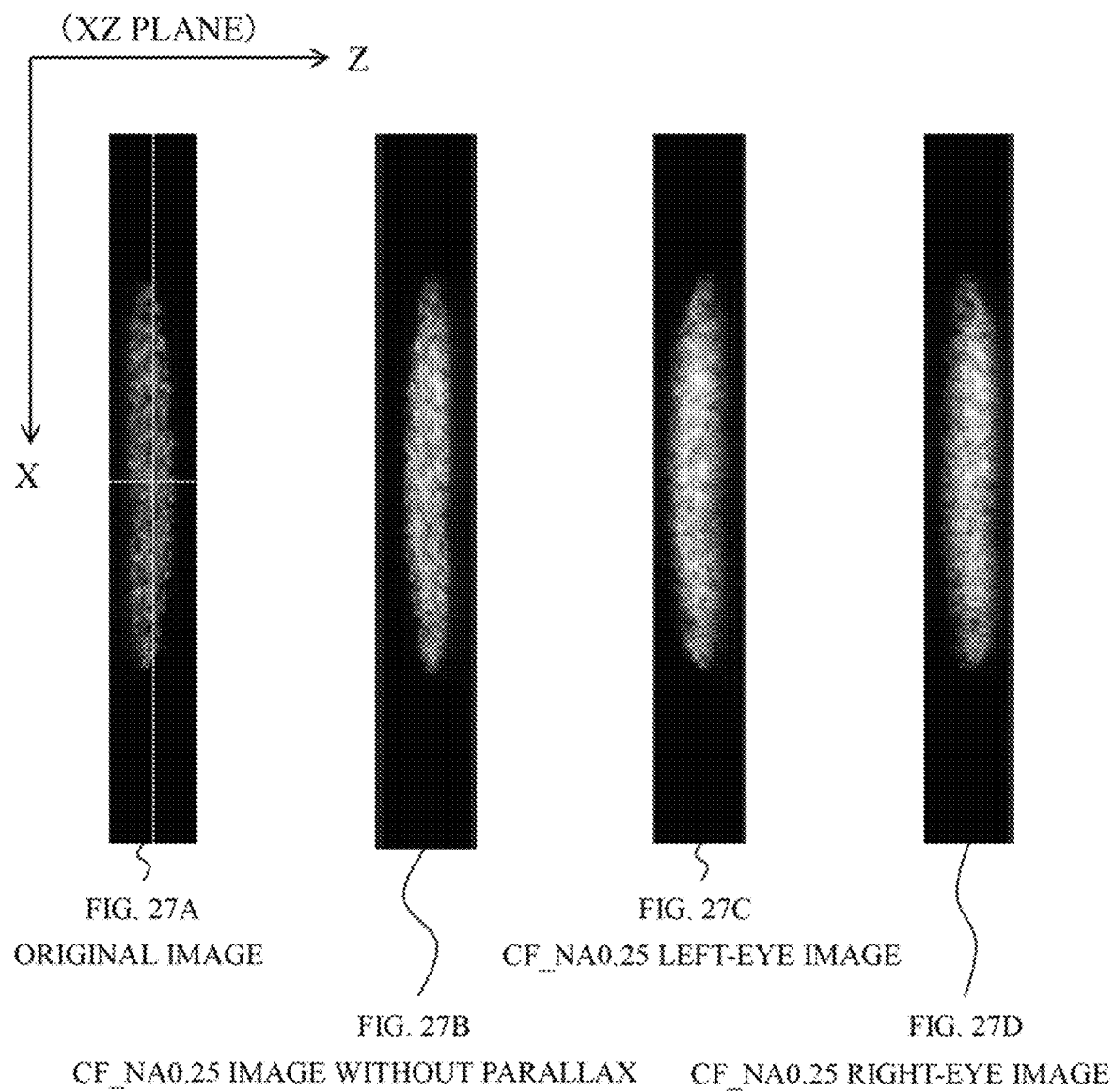

FIG. 29A

SETTING PARAMETERS ~300

| FULL SCREEN | CROSS-SECTION 2D / 3D | MAGNIFI-CATION=__% |
|---|---|---|
| φ=__deg | θ=__deg | ψ=__deg |
| | | ALL DATA |

Pr(X=__um, Y=__um, Z=__um)

DATA SIZE (DISPLAY ONLY)
(X=__um, Y=__um, Z=__um)

DISPLAY RANGE (DISPLAY ONLY)
(X=__um, Y=__um, Z=__um)

DATA PITCH (DISPLAY ONLY)
(X=__um, Y=__um, Z=__um)

BLURRING KERNEL TYPE:
conv, CF, user1, user2 | CIRCULAR OR GAUSSIAN
BLURRING KERNEL NA=__: auto, manual DEPTH-DISPLAY RANGE: auto, manual, ONE-DOT CHAIN LINE
XY: Zr-__um~Zr+__um
YZ: Xr-__um~Xr+__um
XZ: Yr-__um~Yr+__um DEPTH-DISPLAY DEPTH (DISPLAY ONLY), BROKEN LINE
XY: Zr-__um~Zr+__um
YZ: Xr-__um~Xr+__um
XZ: Yr-__um~Yr+__um DEPTH-FOCUS DEPTH (DISPLAY ONLY)
XY: Zr-__um~Zr+__um
YZ: Xr-__um~Xr+__um
XZ: Yr-__um~Yr+__um

| DEPTH |
| RULER |

FIG. 29B (PHOTOGRAPHING DATA)
NA=__;
REFRACTIVE INDEX OF MEDIUM__;
FLUORESCENCE EXCITATION WAVELENGTH=__nm,
RECEIVED LIGHT WAVELENGTH=__nm

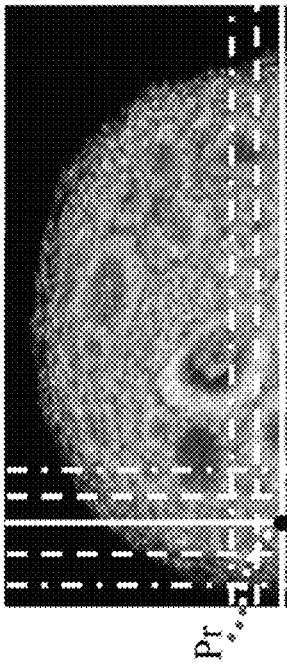

Pr

XY PLANE

XZ PLANE

IMAGE PROCESSING DEVICE, IMAGE PROCESSING PROGRAM, IMAGE PROCESSING METHOD, AND IMAGING DEVICE

FIELD

The present invention relates to an image processing device, an image processing program, an image processing method, and an imaging device.

BACKGROUND

For example, a technique has been suggested which uses plural images obtained by photographing the same photographed object in different focal positions and identities based on a superposition model and thereby generates a desired image in which sharpness is adjusted in a depth direction (for example, see PTL 1).

CITATION LIST

Patent Literature

[PTL 1] U.S. Pat. No. 6,571,023

In related art, a problem has been that artifacts are perceptible because noise having a strong correlation with an original image occurs in a generated image. Further, in order to increase sharpness of a region in focus, extraction of the region in focus by a depth map is necessary.

SUMMARY

One aspect of an image processing device exemplifying the present invention includes: a first processing unit which executes blurring processing in a common focus position on each of plural images in mutually different focus positions; an integration unit which generates an integrated image resulting from integration of the plural images on which the blurring processing is executed; and a second processing unit which generates a composite image having a predetermined blur degree by executing sharpening processing on the integrated image generated by the integration unit based on information in which optical information indicating optical characteristics of an optical system in which the plural images are acquired and a blur degree of the blurring processing in the common focus position are composited together along a depth direction of the plural image.

Further, a rotation processing unit is further provided which generates plural images in which at least one axis of axes of three-dimensional coordinates is rotated in an arbitrary direction with respect to the plural images, and the first processing unit executes the blurring processing in a common focus position on each of the plural images rotated by the rotation processing unit.

One aspect of an image processing program exemplifying the present invention causes a computer to execute processing of: executing blurring processing in a common focus position on each of plural images in mutually different focus states; generating an integrated image resulting from integration of the plural images on which the blurring processing is executed; and generating a composite image having a predetermined blur degree by executing sharpening processing on the generated integrated image based on information in which optical information indicating optical characteristics of an optical system in which the plural images are acquired and a blur degree of the blurring processing in the common focus position are composited together along a depth direction of the plural image.

One aspect of an image processing method exemplifying the present invention includes: executing blurring processing in a common focus position on each of plural images in mutually different focus states; generating an integrated image resulting from integration of the plural images on which the blurring processing is executed; and generating a composite image having a predetermined blur degree by executing sharpening processing on the generated integrated image based on information in which optical information indicating optical characteristics of an optical system in which the plural images are acquired and a blur degree of the blurring processing in the common focus position are composited together along a depth direction of the plural image.

One aspect of an imaging device exemplifying the present invention includes: at least one photographing lens; at least one imaging element; and the image processing device of the present invention, the image processing device generating a composite image having a predetermined blur degree based on plural images acquired by using the photographing lens and the imaging element.

BRIEF DESCRIPTION OF DRAWINGS

FIG. 4 is a diagram illustrating one example of image processing in the image processing device illustrated in FIG. 1.

FIG. 9A-FIG. 9F is a diagram illustrating one example of a composite image of the point image illustrated in FIG. 8.

FIG. 14A-FIG. 14B is a diagram illustrating one example of stereo images.

FIG. 20A-FIG. 20D is a diagram illustrating examples of rectangular cuboid data of an object in three-dimensional coordinates and blurring functions.

FIG. 21A-FIG. 21B is a diagram illustrating examples of original images and composite images in an XY plane, a YZ plane, and an XZ plane.

FIG. 24A-FIG. 24B is a diagram illustrating a composition example of an image without a parallax by a blurring function of a confocal filter.

FIG. 27A-FIG. 27D is a diagram illustrating a generation example of a parallax image in an XZ plane.

FIG. 29A-FIG. 29B is a diagram illustrating one example of the operation interface and the display image example of the image processing device according to the present embodiment.

DESCRIPTION OF EMBODIMENTS

Embodiments will hereinafter be described in detail by using drawings. An image processing device described in the present embodiment can inhibit occurrence of noise and generate a proper blurred image.

Figure 1:
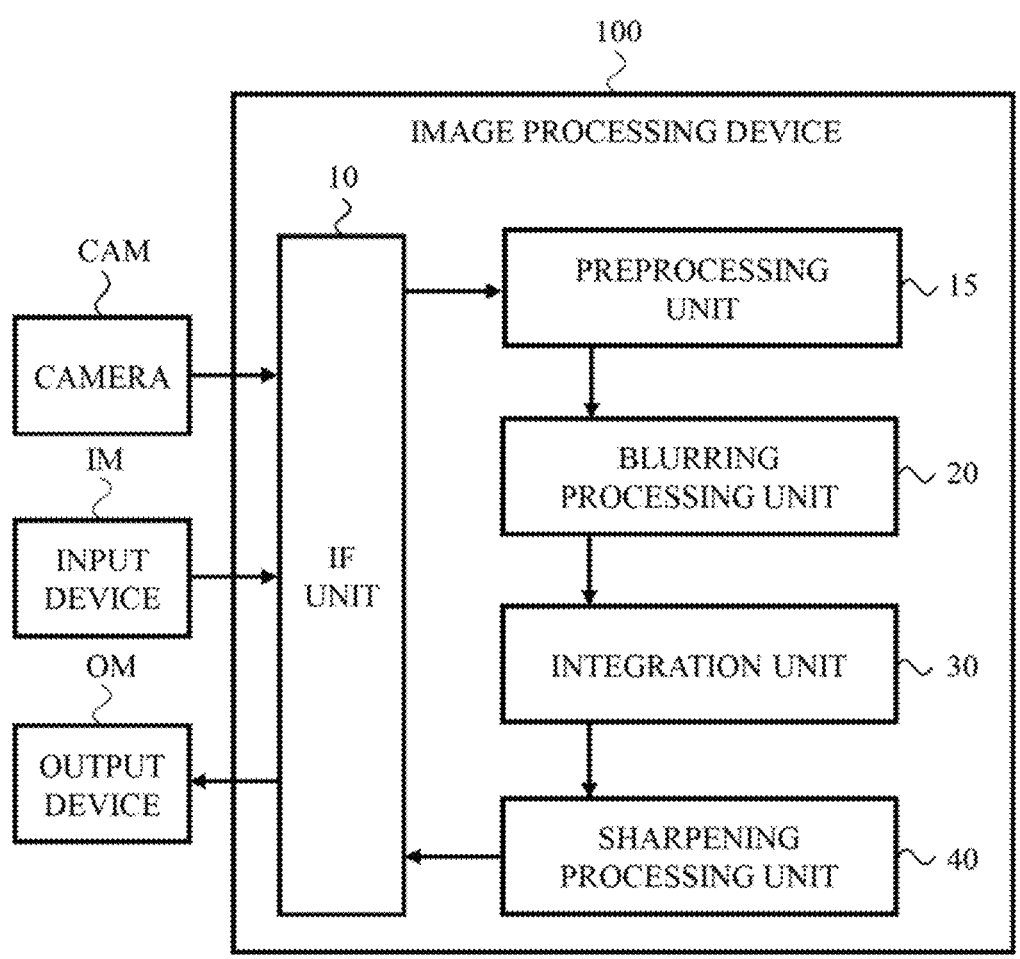
FIG. 1 is a diagram illustrating one embodiment of an image processing device.

FIG. 1 illustrates one embodiment of the image processing device.

An image processing device 100 illustrated in FIG. 1 is connected with a camera CAM, an input device IM, and an output device OM in a wired or wireless manner. Note that the image processing device 100 may be connected with at least the camera CAM via a network.

The camera CAM is a digital camera having one imaging element such as CCD (charge coupled devices) or a CMOS (complementary metal oxide semiconductor). For example, the camera CAM captures images of the same photographed object in mutually different focal positions by a shutter operation for a release button included in the camera CAM by a user and generates images of the photographed object which are captured in respective focal positions. The camera CAM outputs plural generated images to the image processing device 100. Note that the camera CAM adds imaging information indicating a focus position (or an extension amount of a photographing lens), a diaphragm value, an exposure time, and so forth in a case where an image of the photographed object is captured to a generated image. Further, a focus position is also referred to as position in focus, focus distance, or subject distance and is set to an arbitrary position by driving a focus lens of an optical system of the camera CAM based on a photographing distance instructed by an imaging device.

Note that the camera CAM may be a digital camera having plural photographing lens and plural imaging elements corresponding to those (hereinafter, referred to as "multi-eye camera"). In this case, the camera CAM can capture respective images of the same photographed object in mutually different focus positions by one shutter operation in the plural imaging elements and can thereby shorten a time for acquiring plural images.

Further, plural cameras CAM may be connected with the image processing device 100. In this case, the plural cameras CAM simultaneously captures respective images of the same photographed object in different view points. Then, the image processing device 100 may convert plural images whose view points of image-capturing are different to plural images whose focus positions are different by using processing disclosed in JP 2013-26844 A, for example. Accordingly, a time for acquiring plural images can be shortened.

Note that plural images captured by the camera CAM may be stored in a storage device such as a hard disk device arranged on the inside or the outside of the image processing device 100. In this case, the image processing device 100 reads out plural images from the inside or outside of the storage device in a case of executing image processing.

The input device IM is a keyboard, a touch panel, or the like and receives an instruction from a user via an operation by the user. For example, in a case where the image processing device 100 generates a composite image in instructed re-focus position and diaphragm value by using plural images captured by the camera CAM, the input device IM accepts instructions about the re-focus position and diaphragm value via an operation by the user. The input device IM outputs the accepted instruction to the image processing device 100.

The output device OM is a display such as a liquid crystal monitor, receives a result of processing by the image processing device 100, and displays a received processing result.

The image processing device 100 is a computer device including an IF (interface) unit 10, an arithmetic processing unit such as a processor, and a storage device such as a hard disk device. For example, the arithmetic processing device of the image processing device 100 executes an image processing program stored in the storage device of the image processing device 100 and thereby functions as a preprocessing unit 15, a blurring processing unit 20, an integration unit 30, and a sharpening processing unit 40.

Note that the image processing program may be distributed while being recorded in a portable storage medium such as an optical disk such as a CD (compact disk) or a USB (universal serial bus) memory. Further, the image processing device 100 may download the image processing program through a network via a network interface included in the image processing device 100 and store that in the storage device of the image processing device 100.

The IF unit 10 is an interface and receives a signal from the camera CAM, the signal including plural images, and outputs the received signal to the preprocessing unit 15. Further, the IF unit 10 receives a signal including an instruction from the input device IM and outputs the received signal to the arithmetic processing device or the like. Further, the IF unit 10 outputs a signal including a result of processing to the output device OM.

The preprocessing unit 15 refers to imaging information added to each of the plural images received from the camera CAM and executes preprocessing such as position alignment among the plural images and magnification correction. Then, the preprocessing unit 15 outputs plural preprocessed image to the blurring processing unit 20.

Note that the preprocessing executed by the preprocessing unit 15 includes development processing such as white balance processing and gamma correction. Further, in a case where an image captured by the camera CAM is a color image having color components such as R (red), G (green), and B (blue), the preprocessing unit 15 executes color interpolation processing on each of the plural images and generates images for each of the color components. An action of the preprocessing unit 15 will be described in FIG. 4.

Note that in a case where the camera CAM has a similar function to the preprocessing unit 15 and the preprocessing is in advance executed on the plural images received from the camera CAM, the preprocessing unit 15 of the image processing device 100 may be omitted.

The blurring processing unit 20 receives the plural images preprocessed by the preprocessing unit 15. The blurring processing unit 20 executes blurring processing on each of the plural images at a blur degree corresponding to the re-focus position and diaphragm value which are instructed by the user via the input device IM. An action of the blurring processing unit 20 will be described in FIG. 2 and FIG. 3. The blurring processing unit 20 is one example of a first processing unit.

The integration unit 30 integrates the plural images for which the blurring processing is performed by the blurring processing unit 20 and generates an integrated image.

The sharpening processing unit 40 executes sharpening processing on the integrated image generated by the integration unit 30 based on the blur degree in the blurring processing executed on each of the plural images and on optical characteristics of a photographing lens and so forth included in the camera CAM. The sharpening processing unit 40 generates a sharpened integrated image as a composite image at the instructed re-focus position and diaphragm value.

Figure 2:
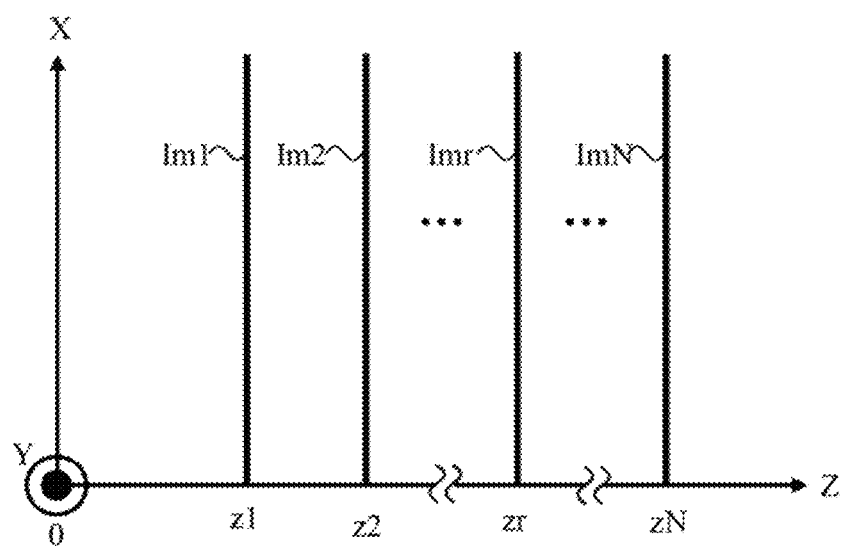
FIG. 2 is a diagram illustrating one example of focus positions in which plural images are captured.

FIG. 2 illustrates one example of focus positions z in which the plural images are captured. The origin of a coordinate system XYZ in FIG. 2 indicates the position in which the imaging element of the camera CAM is arranged. An XY plane in FIG. 2 indicates an imaging plane of the imaging element of the camera CAM (that is, a plain in which plural pixels included in data of an image are arrayed). Further, a Z axis in FIG. 2 indicates an optical axis direction of the camera CAM (that is, a direction of a photographed object) and indicates a distance in the optical axis direction on an image plane side of a lens.

In a case where focusing is performed by extending the lens, depending on an image distance, a view angle changes, and a magnification changes. Because the magnification becomes a maximum at f_backmax at which the image distance becomes a maximum, the image processing device 100 executes magnification correction such that image magnifications at which photographing is performed equivalently become this maximum value and thereafter executes the blurring processing. An image plane parallax D corresponding to a camera plane parallax S on the image plane is expressed as formula (1).

$$D = BM \cdot S/b \tag{1}$$

Here, a term b represents a distance in the optical axis direction on an object side of the lens (photographing distance). A term BM represents the maximum image distance (focal length+extension amount).

In order to make a blur of a composite image artistic, a photographed object is photographed in such a photographing distance b that blur amounts of an image plane, that is, the image plane parallaxes D become equivalent intervals. Thus, in order to make the image plane parallaxes D equivalent intervals, that is, to make 1/b an equivalent interval, an interval Δ(1/b) of 1/b is determined based on a depth of field (DOF) of the lens. The DOF is determined by using formula (2).

$$DOF = F \times COC \tag{2}$$

Note that a term F represents an F-number of the lens, and a term COC (circle of confusion) represents a least circle of confusion and is set to 1/30 mm, for example.

Then, the interval Δ(1/b) is obtained by using formula (3).

$$\Delta(1/b) = COC/2/(f/2/F \cdot BM) \tag{3}$$

Note that a term f represents a focal length of the lens.

Accordingly, from obtained A (1/b) and the condition for making 1/b an equivalent interval, the photographing distance b in a case of focus bracketing can be obtained between infinity and the shortest photographing distance.

Meanwhile, because focusing is performed by extending the lens, formula (4) is obtained by differentiating a formula for image formation by the lens, 1/f=1/z+1/b.

[Math. 1]

$$dz = \frac{1}{\left(\frac{1}{f} - \frac{1}{b}\right)^2} d\left(\frac{1}{b}\right) \tag{4}$$

Then, because in a usual photographing lens, the photographing distance b is 40f or greater, formula (4) can be approximated as formula (5).

[Math. 2]

$$dz \approx f^2 d\left(\frac{1}{b}\right) = \frac{f^2}{BM \cdot S} dD \qquad (5)$$

As expressed by formula (5), the image plane parallax D is proportional to a distance z in the optical axis direction on an image side. Accordingly, in a case of photographing other than extreme macro photography, photographing is performed such that the distance z in the optical axis direction on the image side has equivalent intervals dz, that is, photographing is performed such that the image plane parallaxes D becomes equivalent intervals by performing focus bracketing. In this case, dz is obtained by substituting A (1/b) of formula (3) for d(1/b) of formula (5), and focus bracketing photographing may be performed from the focal length f at equivalent intervals dz.

Meanwhile, in a case of extreme macro photography, an image distance z in the formula for image formation by the lens is desirably determined from A (1/b) of formula (3) and the photographing distance b obtained from the condition for making 1/b an equivalent interval. However, the above-described method of performing focus bracketing photographing at the equivalent intervals dz does not cause a large difference in a generated image.

As illustrated in FIG. 2, plural images captured by the camera CAM are set to N images. That is, the camera CAM captures an image of the same photographed object in each of N focus positions z (z1 to zN) and generates N images Img (Img(x,y,z1) to Img(x,y,zN)). Note that an image Img (x,y,zr) represents the intensity of the coordinates of each pixel of an image captured in a focus position zr (r denotes an integer from one to N). Note that a focus position z1 represents the closest distance, and a focus position zN represents infinity. Further, each of N focus positions z is preferably at a mutually equivalent interval and is determined by using formula (1) to formula (5).

Here, a photographing lens of the camera CAM has a specific point spread function (PSF) representing an impulse response in a case where a photographed object is a point light source. For example, in a case of a circular aperture, a point spread function is expressed by a conical function along the optical axis which is such a function that the position in focus at the apex of the cone comes to the position corresponding to zr, and the weight in the circular aperture at the focus position z is expressed by a uniform distribution, a Gaussian distribution, or the like. For example, as disclosed in JP 2013-26844, a point spread function PSFc of the camera CAM is expressed as formula (6) in a case where the weight in the circular aperture at the focus position z is expressed by a Gaussian distribution.

[Math. 3]

$$PSFc(x, y, z) = a1 \cdot \exp\left(-\frac{x^2 + y^2}{|k1 \cdot z|^2}\right) \qquad (6)$$

As coefficients a1 and k1, values corresponding to the value of a diaphragm of the camera CAM are set. For example, the coefficient k1 becomes smaller as the value of a diaphragm becomes smaller (the depth of field becomes deeper), and the spread of the cone of the point spread function PSFc becomes smaller. The point spread function PSFc is one example of optical information.

A three-dimensional intensity distribution of an object as a photographed target in an image space is set as Io(x,y,z). An image Ic(x,y,zr) photographed by focusing a position in focus at zr along the optical axis of the camera CAM is expressed as formula (8) when Ic(x,y,zr) is projected onto an XY plane in formula (7). For example, in a case of a circular aperture, the point spread function PSFc(x,y,z) in formula (7) is a conical function along the optical axis in which the position in focus at the apex of the cone is zr.

[Math. 4]

$$Ic(x, y, z, zr) = \int_{-\infty}^{\infty}\int_{-\infty}^{\infty} Io(x', y', z) PSFc(x-x', y-y', z-zr) dx' dy' \qquad (7)$$

$$= Io(x, y, z) \otimes PSFc(x, y, z - zr)$$

Note that $\otimes$ represents a convolution in an XY plane.

$$Ic(x, y, zr) = \int_Z Ic(x, y, z, zr) dz \qquad (8)$$

Further, the image Img and the point spread function PSFc are related with each other as formula (9).

[Math. 5]

$$Img(x, y, z) = \int_{-\infty}^{\infty}\int_{-\infty}^{\infty}\int_{-\infty}^{\infty} Io(x', y', z') PSFc(x-x', y-y', z-z') dx' dy' dz' \qquad (9)$$

$$= Io(x, y, z) \otimes_{3D} PSFc(x, y, z)$$

Note that $\otimes_{3D}$ represents a three-dimensional convolution.

Figure 3:
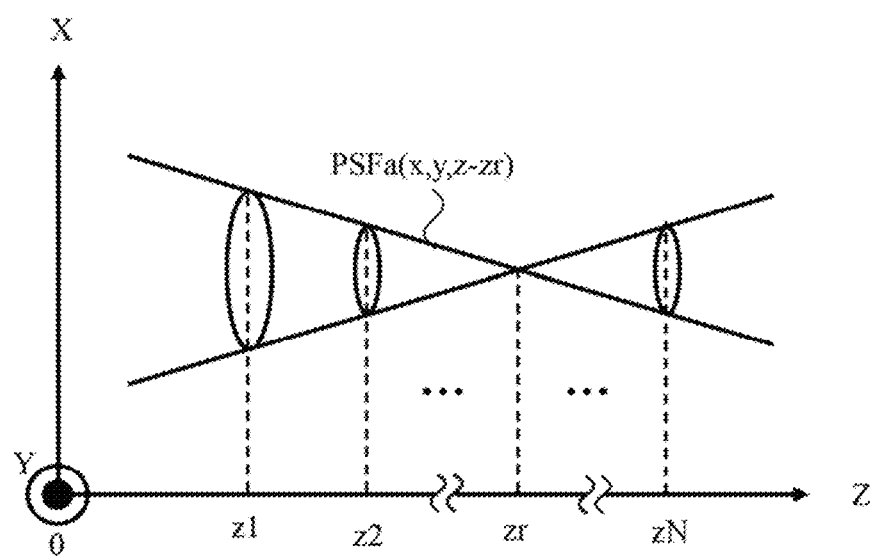
FIG. 3 is a diagram illustrating one example of a blurring function PSFa used in blurring processing in a blurring processing unit illustrated in FIG. 1.

FIG. 3 illustrates one example of a blurring function PSFa used in the blurring processing in the blurring processing unit 20 illustrated in FIG. 1. The vertical axis in FIG. 3 represents an X axis (or a Y axis) similarly to a case of FIG. 2, and the horizontal axis in FIG. 3 represents a Z axis (the optical direction of the photographing lens of the camera CAM).

FIG. 3 illustrates the blurring function PSFa which is arbitrarily set at a re-focus position zr, for example. As illustrated in FIG. 3, the blurring function PSFa has the apex at the re-focus position zr, has a three-dimensional conical shape which is more spread as more separated from the re-focus position zr along the optical axis (Z axis), and is expressed as formula (10), for example.

[Math. 6]

$$PSFa(x, y, z - zr) = a2 \cdot \exp\left(-\frac{x^2 + y^2}{|k2(z - zr)|^2}\right) \qquad (10)$$

Note that the blurring function PSFa of formula (10) represents a case where a two-dimensional point image intensity distribution in the XY plane at a position z is set as a Gaussian distribution, and as a coefficient k2, the value corresponding to a diaphragm value of the photographing lens of the camera CAM is set. As the value of a diaphragm of the camera CAM becomes smaller (the depth of field becomes deeper), the coefficient k2 becomes smaller, and the spread of the cone of the blurring function PSFa becomes smaller. A coefficient a2 is set as the reciprocal of the area of the two-dimensional point image intensity distribution and is normalized. Note that the point image intensity distribution in the XY plane at the position z may be a uniform distribution (pill case) or the like.

Further, processing in which an influence of the point spread function PSFc of the original optical system is removed from the three-dimensional intensity distribution Io(x,y,z) in the image space and re-focusing and blur addition are performed by using the blurring function PSFa is expressed as formula (11).

[Math. 7]

$$Iai(x, y, zr) = \int_{z1}^{zN} Ic(z, y, z, zr)dz = \int_{z1}^{zN} Io(x, y, z) \otimes PSFa(x, y, z-zr)dz$$

$$= \int_{z1}^{zN} Img(x, y, z) \otimes_{3D}^{-1} PSFc(x, y, z) \otimes PSFa(x, y, z-zr)dz \quad (11)$$

Note that $\otimes_{3D}^{-1}$ represents a three-dimensional deconvolution.

As expressed by formula (11), a blur in the best focus position in the original optical system is removed, and convolution is performed by the blurring function PSFa. Thus, in a case where the best focus position of the blurring function PSFa is set as a delta function, an image with no degradation can be generated for an object in focus.

Meanwhile, processing which is executed by the image processing device 100 and in which an influence of the point spread function PSFc of the original optical system is removed from the three-dimensional intensity distribution Io(x,y,z) in the image space and re-focusing and blur addition are performed by using the blurring function PSFa is expressed as formula (12).

[Math. 8]

$$Ia(x, y, zr) = \int_{z1}^{zN} Img(x, y, z) \otimes PSFa(x, y, z-zr)$$

$$dz \otimes^{-1} \int_{z1}^{zN} PSFc(x, y, z-zr) \otimes PSFa(x, y, z-zr)dz$$

$$= \int_{z1}^{zN} Img(x, y, z) \otimes PSFa(x, y, z-zr)$$

$$dz \otimes^{-1} \int_{z1}^{zN} CF(x, y, z-zr)dz$$

$$= Is(x, y, zr) \otimes^{-1} Ip(x, y, zr) \quad (12)$$

Note that $\otimes$ represents a two-dimensional convolution, and $\otimes^{-1}$ represents a two-dimensional deconvolution.

A term CF(x,y,z−zr) represents a function resulting from a two-dimensional convolution of a point spread function PSFc(x,y,z−zr) with a blurring function PSFa(x,y,z−zr) in an XY plane and is also referred to as "convolution function".

Here, an object as a photographed object has a three-dimensional expansion, and the object is present in the position z (=zr) in focus and positions other than that. The position zr is in focus, and a blur does not preferably occur there. For example, in a case where an object is present at (x1,y1) in the XY plane at the position zr, it is desirable to generate an image without degradation due to an aberration or artifacts of image processing, that is, an image with no degradation from an intensity distribution Io(x1,y1,zr) for a portion in which the object is present. Furthermore, in formula (11), generation of an image with no degradation is capable of being achieved in a case where the blurring function PSFa at the best focus position (the most stopped-down position) is a δ function. Meanwhile, in formula (12), generation of an image with no degradation is always capable of being achieved even when the blurring function PSFa at the best focus position is not a δ function. On the other hand, as expressed by formula (13), it is difficult for an algorithm in related art (for example, see formula (16) described later) to obtain an image with no degradation.

$$Io(x1,y1,zr)=Ia(x1,y1,zr)\neq Ia'(x1,y1,zr) \quad (13)$$

However, Io(x1,y1,zr)≠0.

That is, in the algorithm in related art, image degradation occurs in a position in focus. It has been observed that in a case where an impulse response simulation in which an input image is set as a delta function without a blur is executed with 64-bit precision by using formula (12), Io(x1, y1,zr)=δ(x1,y1,zr)=Ia(x1,y1,zr) holds, by an error within calculation precision. On the other hand, it has been observed that in the algorithm in related art, in a case where an impulse response simulation in which an input image is set as a delta function is executed with 64-bit precision, a result changes depending on a way of selecting the position zr or an integration range of the point spread function PSFc, and noise of a minimum of approximately 8 bits occurs.

Note that in a case where an object is present in a position z(≠zr) not in focus, composite images Iai and Ia become blurry images but do not agree with each other. This is because an influence of a blur in the optical system is once completely removed from the composite image Iai, and an arbitrary blur is thereafter provided thereto, but a slight influence of a blur in the original optical system remains in the composite image Ia.

Further, in formula (12), in order to generate the composite image Ia, a two-dimensional convolution of the point spread function PSFc specific to the photographing lens of the camera CAM and the blurring function PSFa in an XY plane, the two-dimensional convolution being integrated along the Z-axis direction (the depth direction of a photographed object), is deconvolved. This processing is more efficiently executed in a frequency domain. Then, in a case where an arbitrary blurred image is calculated in the frequency domain by using N images Img, formula (12) is expressed as formula (14).

[Math. 9]

$$Ia(x, y, zr) = \sum_{i=1}^{N}[Img(x, y, zi) \otimes PSFa(x, y, zi-zr)]$$

$$\otimes^{-1} \sum_{i=1}^{N}[PSFc(x, y, zi-zr) \otimes PSFa(x, y, zi-zr)]$$

$$= Is(x, y, zr) \otimes^{-1} Ip(x, y, zr)$$

$$= \text{iFT\_2d}\left(\frac{Isf(\omega x, \omega y, zr)}{Ipf(\omega x, \omega y, zr)}\right) \quad (14)$$

Terms ωx and ωy represent angular frequencies, and ωx=2πfx=2π/x and ωy=2πfy=2π/y hold. A term iFT_2d represents two-dimensional inverse Fourier transform, and FFT (fast Fourier transform) or the like is used. Thus, a margin portion is preferably added to the image Img to be input such that the pixel number becomes $2^n \times 2^n$ (n denotes a positive integer). The intensity of the added margin portion may be an average value of the image Img or may be a black level. Note that in a case where the black level is used, it is desirable to perform windowing on edges of the image Img by a window such as existing Blackman window. The formula about deconvolution in the first row in formula (14) is replaced by the formula in the third row for calculation in the frequency domain, the numbers of Fourier transform (FT_2d) and inverse Fourier transform (iFT_2d) can thereby be decreased, and a calculation time can be shortened.

In order for the image processing device 100 to generate the composite image Ia, the blurring processing unit 20 uses the blurring function PSFa in formula (12) and executes the blurring processing (convolution) on each of the images Img. Note that in a case where the image Img is a color image, the blurring processing unit 20 executes a convolution of the image Img and the blurring function PSFa for each of the color components.

The integration unit 30 integrates the images Img convolved with the blurring function PSFa by using formula (15) and generates an integrated image Is. Note that in a case where the image Img is a color image, the integration unit 30 generates the integrated image Is for each of the color components.

[Math. 10]

$$Is(x, y, zr) = \int_{z1}^{zN} Img(x, y, z) \otimes PSFa(x, y, z - zr)dz \qquad (15)$$
$$= \sum_{i=1}^{N} [Img(x, y, zi) \otimes PSFa(x, y, zi - zr)]$$

An integrated image Is(x,y,zr) represents the left integration between two pieces of integrations along the Z axis on the right side of formula (12).

The sharpening processing unit 40 executes the sharpening processing (deconvolution) on the integrated image Is generated by the integration unit 30 by using an integration kernel Ip(x,y,zr) along the Z axis of the convolution of the point spread function PSFc and the blurring function PSFa based on formula (12) and generates the composite image Ia. Note that in a case where the image Img is a color image, the sharpening processing unit 40 executes the sharpening processing on the integrated image Is of each of the color components. The point spread function PSFc is different among colors due to an aberration. To handle this, an influence of the aberration can be removed by using a design value or a measured value.

FIG. 4 illustrates one example of image processing in the image processing device 100 illustrated in FIG. 1. The processing illustrated in FIG. 4 is realized by execution of an image processing program by the arithmetic processing device included in the image processing device 100. That is, FIG. 4 illustrates one embodiment of an image processing program and an image processing method. Note that the processing illustrated in FIG. 4 may be realized by hardware installed in the image processing device 100. In this case, the preprocessing unit 15, the blurring processing unit 20, the integration unit 30, and the sharpening processing unit 40, which are illustrated in FIG. 1, are realized by circuits arranged in the image processing device 100.

In step S100, the image processing device 100 acquires instructions about the re-focus position (photographing distance instruction value) and the diaphragm value (or depth of field) of the composite image Ia to be generated via an operation of the input device IM by the user.

In step S110, the image processing device 100 acquires N images Img from the camera CAM.

In step S120, the preprocessing unit 15 executes preprocessing such as position alignment and magnification correction for each of the images Img acquired in step S110. For example, the preprocessing unit 15 executes cross-correlation processing of the distributions of a feature amount such as luminance or edge among the images Img and detects deviation amounts such as position deviations in the X-axis and Y-axis directions or a rotational deviation around the Z axis among the images Img. Then, the preprocessing unit 15 performs position alignment among the images Img by using the detected deviation amounts.

Further, because the images Img are captured in mutually different focus positions and respective extension amounts of the photographing lens of the camera CAM are different, the images Img exhibit mutually different view angles (or image-forming magnifications). Thus, the preprocessing unit 15 refers to the extension amounts of the photographing lens and the focus positions which are included in the imaging information added to the images Img and corrects the view angles of the other images Img such that those agree with the view angle of the image Img with the smallest view angle. Then, the preprocessing unit 15 crops each of the images Img whose image-forming magnifications are corrected such that the view angles of all of the images Img become the view angle of the image Img with the smallest view angle.

Note that in a case where the processing of the blurring processing unit 20 and the sharpening processing unit 40 are executed in the frequency domain, the preprocessing unit 15 coverts the images Img to square images such that FFT processing or the like for converting data in a spatial domain to data in the frequency domain can be executed on the images Img. However, the preprocessing unit 15 may execute FFT processing or the like on the images Img which are maintained as rectangular images.

In step S130, the blurring processing unit 20 executes the blurring processing on each of the images Img preprocessed in step S120 by using the blurring function PSFa.

In step S140, the integration unit 30 integrates the images Img for which the blurring processing is performed in step S130 by using formula (15) and generates the integrated image Is.

In step S150, the sharpening processing unit 40 executes the sharpening processing on the integrated image Is generated in step S140 by using a deconvolution filter Ipf(ωx, ωy,zr)$^{-1}$ of the point spread function PSFc and the blurring function PSFa, the deconvolution filter being expressed in formula (14). Then, the sharpening processing unit 40 generates the composite image Ia. The image processing device 100 thereafter outputs the generated composite image Ia to the output device OM and causes the output device OM to display the composite image Ia. Note that the image processing device 100 may store the composite image Ia in the storage device included in the image processing device 100. Then, the image processing device 100 finishes the image processing.

Figure 5A:
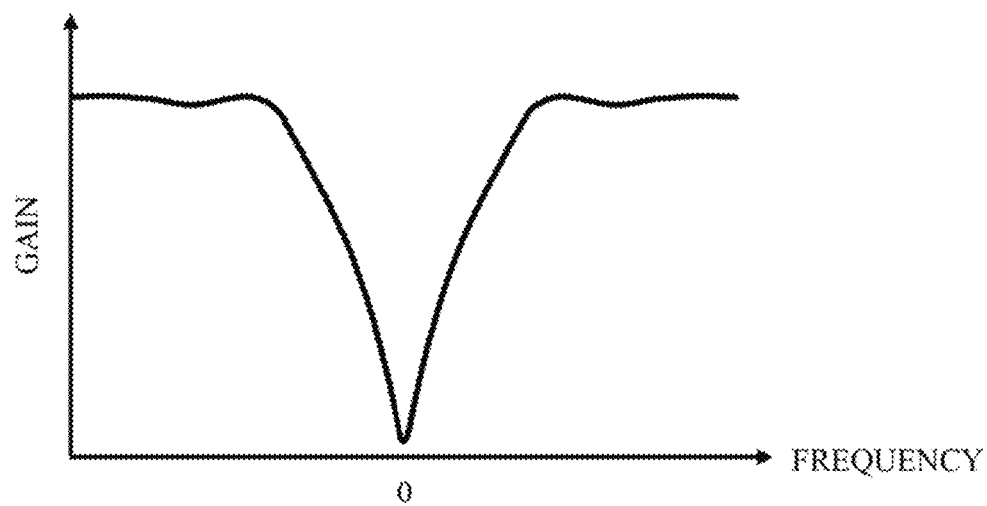
FIG. 5A-FIG. 5B is a diagram illustrating one example of a distribution of a gain of a deconvolution filter in formula (14).
Figure 5B:
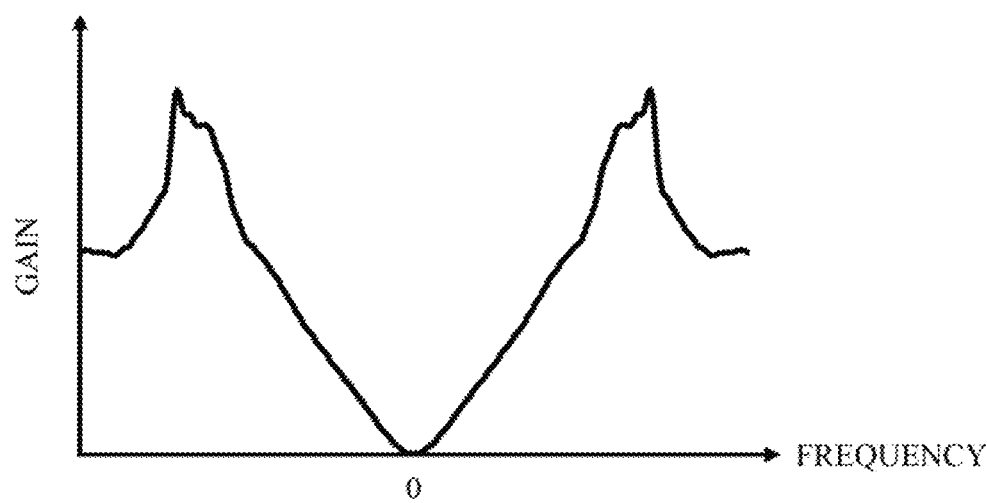

FIG. 5 illustrates one example of the distribution of a gain of the deconvolution filter $Ipf(\omega x,\omega y,zr)^{-1}$ in formula (14). FIG. 5A illustrates one example of the distribution of the gain of the deconvolution filter in formula (14). Further, for comparison with the deconvolution filter in formula (14), FIG. 5B illustrates the distribution of a gain of a deconvolution filter $[Ipcf(\omega x,\omega y)\cdot Ipaf(\omega x,\omega y,zr)]^{-1}$ which is used for generation of a composite image in JP 2013-26844 A (hereinafter, also referred to as "related art example"). Note that a composite image Ia' of the related art example and the deconvolution filter are related with each other as formula (16).

[Math. 11]

$$Ia'(x, y, zr) = \int_{z1}^{zN} Img(x, y, z) \otimes PSFa(x, y, z - zr) \quad (16)$$

$$dz \otimes^{-1} \int_{z1}^{zN} PSFc(x, y, z)dz \otimes^{-1} \int_{z1}^{zN} PSFa(x, y, z - zr)dz$$

$$= \sum_{i=1}^{N} Img(x, y, zi) \otimes PSFa(x, y, zi - zr)$$

$$\otimes^{-1} \sum_{i=1}^{N} PSFc(x, y, zi) \otimes^{-1} \sum_{i=1}^{N} PSFa(x, y, zi - zr)$$

$$= Is(x, y, zr) \otimes^{-1} Ipc(x, y) \otimes^{-1} Ipa(x, y, zr)$$

$$= iFT\_2d\left(\frac{Isf(\omega x, \omega y, zr)}{Ipcf(\omega x, \omega y) \cdot Ipaf(\omega x, \omega y, zr)}\right)$$

As illustrated in FIG. 5A, the gain of the deconvolution filter in formula (14) becomes a minimum in a part around zero-order (around the origin of frequency) and increases as more separated from a part around zero-order. Then, the gain of the deconvolution filter in formula (14) increases and thereafter exhibits a constant gain. Accordingly, the composite image Ia can precisely reproduce a luminance distribution of the original image Img. Comparison of luminance distribution between the composite image Ia and the original image Img will be illustrated in FIG. 6 and FIG. 7.

On the other hand, as illustrated in FIG. 5B, the gain of the deconvolution filter of the related art example in formula (16) becomes a minimum in a part around zero-order and increases as more separated from a part around zero-order similarly to the deconvolution filter in formula (14). However, the deconvolution filter in formula (16) exhibits large fluctuations of the gain in frequency domains separated from a part around zero-order compared to the deconvolution filter in formula (14). Thus, it is difficult for the composite image Ia' to reproduce the luminance distribution of the original image Img. The luminance distributions of the composite image Ia' and the original image Img will be illustrated in FIG. 6 and FIG. 7.

Figure 6A:
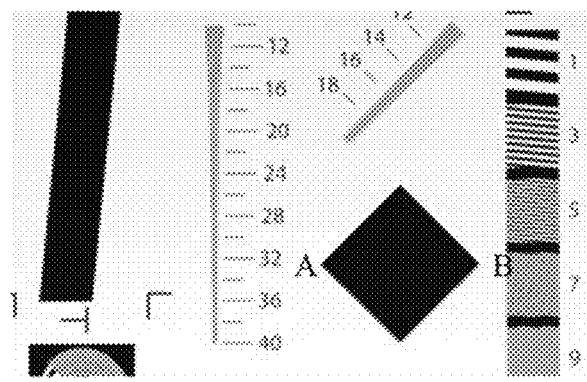
FIG. 6A-FIG. 6C is a diagram illustrating examples of an original image, a composite image generated by using formula (14), and a composite image of a related art example.
Figure 6B:
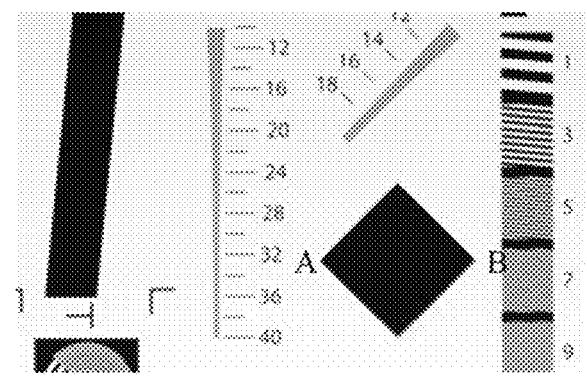
Figure 6C:
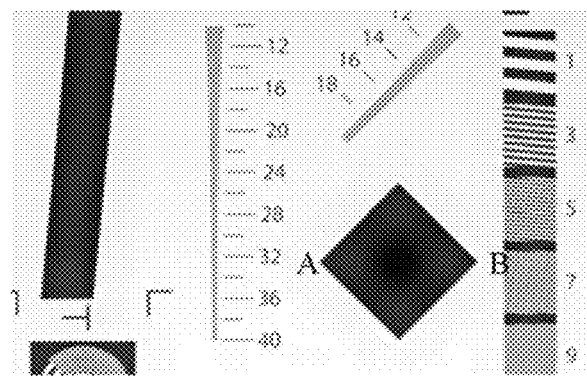

FIG. 6 illustrates examples of the original image Img, the composite image Ia generated by using formula (14), and the composite image Ia' of the related art example. That is, FIG. 6A illustrates one example of the original image Img in which an image of an object present in the re-focus position zr is captured, for example. FIG. 6B illustrates one example of the composite image Ia which is generated by using formula (14) and whose diaphragm value is f/2. FIG. 6C illustrates one example of the composite image Ia' which is generated by using formula (16) of the related art example and whose diaphragm value is f/2. Note that each image illustrated in FIG. 6 is an image of the same photographed object exhibiting a predetermined pattern which is captured by the camera CAM.

Figure 7A:
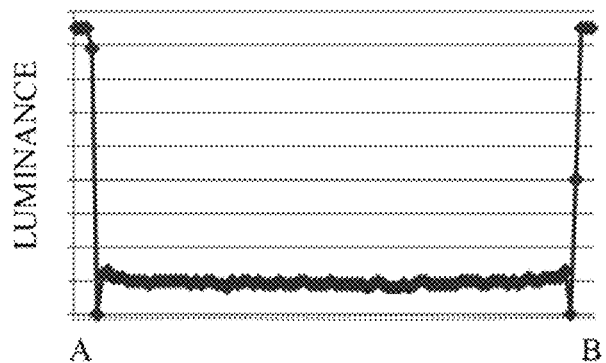
FIG. 7A-FIG. 7C is a diagram illustrating examples of luminance distributions along respective straight lines AB, which are illustrated in FIG. 6, in the original image, the composite image by formula (14), and the composite image of the related art example, which are illustrated in FIG. 6.
Figure 7B:
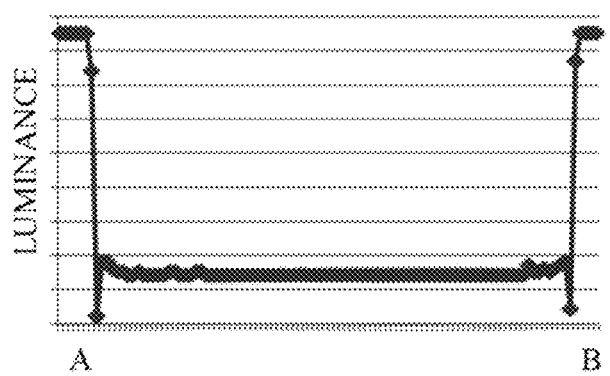
Figure 7C:
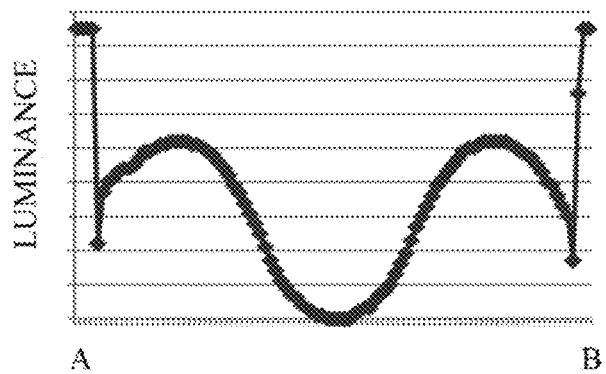

FIG. 7 illustrates examples of luminance distributions along respective straight lines AB, which are illustrated in FIG. 6, in the original image Img, the composite image Ia by formula (14), and the composite image Ia' of the related art example, which are illustrated in FIG. 6. That is, FIG. 7A illustrates one example of the luminance distribution of the original image Img illustrated in FIG. 6A. FIG. 7B illustrates one example of the luminance distribution of the composite image Ia illustrated in FIG. 6B. FIG. 7C illustrates one example of the luminance distribution of the composite image Ia' illustrated in FIG. 6C. Note that in FIG. 7, the vertical axes represent luminance, and the horizontal axes represent the straight lines AB.

Further, in FIG. 6 and FIG. 7, the point spread function PSFc is set as a δfunction in the focus position and set as a disk with a size of f/1.4 in other positions than that, and the composite image Ia' is thereby generated in which a blur in the image Img due to the lens remains. That is, the composite image Ia' does not agree with a three-dimensional intensity distribution Jo in the image space.

As illustrated in FIG. 7B, the composite image Ia generated by using formula (14) precisely reproduces the luminance distribution of the original image Img illustrated in FIG. 7A. That is, the composite image Ia(x,y,zr) generated while an object is present in a focus position zr and re-focusing is set to the position zr can reproduce a similar luminance distribution to the luminance distribution of the original image Img even in a case where the depth of field is changed.

On the other hand, as illustrated in FIG. 7C, the composite image Ia' generated by using formula (16) cannot reproduce the luminance distribution of the original image Img illustrated in FIG. 7A. For example, in a black region of the photographed object of the composite image Ia' illustrated in FIG. 6C, luminance unevenness (noise which is not present in the original image Img illustrated in FIG. 6A) occurs. This is because the gain of the deconvolution filter in formula (16) which is illustrated in FIG. 5B largely fluctuates in accordance with the frequency due to differences in filter characteristics from those of formula (14) which are illustrated in FIG. 5A. Further, in formula (16), the point spread function PSFc of the camera CAM and the blurring function PSFa are in advance integrated separately in the Z-axis direction. Thus, even an image Img(x,y,zr) which is captured in the focus position zr and re-focused in the re-focus position zr, that is, which is in focus is subject to an influence of a blur by the blurring function PSFa in formula (16). Accordingly, the composite image Ia' exhibits a different luminance distribution from the luminance distribution of the original image Img illustrated in FIG. 6A and FIG. 7A, that is, of the photographed object.

Figure 8A:
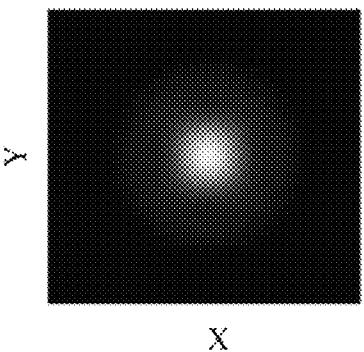
FIG. 8A-FIG. 8B is a diagram illustrating one example of a point image in a case of using a lens with a focal length of 50 mm and/1.4.
Figure 8B:
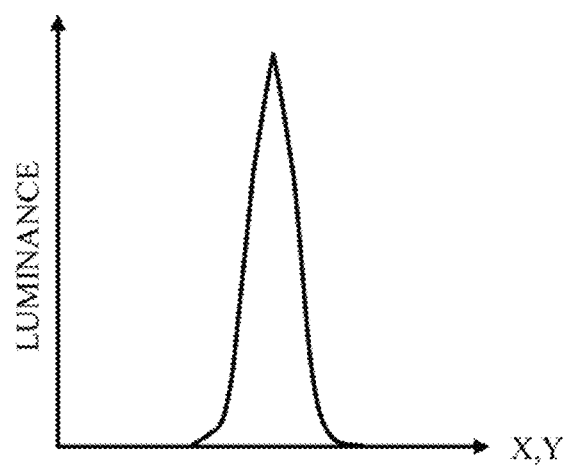

FIG. 8 illustrates one example of a point image in a case of using a lens with a focal length of 50 mm and f/1.4. A point image expands due to the aberration and a diffraction phenomenon. FIG. 8 illustrates a result of a simulation of an impulse response with respect to a white point light source in a case where a white point light source is present in the focus position zr, that is, an intensity distribution $Io(x1, y1, zr)$ is present. A point image is the point spread function PSFc and is also the image Img. In FIG. 8A, the horizontal axis is set as an X axis, and the vertical axis is set as a Y axis. FIG. 8B illustrates the luminance distribution along a straight line in the X-axis direction which passes through the center of the point light source in the image Img illustrated in FIG. 8A.

Because the shape of the point spread function PSFc is different with respect to each of color components of RGB, the point image exhibits coloring particularly around an area where the luminance has a peak. Further, because peak values of the luminance are different among the color components of RGB, the center of the point image does not become pure white.

FIG. 9 illustrates one example of a composite image of the point image illustrated in FIG. 8. FIG. 9A illustrates one example of the composite image Ia generated by using N (for example, 20) images Img exhibiting the point spread function PSFc illustrated in FIG. 8A and formula (14). In FIG. 9A, the horizontal axis is set as an X axis, and the vertical axis is set as a Y axis. FIG. 9B illustrates one example of the luminance distribution along a straight line in the X-axis direction which passes through the center of the composite image Ia illustrated in FIG. 9A, that is, of a restored white impulse.

As illustrated in FIGS. 9A and 9B, the composite image Ia becomes similar to the restored white impulse, that is, the intensity distribution Io(x1,y1,zr).

Note that because the restored white impulse of the composite image Ia illustrated in FIG. 9A has colors, the image processing device 100 generates the composite images Ia of the color components of RGB, superposes the generated composite images Ia of the respective color components, and thereby generates a color composite image Ia illustrated in FIG. 9A.

FIG. 9C illustrates one example of the luminance distribution of the composite image Ia of the R component along a straight line in the X-axis direction which passes through the center of a point light source illustrated in FIG. 9A. Similarly to FIG. 9C, FIG. 9D illustrates one example of the luminance distribution of the composite image Ia of the G component, and FIG. 9E illustrates one example of the luminance distribution of the composite image Ia of the B component. FIG. 9F illustrates one example where the respective luminance distributions of RGB illustrated in FIG. 9C to FIG. 9E are superposed and compared. As illustrated in FIG. 9F, the luminance distribution of the R component illustrated in FIG. 9C, the luminance distribution of the G component illustrated in FIG. 9D, and the luminance distribution of the B component illustrated in FIG. 9E overlap with each other in almost the same shapes. As illustrated in FIG. 9C to FIG. 9E, generated images of RGB return to the original RGB impulses. Although the luminance distributions illustrated in FIG. 9C to FIG. 9E have the impulses with an infinitesimal width, the width of tails in a case of being displayed as an image becomes a width of one pixel.

In the image Img and the luminance distribution of the image Img which are illustrated in FIG. 8, the point light source largely expands compared to the composite image Ia illustrated in FIG. 9A and the luminance distribution illustrated in FIG. 9B. This occurs due to influences of the aberration and diffraction of the photographing lens of the camera CAM.

On the other hand, the composite image Ia illustrated in FIG. 9A and the luminance distribution illustrated in FIG. 9B exhibit similar expansion to the white point light source with a size of one pixel which is used in the simulation, that is, the impulse. Further, as illustrated in FIG. 9F, by the image processing of the image processing device 100, the luminance distributions of the color components of RGB illustrated in FIG. 9C to FIG. 9E overlap with each other. That is, the image processing device 100 can remove the aberration of an optical system in the focus position zr from the composite image Ia.

FIG. 10 illustrates one example of a relationship among the point spread functions PSFc in a case where an object is a white point light source and is a point image in the focus position zr, results of two-dimensional convolutions of the point spread functions PSFc and the blurring function PSFa in an XY plane, and axial chromatic aberrations. The vertical axes in FIG. 10 represent X axes (or Y axes) similarly to FIG. 3, and the horizontal axes in FIG. 10 represent Z axes (the optical axis directions of the photographing lens of the camera CAM).

Figure 10A:
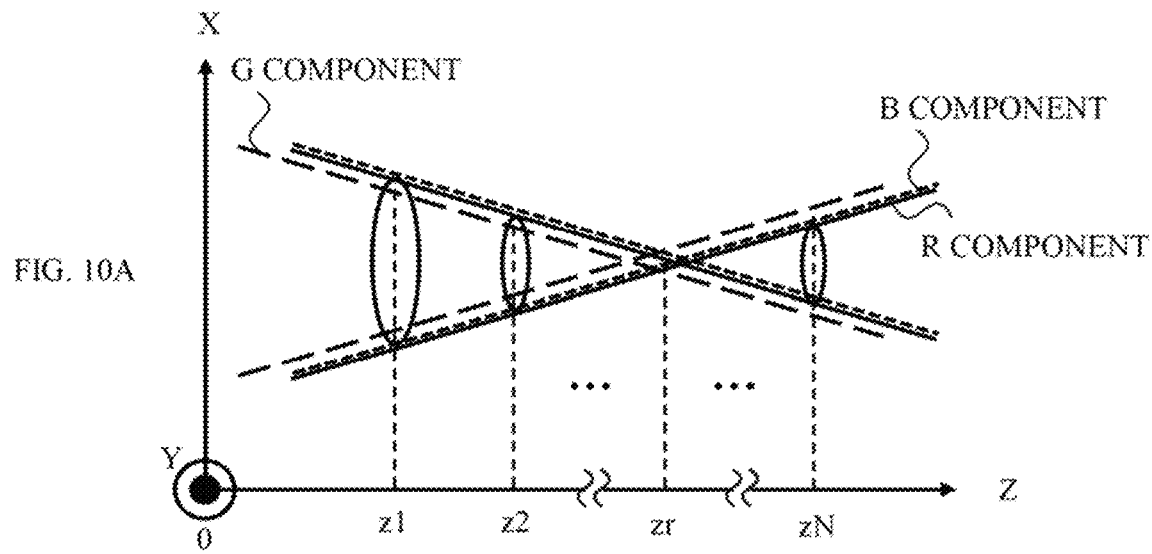
FIG. 10A-FIG. 10B is a diagram illustrating one example of a relationship among point spread functions in a case where an object is a white point light source and is a point image in a focus position, results of two-dimensional convolutions of the point spread functions and a blurring function in an XY plane, and axial chromatic aberrations.

FIG. 10A illustrates respective point spread functions PSFc of the color components of RGB. The point spread function PSFc of each of the color components has the apex at the focus position zr and has a three-dimensional conical shape which is more spread as more separated from the focus position zr along the optical axis (Z axis), for example. Note that in FIG. 10A, the point spread function PSFc of the R component is indicated by solid lines, the point spread function PSFc of the B component is indicated by dotted lines, and the point spread function PSFc of the G component is indicated by broken lines.

In a case where the photographing lens of the camera CAM is an apochromatic lens or the like, for example, as illustrated in FIG. 10A, the apexes of the point spread function PSFc of the R component and the B component are positioned in a part around the focus position zr. Meanwhile, the apex of the point spread function PSFc of the G component is positioned on the left side (closest distance side) of the focus position zr compared to the point spread functions PSFc of the R component and the B component, due to the axial chromatic aberration.

Figure 10B:
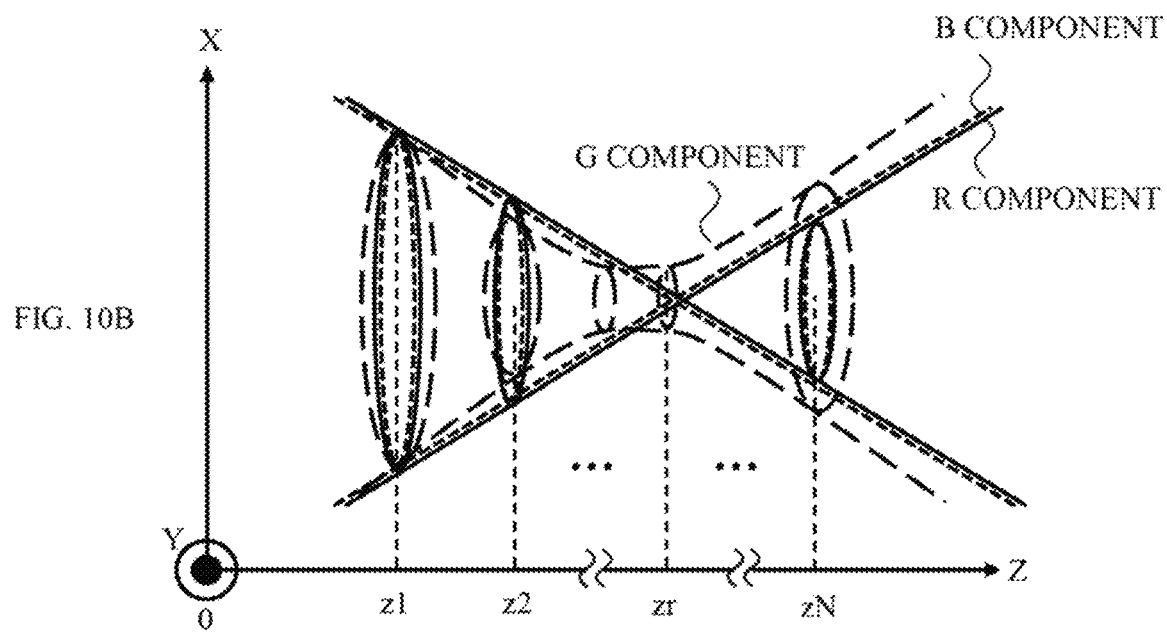

FIG. 10B illustrates results of two-dimensional convolutions in an XY plane by using the point spread functions PSFc illustrated in FIG. 10A and the blurring function PSFa illustrated in FIG. 3, that is, convolution functions CF in formula (12). The convolution functions CF illustrated in FIG. 10B, which are integrated in the Z-axis direction, are respective deconvolution filters Ip of the color components, which are calculated by the sharpening processing unit 40. In FIG. 10B, similarly to FIG. 10A, the convolution function CF of the R component is indicated by solid lines, the convolution function CF of the B component is indicated by dotted lines, and the convolution function CF of the G component is indicated by broken lines.

As illustrated in FIG. 10B, because the focus positions of the point spread functions PSFc agree with the re-focus position of the blurring function PSFa in the position zr, the convolution functions CF of the R component and the B component exhibit three-dimensional conical shapes which are more spread as more separated from the focus position zr along the optical axis. Meanwhile, because the focus position of the point spread function PSFc of the G component does not agree with the re-focus position of the blurring function PSFa, the convolution function CF of the G component exhibits a three-dimensional conical shape which has a throat with a predetermined diameter.

Further, each of N images Img in focus positions z1 to zN includes an axial chromatic aberration similar to the point spread functions PSFc illustrated in FIG. 10A. Thus, in a case where an object is a white point light source and is a point image in the focus position zr, by a deconvolution in formula (14), the axial chromatic aberrations included in the integrated images Is of the color components of RGB and the deconvolution filters Ip of the color components are canceled by each other. Accordingly, the composite image Ia returns to a white point image.

However, as illustrated in FIG. 10B, because the convolution function CF of the G component has a different shape from the convolution functions CF of the R component and the B component, coloring remains in blur images in positions z other than the focus position zr. For example, as illustrated in FIG. 10B, the convolution functions CF of the R and B components are larger than the convolution function CF of the G component on the left side (that is, the closest distance side) of the focus position zr. Thus, purple fringing occurs in a back blur in the composite image Ia resulting from deconvolution by using formula (14). Meanwhile, because the convolution functions of the R and B components are smaller than the convolution function CF of the G component on the right side (that is, infinity side) of the focus position zr, green fringing occurs in a front blur in the composite image Ia.

Accordingly, in order to avoid coloring in a blurred image, for example, the preprocessing unit 15 uses an image Img(x,y,z(i−j)) of the G component in a focus position z(i−j) (i denotes a positive integer from 1 to N and j denotes an arbitrary integer) as an image Img(x,y,zi) of the G component in a focus position zi. That is, the preprocessing unit 15 displaces the image Img of the G component in the Z-axis direction with an optimal amount and in an optimal direction in accordance with the amount of the axial chromatic aberrations (for example, 40 μm in the positive direction or the like) and executes correction processing for making an RGB image Img in the focus position zi by using images Img of the R and B components in the focus position zi and an image Img of the G component in the focus position z(i−j).

Further, the sharpening processing unit 40 uses a point spread function PSFc(x,y,z(i−j)) of the G component in the focus position z(i−j) as a point spread function PSFc(x,y,zi) of the G component in the focus position zi and executes correction processing to cause the focus positions of the point spread function PSFc of the G component and the point spread function PSFc of the R and B components to agree with the focus position zr.

Figure 11:
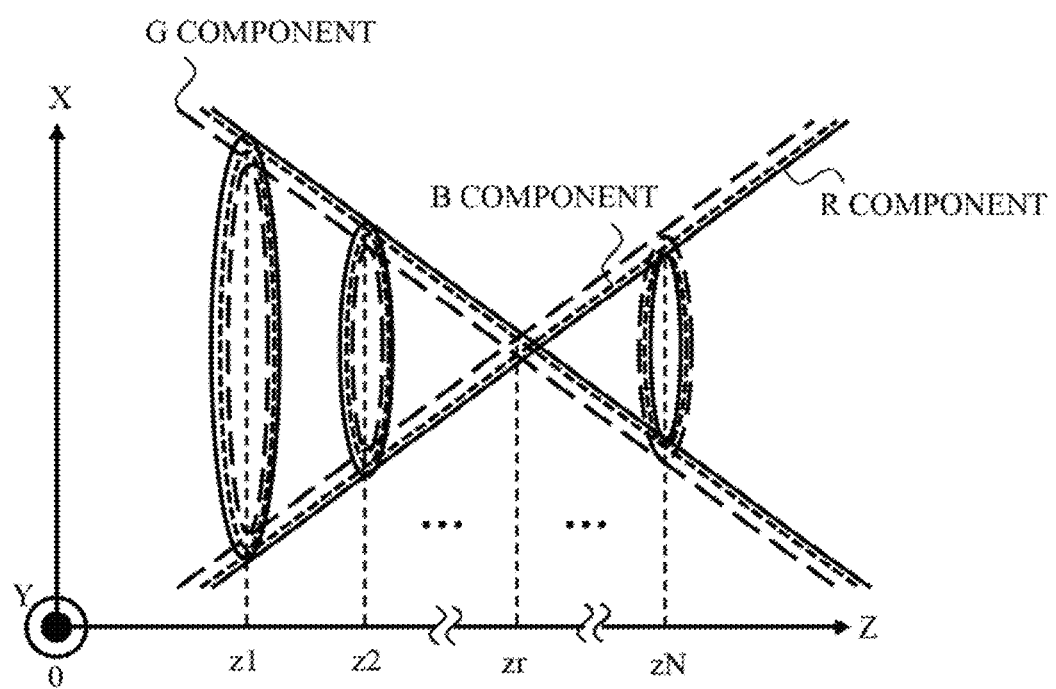
FIG. 11 is a diagram illustrating one example of results of convolutions in a case where a sharpening processing unit illustrated in FIG. 1 executes correction processing of the focus position for the point spread functions illustrated in FIG. 10A.

FIG. 11 illustrates one example of results of convolutions in a case where the sharpening processing unit 40 illustrated in FIG. 1 executes correction processing of the focus position zi for the point spread functions PSFc illustrated in FIG. 10A. FIG. 11 illustrates the respective convolution functions CF of the color components which result from two-dimensional convolutions in an XY plane by using the respective point spread functions PSFc of the color components for which correction processing is performed by the sharpening processing unit 40, and the blurring function PSFa illustrated in FIG. 3. In FIG. 11, similarly to FIG. 10, the convolution function CF of the R component is indicated by solid lines, the convolution function CF of the B component is indicated by dotted lines, and the convolution function CF of the G component is indicated by broken lines. As illustrated in FIG. 11, because the focus position zr of the point spread functions PSFc agrees with the re-focus position zr of the blurring function PSFa, the respective convolution functions CF of the color component exhibit three-dimensional conical shapes which are almost the same shapes and are more spread as more separated from the re-focus position zr along the optical axis.

Accordingly, for an image positioned in the focus position zr, the image processing device 100 uses a deconvolution in formula (14) and thereby causes the axial chromatic aberrations included in the integrated images Is and the deconvolution filters Ip to be canceled by each other with respect to the color components of RGB. Then, because the sizes of blur images of the color components of RGB match with respect to blur images in positions other than the focus position zr, the image processing device 100 can generate the composite image Ia in which coloring on the blur image is reduced. Meanwhile, for an image of a point light source in the focus position zr, the composite image Ia of a delta function without an aberration is generated regardless of presence or absence of the correction processing of the focus position zi for the image Img by the preprocessing unit 15 and the correction processing of the focus position zi for the point spread function PSFc by the sharpening processing unit 40.

FIG. 12 illustrates one example of a relationship among the point spread functions PSFc in a case where an object is a white point light source and is a point image in a different position from the focus position zr, results of two-dimensional convolutions of the point spread functions PSFc and the blurring function PSFa in an XY plane, and the axial chromatic aberrations. The vertical axes in FIG. 12 represent X axes (or Y axes) similarly to FIG. 10, and the horizontal axes in FIG. 12 represent Z axes.

Figure 12A:
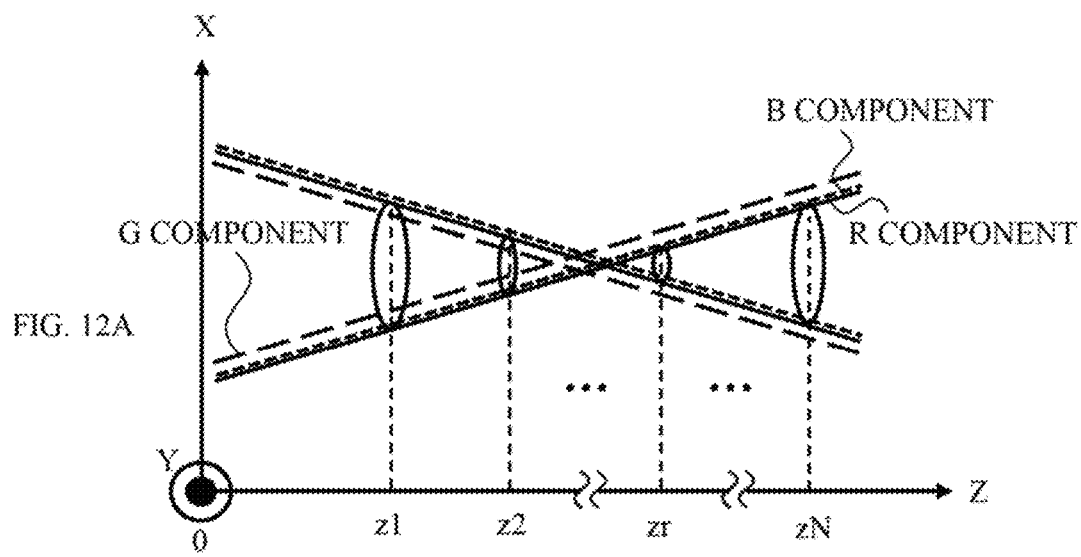
FIG. 12A-FIG. 12B is a diagram illustrating one example of a relationship among point spread functions in a case where an object is a white light source and a point image in a different position from a focus position, results of two-dimensional convolutions of the point spread functions and the blurring function in an XY plane, and the axial chromatic aberrations.

FIG. 12A illustrates the respective point spread functions PSFc of the color components of RGB in a case where the white point light source is positioned on the closest distance side of the focus position zr. The point spread function PSFc of each of the color components has the apex on the left side (closest distance side) of the re-focus position zr of the blurring function PSFa and has a three-dimensional conical shape which is more spread as more separated from the apex along the optical axis (Z axis), for example. Note that in FIG. 12A, similarly to FIG. 10A, the point spread function PSFc of the R component is indicated by solid lines, the point spread function PSFc of the B component is indicated by dotted lines, and the point spread function PSFc of the G component is indicated by broken lines.

As illustrated in FIG. 12A, in a case where the photographing lens of the camera CAM is an apochromatic lens or the like, for example, similarly to FIG. 10A, the apexes of the point spread function PSFc of the R component and the B component are positioned in the same position. Meanwhile, the point spread function PSFc of the G component is positioned on the left side (closest distance side) compared to the point spread functions PSFc of the R component and the B component, due to the axial chromatic aberration.

Figure 12B:
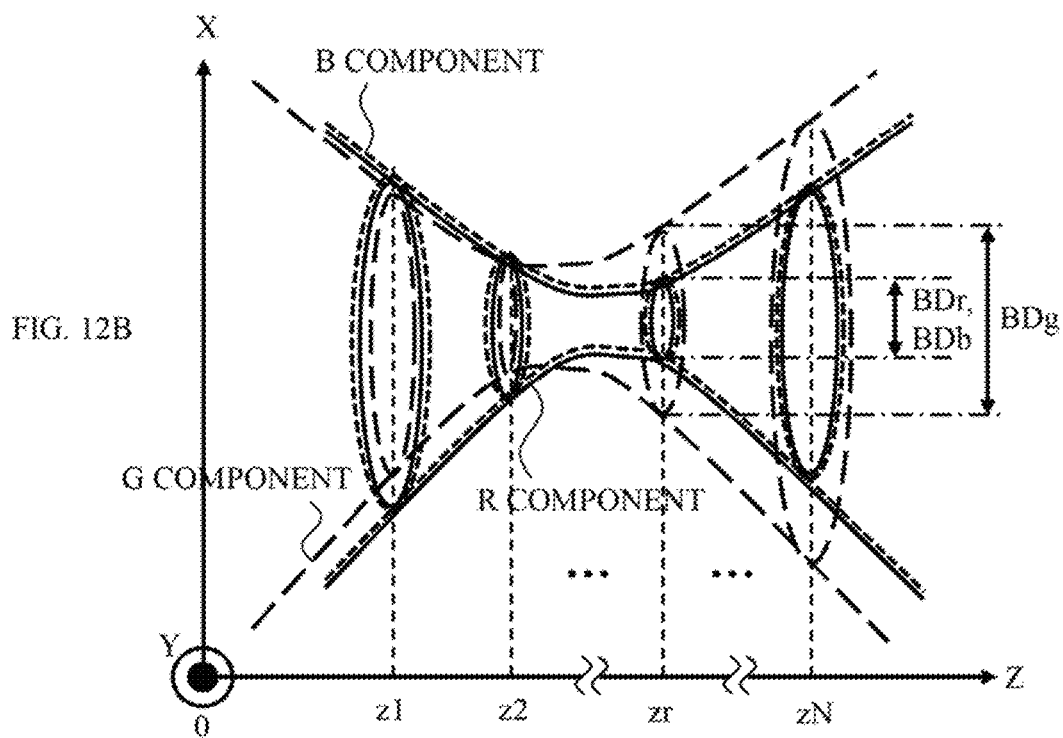

Similarly to FIG. 10B, FIG. 12B illustrates results of two-dimensional convolutions in an XY plane by using the point spread functions PSFc illustrated in FIG. 12A and the blurring function PSFa illustrated in FIG. 3. In FIG. 12B, similarly to FIG. 12A, the result of the convolution for the R component is indicated by solid lines, the result of the convolution for the B component is indicated by dotted lines, and the result of the convolution for the G component is indicated by broken lines.

As illustrated in FIG. 12A, the positions of the apexes of the point spread functions PSFc are present on the closest distance side of the re-focus position zr of the blurring function PSFa and do not agree with the re-focus position zr of the blurring function PSFa. Accordingly, the respective results of the convolutions for the color components exhibit three-dimensional conical shapes which have throats with diameters BDr, BDb, and BDg. That is, in the re-focus position zr, blurs with sizes of the diameters BDr, BDb, and BDg occur.

Note that because the apexes of the point spread functions PSFc of the R component and the B component are present in similar positions to each other, the diameter BDr and diameter BDb of the throats in the results of the convolutions for the R component and the B component generally agree with each other. Meanwhile, because the apexes of the point spread functions PSFc of the G component is positioned on the closest distance side of the apexes of the point spread functions PSFc of the R component and the B component due to the axial chromatic aberration, the diameter BDg of the throat of the result of the convolution for the G component becomes larger than the diameters BDr and BDb. Furthermore, similarly to FIG. 10B, purple fringing occurs in the back blur in the composite image Ia resulting from a deconvolution by using formula (14), and green fringing occurs in the front blur in the composite image Ia.

Figure 13:
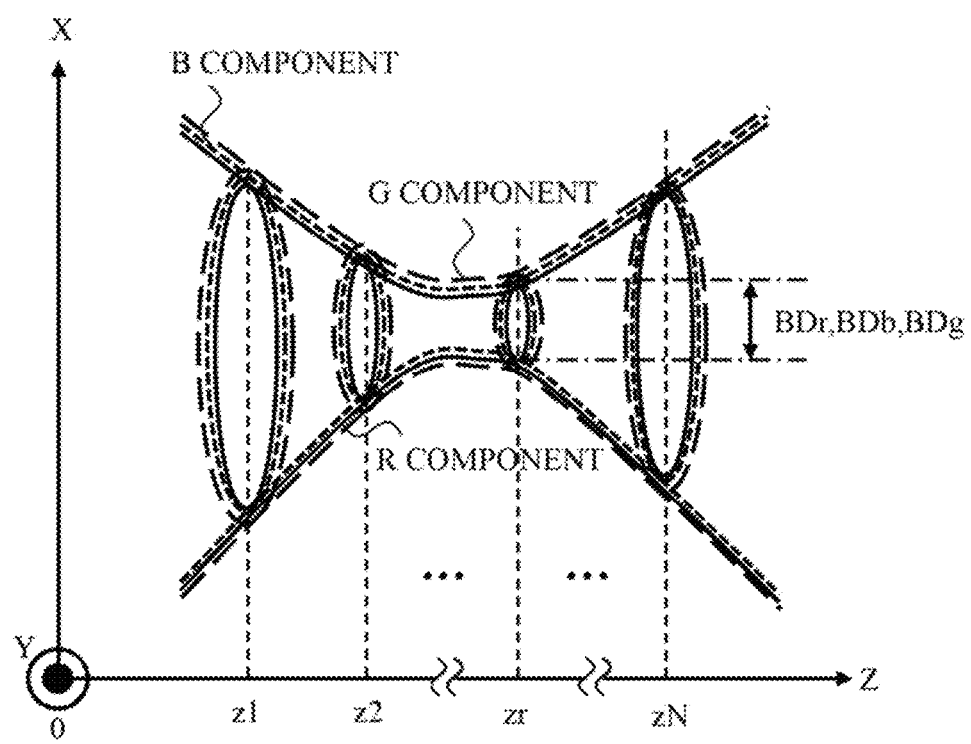
FIG. 13 is a diagram illustrating one example of results of convolutions in a case where the sharpening processing unit illustrated in FIG. 1 executes correction processing of the focus position for the point spread functions illustrated in FIG. 12A.

FIG. 13 illustrates one example of results of convolutions in a case where the sharpening processing unit 40 illustrated in FIG. 1 executes correction processing of the focus position zi for the point spread functions PSFc illustrated in FIG. 12A. FIG. 13 illustrates the respective results of convolutions of the color components which are obtained by two-dimensional convolutions in an XY plane by using the respective point spread functions PSFc of the color components for which the correction processing is performed by the sharpening processing unit 40, and the blurring function PSFa illustrated in FIG. 3. In FIG. 13, similarly to FIG. 10, the result of the convolution for the R component is indicated by solid lines, the result of the convolution for the B component is indicated by dotted lines, and the result of the convolution for the G component is indicated by broken lines.

As illustrated in FIG. 13, the respective results of the convolutions for the color components, for which the correction processing is performed, exhibit three-dimensional shapes which generally agree with each other even in a case where an object is a white point light source and is a point image in a different position from the focus position zr. That is, the sizes of the diameters BDr, BDb, and BDg of the throats generally agree with each other. Accordingly, although blurs with sizes of the diameters BDr, BDb, and BDg remain in the composite image Ia resulting from a deconvolution by using formula (14), occurrence of green fringing to the front blur and purple fringing to the back blur can be avoided.

Meanwhile, for an image positioned in the focus position zr, the image processing device 100 uses the deconvolution in formula (14) and thereby causes the axial chromatic aberrations included in the integrated images Is and the deconvolution filters Ip to be canceled by each other with respect to the color components of RGB. Then, because the image becomes a delta function in the focus position and the sizes of blur images of the color components of RGB match with each other, the image processing device 100 can generate the composite image Ia in which coloring on the blur image is reduced.

Note that without displacing an image Img of the G component in the focus position zr in the positive Z-axis direction, the preprocessing unit 15 may use that, together with images Img of the R and B components in the focus position zr, as the image Img in the focus position zr.

Further, without displacing the point spread function PSFc of the G component in the focus position zr, the sharpening processing unit 40 may use that, together with the point spread functions PSFc of the R and B components in the focus position zr, as the point spread function PSFc in the focus position zr. In this case, the image processing device 100 can reduce degradation of resolution in the composite image Ia because the combination of data of the color components of RGB in the re-focus position zr in debayering is not different from the original image Img.

Further, in a case where it is desired to obtain an image in an arbitrary view point or with an arbitrary blur amount, formula (12) is changed to formula (17).

[Math. 12]

$$\text{Ia\_sft}(x, y, zr) = \int_{z1}^{zN} Img(x, y, z) \otimes PSFa(x - kx(z - zr),$$

$$y - ky(z - zr), z - zr)dz \otimes^{-1} \int_{z1}^{zN} PSFc(x, y, z - zr)$$

$$\otimes PSFa(x - kx(z - zr), y - ky(z - zr), z - zr)dz$$

$$= \int_{z1}^{zN} Img(x - kx(z - zr), y - ky(z - zr), z)$$

$$\otimes PSFa(x, y, z - zr)dz \otimes^{-1} \int_{z1}^{zN} PSFc(x - kx(z - zr),$$

$$y - ky(z - zr), z - zr) \otimes PSFa(x, y, z - zr)dz$$

$$= \text{Is\_sft}(x, y, zr) \otimes^{-1} \text{Ip\_sft}(x, y, zr)$$

Terms kx and ky are constants determining displacement amounts of view point in X and Y directions, and as becoming larger values, the view point is displaced more largely. As expressed in formula (17), the view point can be displaced by the blurring function PSFa. The image Img and the point spread function PSFc are caused to cooperate together to move the view point in an XY plane by the constants kx and ky, and the view point can thereby be displaced as well. Further, an Is_sft side may be set as a shift of the blurring function PSFa, an Ip_sft side may be set as a shift of the point spread function PSFc, and a nested state where settings reverse to those are made may be used. Note that a movement amount of the view point is, at largest, a region inside a pupil, which is expressed by the point spread function PSFc. A view point movement amount equal to or larger than that causes noise in a generated image. Accordingly, an image Ia_sft in an arbitrary view point, in an arbitrary focus, and with an arbitrary blur amount can be generated. Data Is_sft and Ip_sft are used for deconvolution processing.

Stereo imaging can be performed by generating an image in an arbitrary view point and with an arbitrary blur amount. In this case, stereo imaging can be performed by two images with different displace amounts of view point, and stereopsis of a three-dimensional photographed object becomes possible. For example, it has been observed by an experiment that an NA and a view point of a microscope can be changed and three-dimensional observation can be performed by stereo imaging. Commercially available 3D display or head mounted display is used for visualization of a stereo image and stereopsis. When a three-dimensional image is formed by formula (17), because images are generated from one camera, errors due to lens distortion, a principal point position, and calibration of a camera posture in a case of using a multi-eye camera do not occur. Thus, a very natural three-dimensional image can be obtained for an image with many pixels such as an 8K image. Further, formula (17) is suitable for measurement because the above errors do not occur. In a case where it is necessary to convert a stereo image to three-dimensional point cloud data, a known stereo matching procedure is used.

Formula (17) can effectively be used for three-dimensional visualization of photographing with a microscope and of a macro photograph in which multi-eye imaging is difficult and for post-processing of focus bracketing photographing by a single-lens camera. In particular, three-dimensional visualization of a microscopic image provides an advantage that settings facilitating observation can afterward be found by sequentially changing a parallax amount and an observation NA (blur amount). Further, resolving power is not changed even when the NA (blur amount) is changed in the microscope, and better resolution can be obtained by a deconvolution for an image with a large depth. In the microscope, focus bracketing photographing is performed by a sample table which is electrically driven. For example, when an objective with a magnification of 60 times is used, focus bracketing photographing is performed for 20 to 30 steps, the step being 100 to 200 nm, in accordance with a sample. Because a driven amount is very small, for example, when the sample table is driven upward or downward with a square wave at 60 Hz, observation can be performed at a video rate. Processing in this case is performed by a method which increases the speed of future processing using FFT. Depending on a case, processing is performed by using a GPU. Focusing of the microscope may be performed by lens driving in an optical system instead of the sample table or may be performed by using an optical element such as a liquid crystal lens.

Further, because in recent years, there has been a microscopy procedure referred to as MFM (multi-focus microscopy) in which images of nine different focus steps are capable of being always displayed by diffraction gratings, an image by that may be used. The MFM is particularly suitable for real-time observation. Further, in a case of a microscope, because the point spread function PSFc changes depending on a microscopy type (confocal type or light sheet type), a microscope is used for which measurement or a simulation is in advance performed. In a case of microscopic observation, an image of a fluorescence observation image exhibiting incoherent image formation is particularly suitable for processing.

FIG. 14A illustrates a stereo image for the left eye, and FIG. 14B illustrates a stereo image for the right eye. Between those, an image for the right eye is displayed to the right eye, an image for the left eye is displayed for the left eye by a 3D display or a AMD, and stereopsis can thereby be performed. FIG. 14 illustrates trend observation images of a PSC1 cell of a kidney of a monkey as a photographed object. Photographing conditions are an NA of 1.25 (water immersion), a focus step of 240 μm, a magnification on a sensor of 80 times, and a pixel pitch of 6.5 μm. Further, settings in compositing an arbitrary blur and an arbitrary view point are an NA of 0.5, a parallax (a displacement amount of view point) corresponding to an NA of 0.85, and 80 images to be composited. A blurring function corresponding to an NA of 0.5 is set as a Gaussian function. In such a manner, it is possible to obtain a depth of field (focus depth) facilitating seeing by adjusting the NA, that is, the blur amount in composition. This is particularly effective because a portion desired to be selectively seen can be observed in a case of a photographed object which is thick, that is, long in a depth direction with respect to a screen. In a case of FIG. 14, both of a blurred part and a part in focus are present in a screen, and stereopsis can clearly be performed in the part in focus. That is, this means that a range in which stereopsis can clearly be performed can arbitrarily be changed by arbitrarily changing the NA in composition.

Figure 15A:
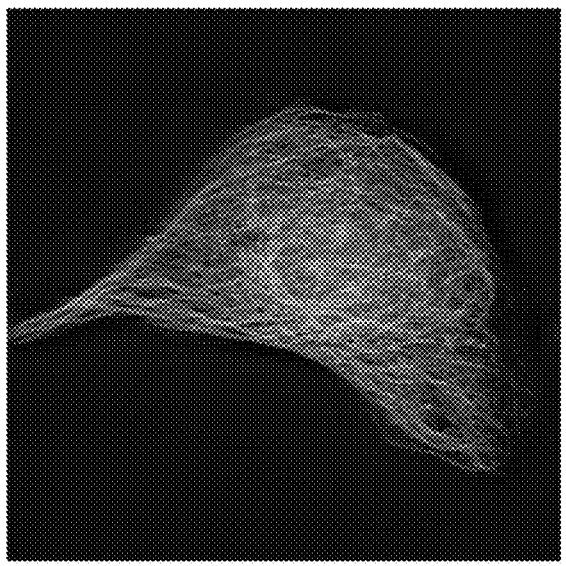
FIG. 15A-FIG. 15B is a diagram illustrating one example of composited stereo images.
Figure 15B:
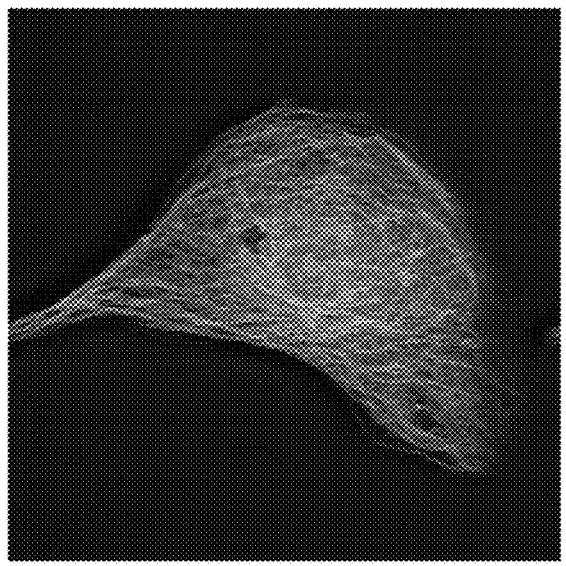

Further, a setting is made such that the parallax becomes zero in a part in focus and a display is in focus. Although the setting is made such that the display is in focus and the parallax amount is zero because this is considered to be desirable for health of the eyes of an observer, it is of course possible to change this condition. Further, a stereoscopic effect and visibility can be adjusted by adjusting the parallax amount. In a case of the photographed object in FIG. 14, an image as a whole clearly in focus can be generated by performing composition by stopping the NA down to 0.1 or the like. This will be illustrated in FIG. 15. In FIG. 15, image composition is performed while settings in compositing an arbitrary blur and an arbitrary view point are an NA of 0.1, a parallax (a displacement amount of view point) corresponding to an NA of ±0.85, and 20 images to be composited. Because depth at which stereopsis is possible increases when a whole image is in focus and an information amount that the observer obtains from the stereopsis increases, depending on the circumstances, information other than an attention point may hinder observation of the attention point. In such a case, it is desirable to adjust the range of the stereopsis by changing the NA in composition.

In the examples in FIG. 14 and FIG. 15, as the point spread function PSFc of the optical system, a delta function is used in the focus position, and point images of disks indicating the sizes of geometric blurs are used in other positions. When those are set as a point spread function including an actual aberration, an image can be sharpened more when a deconvolution is performed.

Further, when left and right parallax images for stereoscopy are generated, for example, in image generation for the left eye, an image is generated in which the view point is displaced to the left. In this case, in the image processing, the image that is located one image in front is displaced to the right by one pixel with the distance of re-focusing being the center. The image that is located two images in front is displaced to the right by two pixels. The image that is located three images in front is displaced to the right by three pixels. Conversely, the image that is located one image in back from the distance of re-focusing is displaced to the left by one pixel. Displacement is performed in such a manner that the image that is located two images in back is displaced to the left by two pixels. When an image is displaced, the blurring function PSFa does not have to be displaced to the left or right.

Meanwhile, in a deconvolution, the point spread function PSFc is displaced similarly to the image. That is, the point spread function PSFc that is one step in front is displaced to the right by one pixel with the distance of re-focusing being the center. The point spread function PSFc that is two steps in front is displaced to the right by two pixels. The point spread function PSFc that is three steps in front is displaced to the right by three pixels. Conversely, the point spread function PSFc that is one step in back from the distance of re-focusing is displaced to the left by one pixel. Displacement is performed in such a manner that the point spread function PSFc that is two steps in back is displaced to the left by two pixels. When the point spread function PSFc is displaced, the blurring function PSFa on a deconvolution side does not have to be displaced. The image for the right eye is processed by displacement in the opposite direction to the above. Further, the position of the view point changes in accordance with the displacement amount.

Because displacement produces peripheral portions of the images which do not overlap with each other, those portions are cut off. The displacement direction of the image is an arbitrary direction, the images may be displaced in the X-axis direction, Y-axis direction, or both of the X-axis and Y-axis direction, and the displacement direction is desirably determined in accordance with an image of which view point is desired to be generated.

Further, a change in the view point is equivalent to generation of an image by deviating a blur image. Similarly to the fact that an arbitrary blurring algorithm cannot generate a larger blur than the NA of the original optical system, the displacement amount of view point stays within the NA.

For example, in a case where an NA of 0.75, a pixel pitch of 440 nm, and a Z step of 1,000 nm are set for the microscope, the blur amount of the objective for 1 step in the Z-axis direction is sin Θ=NA=0.75, the blur amount (diameter) of the objective for 1 step in the Z-axis direction is thus Z step×tan Θ×2=1,000×1.134×2=2,268 nm, and 2,268/440=5.15 pixels. Accordingly, the limit of the displacement amount becomes ±2 pixels in a radial direction. Conversion of displacement of 1 pixel to NA results in a view point of 0.75×440/1134=0.29. Conversion of displacement of 2 pixels to NA results in a view point of 0.58.

As described above, in one embodiment, the blurring processing unit 20 executes the blurring processing on each of the images Img by using the blurring function PSFa. The sharpening processing unit 40 uses a deconvolution filter of the point spread function PSFc and the blurring function PSFa, thereby executes the sharpening processing on the integrated image Is generated by the integration unit 30, and generates the composite image Ia. Accordingly, the image processing device 100 can inhibit occurrence of noise and generate a proper blurred image.

Further, in a case where the image Img is a color image, the image processing device 100 executes the image processing on the image Img with respect to each of the color components of RGB. For example, the preprocessing unit 15 displaces the image Img of the G component in the positive Z-axis direction and executes the correction processing for making the image Img in the focus position zi by using images Img of the R and B components in the focus position zi and the image Img of the G component in the focus position z(i−j). Further, the sharpening processing unit 40 uses the point spread function PSFc(x,y,z(i−j)) of the G component in the focus position z(i−j) as the point spread function PSFc(x,y,zi) of the G component in the focus position zi and executes correction processing to cause the focus positions of the point spread function PSFc of the G component and the point spread functions PSFc of the R and B components to agree with the focus position zr. Accordingly, the image processing device 100 can remove an influence of the axial chromatic aberrations due to the photographing lens of the camera CAM from the composite image Ia.

Further, the image processing device 100 may execute the image processing using formula (14) in the frequency domain. Accordingly, the image processing device 100 can decrease the number of executions of FFT processing and IFFT processing in the image processing and intend an increase in speed of the image processing.

Figure 16:
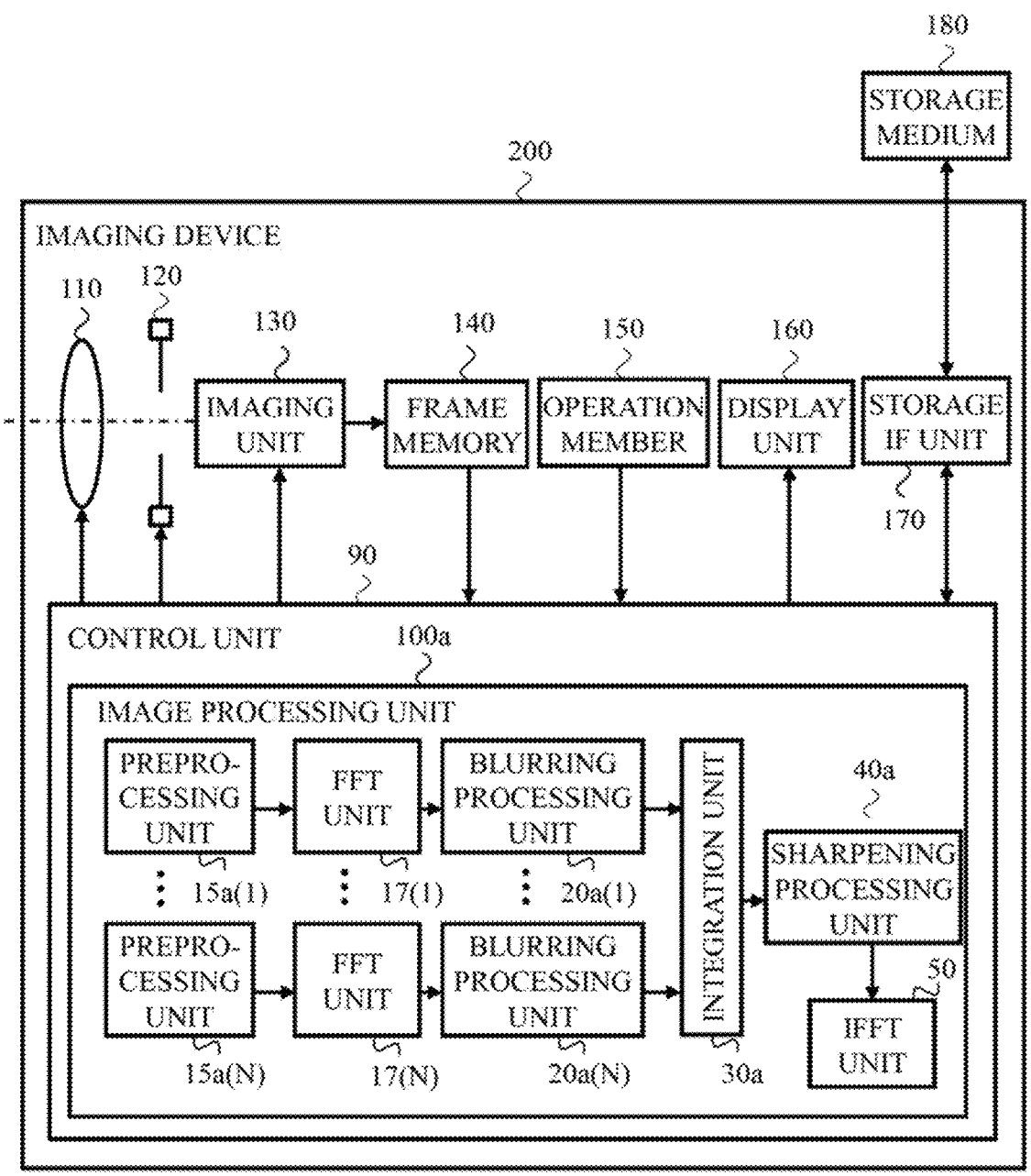
FIG. 16 is a diagram illustrating another embodiment of an image processing device.

FIG. 16 illustrates another embodiment of the image processing device.

An imaging device 200 illustrated in FIG. 16 is a digital single-lens reflex camera, a digital compact camera, or the like, for example. The imaging device 200 has a control unit 90, a photographing lens 110, a diaphragm 120, an imaging unit 130, a frame memory 140, an operation member 150, a display unit 160, and a storage IF unit 170. Each of the photographing lens 110, the diaphragm 120, the imaging unit 130, the frame memory 140, the operation member 150, the display unit 160, and the storage IF unit 170 are connected with the control unit 90.

The photographing lens 110 is an image forming optical system which forms an image with beams from a photographed object, for example, an image forming optical system which is capable of focus adjustment and zoom adjustment. Note that in the focus adjustment, a focus position (a subject distance of the photographed object in focus) is adjusted by controlling the position of a focusing lens of the photographing lens 110. Further, in the zoom adjustment, a focal length of the photographing lens 110 (a view angle or a photographing magnification of the imaging device 200) is adjusted. Further, in FIG. 16, the photographing lens 110 is illustrated with one lens but may be configured with plural lenses.

The diaphragm 120 changes an aperture based on a control instruction by the control unit 90 and adjusts an exposure amount to beams from the photographed object.

The imaging unit 130 is a module that captures an image of the photographed object which is formed by the photographing lens 110 based on a control instruction by the control unit 90 and generates an image. For example, the imaging unit 130 has a color imaging element in which many photoelectric conversion pixels are arrayed and a signal processing circuit which executes analog signal processing, AD (analog-to-digital) conversion processing, or the like for an image signal generated by the imaging element.

Note that in a case where the imaging device 200 is set to an imaging mode, the imaging unit 130 repeatedly acquires for example, an image of the photographed object with low resolution (hereinafter, also referred to as "through image"). Furthermore, the imaging unit 130 captures an image of the photographed object and generates an image at a timing when an imaging instruction is input from a user via the operation member 150. The imaging unit 130 outputs the generated image to the frame memory 140.

The frame memory 140 is a volatile memory such as a RAM (random access memory) and temporarily retains data of an image received from the imaging unit 130. The frame memory 140 performs an output to the control unit 90 based on a control instruction from the control unit 90.

The operation member 150 includes a power source switch, a release button, a multi-selector, a play button, a menu button, or the like, for example, and accepts various kinds of instructions such as the imaging instruction and a mode switch instruction from the user. That is, the operation member 150 acts as the input device IM illustrated in FIG. 1. Note that in a case where a touch panel is provided on a surface of the display unit 160, the touch panel may act as the operation member 150.

The display unit 160 is a display of liquid crystals or the like, for example. The display unit 160 performs real-time display (live view display) of the through image or playback display of the image Img, the composite image Ia resulting from the image processing, or the like based on the control instructions by the control unit 90.

The storage IF unit 170 is connected with a storage medium 180 mounted on the imaging device 200 and writes an image on the storage medium 180 based on a control instruction by the control unit 90. Further, the storage IF unit 170 is connected with the storage medium 180 and reads out an image from the storage medium 180 based on a control instruction by the control unit 90.

The storage medium 180 is a portable and non-volatile storage medium, for example, a hard disk, a memory card in which a semiconductor memory is built, or the like.

The control unit 90 is a processor or the like included in the imaging device 200, for example. The control unit 90 executes a program stored in a storage unit such as a memory included in the imaging device 200 and thereby controls an action of the imaging device 200. For example, in a case where the imaging device 200 is in the imaging mode, the control unit 90 monitors the through image from the imaging unit 130 and executes focus adjustment (AF (autofocus) control) of the photographing lens 110. Further, the control unit 90 monitors the through image which is repeatedly taken in from the frame memory 140 and executes exposure adjustment (AE (automatic exposure) control) of the imaging unit 130.

In addition, the control unit 90 executes an image processing program stored in the storage unit included in the imaging device 200 and thereby acts as an image processing unit 100a which generates the composite image Ia by using formula (14) and N images Img similarly to the image processing device 100 illustrated in FIG. 1.

The image processing unit 100a has N preprocessing units 15a (15a(1) to 15a(N)), N FFT units 17 (17(1) to 17(N)), N blurring processing units 20a (20a(1) to 20a(N)), an integration unit 30a, a sharpening processing unit 40a, and an IFFT unit 50.

Each of the preprocessing unit 15a receives one image among N images Img received from the frame memory 140. Similarly to the preprocessing unit 15 illustrated in FIG. 1, each of the preprocessing units 15a refers to imaging information added to the received image Img and executes preprocessing such as position alignment among the N images Img and magnification correction. Note that the preprocessing executed by the preprocessing unit 15a includes digital development processing (image processing) such as debayering and degamma in addition to position alignment and magnification correction. Note that in a case where an image captured by the camera CAM is a color image having the color components of RGB of a Bayer array, debayering is color interpolation processing for decomposing the color image into images of three planes of R plane, G plane, and B plane.

Further, in order to enable the FFT unit 17 to execute FFT processing, the preprocessing unit 15a converts the preprocessed image Img to a square image and outputs the converted image Img to the FFT unit 17.

Note that the preprocessing unit 15a refers to the imaging information added to the image Img but may acquire control values set for the photographing lens 110, the diaphragm 120, and the imaging unit 130 as the imaging information from the control unit 90.

The FFT unit 17 executes FFT processing on the image Img received from the preprocessing unit 15a and converts data of the image Img in the spatial domain into that in the frequency domain. The FFT unit 17 outputs the converted image Img to the blurring processing unit 20a.

Similarly to the blurring processing unit 20 illustrated in FIG. 1, the blurring processing unit 20a executes the blurring processing (convolution) on the image Img received from the FFT unit 17 by using the blurring function PSFa such as formula (12) which results from conversion to the frequency domain. The blurring processing unit 20a outputs the image Img for which the blurring processing is performed to the integration unit 30a. Note that in a case where the image Img is a color image, the blurring processing unit 20a executes the blurring processing on the image Img of each of the color components.

Note that N preprocessing units 15a, N FFT units 17, and N blurring processing units 20a are arranged in the image processing unit 100a, perform the image processing of N images in parallel, and can thereby intend an increase in speed of generation processing of the composite image Ia. However, one preprocessing unit 15a, one FFT unit 17, and one blurring processing unit 20a may be arranged in the image processing unit 100a.

Similarly to the integration unit 30 illustrated in FIG. 1, the integration unit 30a integrates the images Img convolved with the blurring function PSFa and generates the integrated image Is. Note that the integration unit 30a executes integration processing in the frequency domain. Further, in a case where the image Img is a color image, the integration unit 30a generates the integrated image Is for each of the color components.

Similarly to the sharpening processing unit 40 illustrated in FIG. 1, the sharpening processing unit 40a executes, by using formula (14), the sharpening processing (deconvolution) for the integrated image Is generated by the integration unit 30a and generates the composite image Ia. Note that the sharpening processing unit 40a uses $Ipf(\omega x,\omega y,zr)^{-1}$ of formula (14) which is in advance converted from the spatial domain to the frequency domain. Accordingly, the number of executions of FFT processing and IFFT processing in the image processing by the image processing unit 100a can be decreased, and an increase in speed of the image processing can be intended.

Further, the sharpening processing unit 40a, together with the integration unit 30a, executes integration of the integrated image Is and the deconvolution filter Ip in formula (14) in the frequency domain, the number of executions of FFT processing and IFFT processing in the image processing unit 100a can thereby be decreased, and an increase in speed of the image processing can be intended.

Further, in a case where the image Img is a color image, the sharpening processing unit 40a executes the sharpening processing on the integrated image Is of each of the color components.

The IFFT unit 50 executes IFFT processing for $Isf(\omega x,\omega y,zr)/Ipf(\omega x,\omega y,zr)$ in formula (14) which is generated by the sharpening processing unit 40a and performs conversion to data of the composite image Ia in the spatial domain.

Then, the control unit 90 outputs, for example, the composite image Ia resulting from conversion to the spatial domain to the display unit 160 and displays the composite image Ia in the display unit 160. Further, the control unit 90 executes 16-bit integer processing or the like for the composite image Ia resulting from conversion to the spatial domain and generates an image file of the composite image Ia based on an image format such as TIFF (tagged image file format). Then, the control unit 90 outputs the generated image file to the storage medium 180 via the storage IF unit 170 and stores the image file in the storage medium 180.

Figure 17:
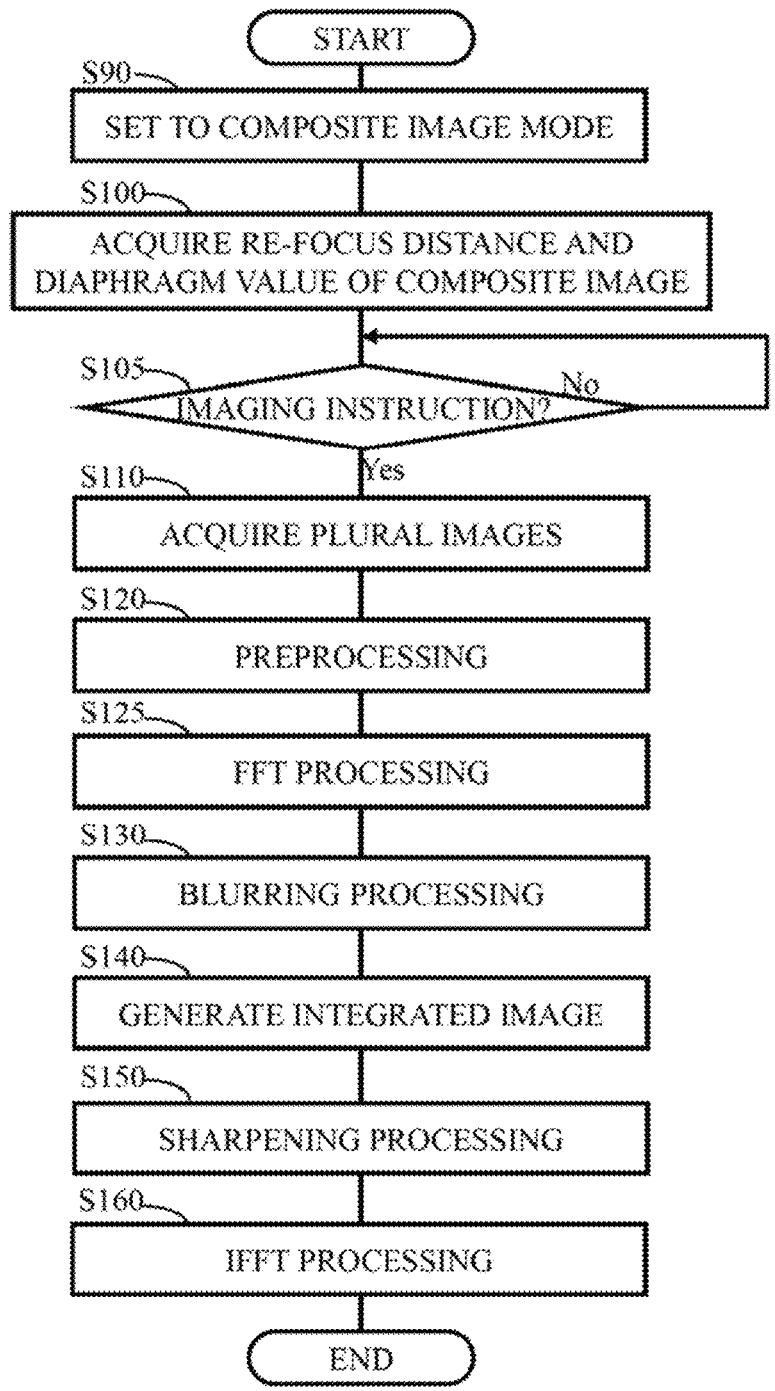
FIG. 17 is a diagram illustrating one example of image processing in an image processing unit illustrated in FIG. 16.

FIG. 17 illustrates one example of the image processing in the image processing unit 100a illustrated in FIG. 16. The processing illustrated in FIG. 17 is realized by execution of the image processing program by the control unit 90 included in the imaging device 200. That is, FIG. 17 illustrates another embodiment of the image processing program and the image processing method. Note that the processing illustrated in FIG. 17 may be realized by hardware installed in the imaging device 200. In this case, the preprocessing units 15a, the FFT units 17, the blurring processing units 20a, the integration unit 30a, the sharpening processing unit 40*a*, and the IFFT unit 50, which are illustrated in FIG. 16, are realized by circuits arranged in the imaging device 200.

Note that steps among processing of steps illustrated in FIG. 17 which represent the same as or similar to steps illustrated in FIG. 4 are given the same step numbers, and detailed descriptions thereof will not be repeated.

In step S90, in a case where the control unit 90 accepts an instruction for making a setting to a composite image mode for generating the composite image Ia from the user via a setting button included in the operation member 150 or the like, the control unit 90 makes a setting to the composite image mode. Then, after processing of step S90 is executed, the processing by the imaging device 200 moves to step S100 and step S105.

In step S105, the control unit 90 assesses whether or not the imaging instruction is accepted from the user via the release button included in the operation member 150. In a case where the imaging instruction is accepted, the processing by the imaging device 200 moves to step S110. Then, the imaging device 200 executes processing of step S110, step S120, and step S125. On the other hand, in a case where the imaging instruction is not accepted, the imaging device 200 stands by until receiving the imaging instruction.

In step S125, the FFT unit 17 executes FFT processing on the image Img preprocessed in step S120 and converts that to data of the image Img in the frequency domain. Then, the processing by the imaging device 200 moves to step S130, step S140, step S150, and step S160.

In step S160, the IFFT unit 50 executes IFFT processing on the composite image Ia generated in step S150 and converts that to data of the composite image Ia in the spatial domain. Then, the image processing by the image processing unit 100*a* is finished.

Then, the control unit 90 outputs, for example, the composite image Ia resulting from conversion to the spatial domain to the display unit 160 and displays the composite image Ia in the display unit 160. Further, the control unit 90 executes 16-bit integer processing or the like for the composite image Ia resulting from conversion to the spatial domain and generates an image file of the composite image Ia corresponding to an image format such as TIFF. Then, the control unit 90 outputs the generated image file to the storage medium 180 via the storage IF unit 170 and stores the image file in the storage medium 180.

As described above, in another embodiment, each of the N blurring processing units 20*a* executes the blurring processing on the received image Img by using the blurring function PSFa. The sharpening processing unit 40*a* uses the deconvolution filter of the point spread function PSFc and the blurring function PSFa, thereby executes the sharpening processing on the integrated image Is generated by the integration unit 30*a*, and generates the composite image Ia. Accordingly, the image processing unit 100*a* can inhibit occurrence of noise and generate a proper blurred image.

Further, in a case where the image Img is a color image, the image processing unit 100*a* executes the image processing on the image Img with respect to each of the color components of RGB. For example, similarly to the preprocessing unit 15 illustrated in FIG. 1, the preprocessing unit 15*a* displaces the image Img of the G component in the positive Z-axis direction and executes correction processing for making the image Img in the focus position zi by using images Img of the R and B components in a focus position zi and an image Img of the G component in a focus position $z(i-j)$. Further, similarly to the sharpening processing unit 40 illustrated in FIG. 1, the sharpening processing unit 40*a* uses the point spread function $PSFc(x,y,z(i-j))$ of the G component in the focus position $z(i-j)$ as the point spread function $PSFc(x,y,zi)$ of the G component in the focus position zi and executes the correction processing to cause the focus positions of the point spread function PSFc of the G component and the point spread functions PSFc of the R and B components to agree with the focus position zr. Accordingly, the image processing unit 100*a* can remove an influence of the axial chromatic aberrations due to the photographing lens 110 from the composite image Ia.

Further, each of the blurring processing unit 20*a*, the integration unit 30*a*, and the sharpening processing unit 40*a* executes processing in the frequency domain. Accordingly, the image processing unit 100*a* can perform two pieces of processing which are FFT processing by the FFT unit 17 and IFFT processing by the IFFT unit 50, and an increase in speed of the processing can be intended.

Further, the imaging device 200 may be a multi-eye camera which has N photographing lenses 110, N diaphragms 120, N imaging units 130, and N frame memories 140. Accordingly, in the N imaging units 130, the imaging device 200 can respectively capture N camera plane parallax images of the same photographed object in mutually common focus positions by one shutter operation. The imaging device 200 executes aperture synthesis disclosed in JP 2013-26844 A, or the like, for example, for the camera plane parallax images and converts those to plural images Img in mutually different focus positions and a common view point. Accordingly, the imaging device 200 can acquire the images Img in mutually different focus positions and a common view point by one shutter operation and can shorten a time taken for acquiring plural images Img in different focus states. Note that the focus positions are determined by using formula (1) such that the image plane parallaxes D become equivalent intervals.

Further, because in the N imaging units 130, the imaging device 200 can respectively capture images of the same photographed object in mutually common focus positions by one shutter operation, the imaging device 200 can easily generate the composite image Ia of a moving photographed object compared to a monocular camera.

Figure 18:
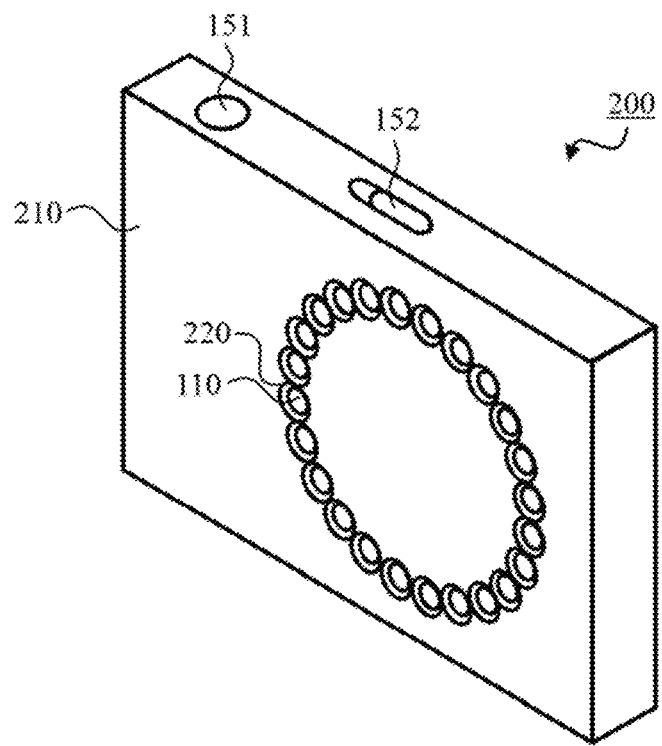
FIG. 18 is a diagram illustrating one example in a case where an imaging device illustrated in FIG. 16 is a multi-eye camera.

FIG. 18 illustrates one example in a case where the imaging device 200 illustrated in FIG. 16 is a multi-eye camera.

The imaging device 200 illustrated in FIG. 18 has plural photographing apertures 220 in a front surface of a camera body 210. Each of the plural photographing apertures 220 has a circular shape and is arrayed in the front surface of the camera body 210 in an annular shape. Note that the plural photographing apertures 220 may be arranged in the front surface of the camera body 210 in a matrix manner.

In each of the plural photographing apertures 220, the photographing lens 110 is placed which has a mutually parallel optical axis. In this case, in the imaging device 200, the diaphragms 120, the imaging units 130, and the frame memories 140 are arranged which correspond to the plural photographing lenses 110. Further, a release button 151 and a power source switch 152 are arranged in an upper surface of the camera body 210 of the imaging device 200. For example, in a case where the imaging device 200 is set to a composite image mode and one shutter operation for the release button 151 is performed, the control unit 90 simultaneously acquires data of plural images which are respectively captured via the plural photographing lenses 110. The control unit 90 uses a procedure disclosed in JP 2013-26844 A or the like and thereby executes processing on generating plural images Img in mutually different focus positions from plural images in mutually different view points. Then, the control unit 90 causes the image processing unit 100a to execute image processing for generating the composite image Ia from the plural generated images Img.

Further, the imaging device 200 may be a monocular camera in which a prism is arranged on a front surface of the photographing lens 110 and the optical axis of the imaging unit 130 is moved (rotated) by the prism.

Figure 19:
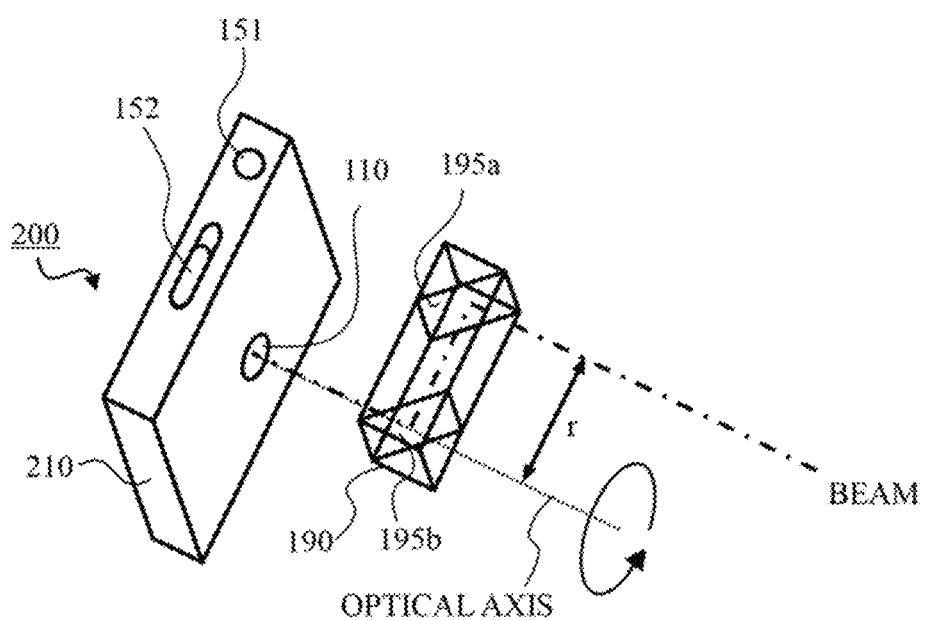
FIG. 19 is a diagram illustrating one example of a prism arranged in an imaging device illustrated in FIG. 18.

FIG. 19 illustrates one example of the prism arranged in the imaging device 200 illustrated in FIG. 16.

As illustrated in FIG. 19, between the photographing lens 110 of the imaging device 200 and the photographed object, a prism 190 is arranged which is rotatable around the optical axis of the imaging unit 130, the optical axis being indicated by a dotted line. Furthermore, between the prism 190 and the camera body 210, a rotation mechanism (not illustrated) for rotating the prism 190 with respect to the camera body 210 is provided.

The prism 190 illustrated in FIG. 19 is a rhomboid prism provided with mutually parallel reflection surfaces 195a and 195b. A beam from the photographed object, the beam being indicated by a one-dot chain line, is incident on one reflection surface 195a of the prism 190 at an incident angle of 45 degrees, is reflected by the reflection surface 195a, and is thereafter incident on the reflection surface 195b of the prism 190 at an incident angle 45 degrees. The beam of the photographed object is reflected by the reflection surface 195b, travels along the optical axis of the imaging unit 130, and is incident on the photographing lens 110.

Accordingly, the optical axis as seem from the photographed object is shifted from the optical axis of the imaging unit 130 by a predetermined distance r and rotates around the optical axis of the imaging unit 130 in response to rotation of the prism 190.

For example, in a case where the imaging device 200 is set to a generation mode of the composite image Ia and one shutter operation for the release button 151 is performed, the control unit 90 controls the rotation mechanism and rotates the prism 190. The control unit 90 control the view point of an image to be captured via the photographing lens 110 in accordance with a rotating angle of the prism 190 and causes the imaging unit 130 to execute an imaging action. That is, the control unit 90 acquires data of N parallax images during one rotation of the prism 190. Then, the control unit 90 uses a procedure disclosed in JP 2013-26844 A or the like and thereby executes processing on generating plural images Img in mutually different focus positions from the N parallax images. Then, the control unit 90 causes the image processing unit 100a to execute the image processing for generating the composite image Ia from the plural generated images Img.

Note that while the prism 190 is rotating, the direction of a photographed object image formed on an imaging element included in the imaging unit 130 does not change.

Further, while the prism 190 is rotating, the position and posture of the rotational central axis of the prism 190 is preferably immovable with respect to the earth. Alternatively, while the prism 190 is rotating, a position error and a posture error of the rotational central axis of the prism 190 is preferably actually measured. For example, a posture sensor (gyro sensor), a displacement sensor (acceleration sensor), a position sensor (GPS sensor), and so forth are installed in the imaging device 200, and the position error and the posture error of the rotational central axis during circle scanning are detected. Furthermore, each of the preprocessing unit 15a preferably corrects an image blur due to the position error and the posture error in the image Img acquired during the circle scanning.

Further, the rotation of the prism 190 illustrated in FIG. 19 may be performed automatically (by being electrically driven) or manually. In a case where the rotation is automatically performed, for example, a motor is connected with a rotation mechanism not illustrated.

Here, in the above-described embodiments, a description is made about a case where the optical axis direction is set as the Z axis in a coordinate system XYZ and a composite image in an XY plane in an arbitrary focus position in the Z-axis direction is generated; however, each of a composite image in a YZ plane in an arbitrary focus position in the X-axis direction and a composite image in an XZ plane in an arbitrary focus position in the Y-axis direction can be generated. In addition, a composite image in an arbitrary coordinate system X'Y'Z' resulting from rotation of the coordinate system XYZ can also be generated. An arbitrary coordinate system X'Y'Z' may be formed by parallel movement of the coordinate system XYZ in addition to rotation of the coordinate system XYZ.

FIG. 20 illustrates examples of rectangular cuboid data of an object in three-dimensional coordinates and blurring functions. FIG. 20A is an example of rectangular cuboid data of an object put in a three-dimensional coordinate system XYZ. A blurring function in each direction of the X-axis, Y-axis, and Z-axis is applied to such an object in a three-dimensional shape in a method described in the above embodiments, and a composite image in an arbitrary position can thereby be generated which is observed from each of three directions of the X-axis, Y-axis, and Z-axis. For example, FIG. 20B illustrates one example of the blurring function in a case of generating a composite image in which an XY plane in an arbitrary position in the Z-axis direction is set as an observed plane and corresponds to FIG. 3 described in the above embodiment. Further, FIG. 20C illustrates one example of the blurring function in a case of generating a composite image in which a YZ plane in an arbitrary position in the X-axis direction is set as the observed plane. In addition, FIG. 20D illustrates one example of the blurring function in a case of generating a composite image in which an XZ plane in an arbitrary position in the Y-axis direction is set as the observed plane.

FIG. 21 illustrates examples of original images and composite images in an XY plane, a YZ plane, and an XZ plane. FIG. 21A illustrates examples of the original images in the XY plane, YZ plane, and XZ plane, and FIG. 21B illustrates examples of the composite images in the XY plane, YZ plane, and XZ plane which are generated by applying an arbitrary blurring algorithm of the present embodiment to the original images in FIG. 21A. In FIG. 21B, (A) represents a composite image in the XY plane passing through an intersection P1, (B) represents a composite image in the YZ plane passing through the intersection P1, and (C) represents a composite image in the XZ plane passing through the intersection P1. In FIG. 21B, for example, when a point P1 in the XY plane is moved to an arbitrary position in the X-axis direction (in the left-right direction of the page), the composite image in the YZ plane changes in accordance with the position in the X-axis direction. Similarly, when the point P1 in the XY plane is moved to an arbitrary position in the Y-axis direction (in the up-down direction of the page), the composite image in the XZ plane changes in accordance with the position in the Y-axis direction. Further, when the point P1 in the YZ plane is moved to an arbitrary position in the Z-axis direction (in the left-right direction of the page), the composite image in the XY plane changes in accordance with the position in the Z-axis direction. Similarly, when the point P1 in the XZ plane is moved to an arbitrary position in the Z-axis direction (in the up-down direction of the page), the composite image in the XY plane changes in accordance with the position in the Z-axis direction.

In such a manner, by using arbitrary blurring functions described in FIG. 20, composite images in the YZ plane, XZ plane, and XY plane in arbitrary positions in the directions of the X-axis, Y-axis, and Z-axis can be generated and displayed.

[Generation of Composite Image in Arbitrary Observation Direction]

Next, a description will be made about a method for generating a composite image in the coordinate system X'Y'Z' in which the coordinate system XYZ illustrated in FIG. 20 is rotated at an arbitrary angle and in parallel moved in each axis direction.

Figure 22:
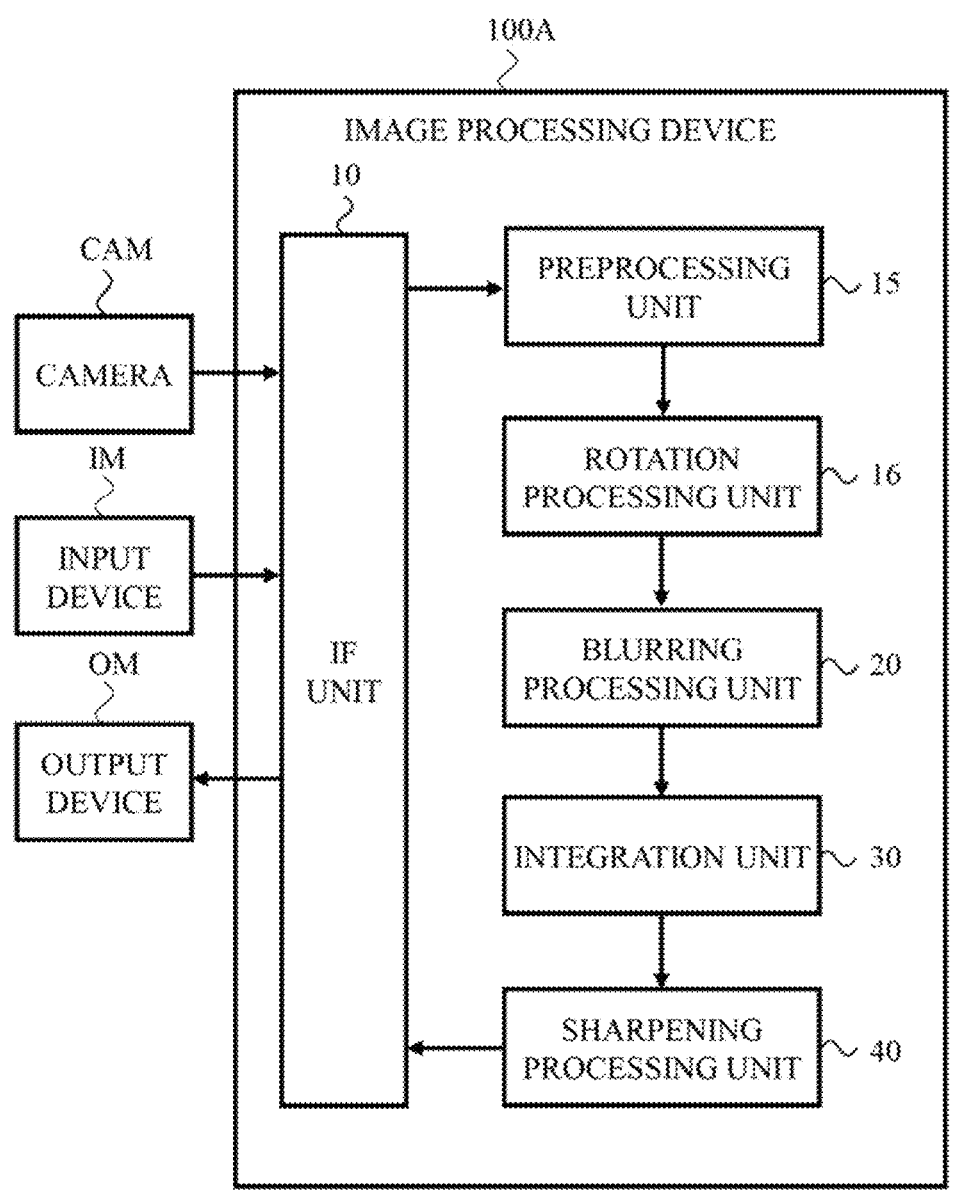
FIG. 22 is a diagram illustrating one example of an image processing device of an application example.

FIG. 22 illustrates one example of an image processing device 100A of an application example. Note that in FIG. 22, blocks with the same reference characters as FIG. 1 perform similar processing to FIG. 1. A difference between FIG. 22 and FIG. 1 is that a rotation processing unit 16 is provided between the preprocessing unit 15 and the blurring processing unit 20.

Here, similarly to the image processing device 100 of FIG. 1, the image processing device 100A is a computer device including an arithmetic processing unit such as a processor and a storage device such as a hard disk device. For example, the arithmetic processing device of the image processing device 100A executes an image processing program stored in the storage device of the image processing device 100A and thereby functions as the preprocessing unit 15, the blurring processing unit 20, the integration unit 30, the sharpening processing unit 40, and the rotation processing unit 16.

In FIG. 22, the IF unit 10 and the preprocessing unit 15 act similarly to the image processing device 100 of FIG. 1, and in the image processing device 100A, plural images preprocessed by the preprocessing unit 15 are output to the rotation processing unit 16.

The rotation processing unit 16 performs processing in which the plural image in the coordinate system XYZ, the plural images being preprocessed by the preprocessing unit 15, are rotated at an arbitrary angle and are in parallel moved in each axis of the X axis, Y axis, and Z axis and are thereby converted to data of the coordinates system X'Y'Z'. Note that the processing by the rotation processing unit 16 will be described later in detail.

The blurring processing unit 20 accepts the plural images rotated and moved in parallel by the rotation processing unit 16 and executes blurring processing on each of the plural images resulting from the rotation processing at a blur degree corresponding to the re-focus position and diaphragm value (NA) which are instructed by a user via the input device IM. Note that the action of the blurring processing unit 20 is performed as described in FIG. 2 and FIG. 3.

The integration unit 30 and the sharpening processing unit 40 act similarly to the image processing device 100 of FIG. 1 and, in the image processing device 100A, those execute sharpening processing on an integrated image based on the blur degree in the blurring processing executed on each of the plural images resulting from the rotation processing and on optical characteristics of the photographing lens and so forth included in the camera CAM and generate the sharpened integrated image as a composite image in an instructed re-focus position and at an instructed diaphragm value.

In such a manner, the image processing device 100A of the present application example can generate a composite image in the coordinate system X'Y'Z', where the coordinate system XYZ is rotated at an arbitrary angle and in parallel moved in each of the axis directions.

Next, the processing performed by the rotation processing unit 16 will be described in detail.

FIG. 23 illustrates one example of the coordinate system X'Y'Z' resulting from rotation and parallel movement of the coordinate system XYZ. FIG. 23A illustrates a rectangular cuboid data of an object as an observation target (object rectangular cuboid data) in the coordinate system XYZ, and FIG. 23B illustrates one example of PSF rectangular cuboid data in which the Z-axis direction is an optical axis. Then, the object rectangular cuboid data and the PSF rectangular cuboid data in the coordinate system XYZ illustrated in FIG. 23A and FIG. 23B are rotated in an arbitrary direction and converted to an object rectangular cuboid data resulting from rotation and parallel movement and a PSF rectangular cuboid data resulting from rotation and parallel movement in the coordinate system X'Y'Z' which is illustrated in FIG. 23C and FIG. 23D. Accordingly, it becomes possible to generate a composite image of an object in a three-dimensional shape from an arbitrary observation direction. Note that in FIG. 23, the object rectangular cuboid data and the PSF rectangular cuboid data are drawn such that those are separated from the origin of the coordinate system XYZ; however, in actual calculation, rotation is performed while the focus of a three-dimensional PSF rectangular cuboid data is positioned in the origin of the coordinate system XYZ, and rotation is performed while the center of a three-dimensional rectangular cuboid data is positioned in the origin of the coordinate system XYZ.

Here, in a case where parameters for angles to rotate coordinates (x,y,z) in the coordinate system XYZ, which is not yet rotated, in the X axis, Y axis, and Z axis are respectively $\phi$, $\theta$, and $\psi$ and parameters for parallel movement are respectively tx, ty, and tz, when coordinates in the coordinate system X'Y'Z' resulting from rotation and parallel movement are (x',y',z'), coordinates resulting from conversion can be expressed by formula (18) by an affine transformation.

[Math. 13]

$$\begin{pmatrix} x' \\ y' \\ z' \end{pmatrix} = R_z(\psi) \cdot R_y(\theta) \cdot R_x(\varphi) \cdot \begin{pmatrix} x \\ y \\ z \end{pmatrix} + \begin{pmatrix} t_x \\ t_y \\ t_z \end{pmatrix} \quad (18)$$

Here, $$R_x(\varphi) = \begin{pmatrix} 1 & 0 & 0 \\ 0 & \cos\varphi & -\sin\varphi \\ 0 & \sin\varphi & \cos\varphi \end{pmatrix},$$

$$R_y(\theta) = \begin{pmatrix} \cos\theta & 0 & -\sin\theta \\ 0 & 1 & 0 \\ \sin\theta & 0 & \cos\theta \end{pmatrix},$$

$$R_z(\psi) = \begin{pmatrix} \cos\psi & -\sin\psi & 0 \\ \sin\psi & \cos\psi & 0 \\ 0 & 0 & 1 \end{pmatrix}$$

hold.

Note that the above-described formula (18) is an example in a case where rotation is performed in order of around the X-axis, around the Y-axis, and around the Z-axis.

Figure 23A:
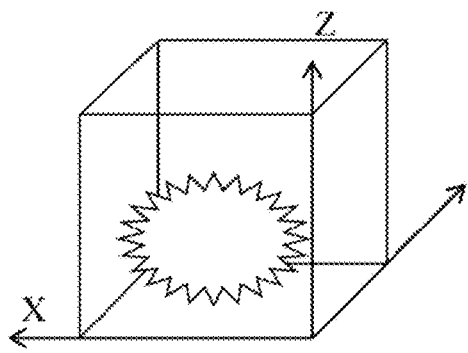
FIG. 23A-FIG. 23D is a diagram illustrating a coordinate system X'Y'Z' resulting from rotation and parallel movement of a coordinate system XYZ.
Figure 23B:
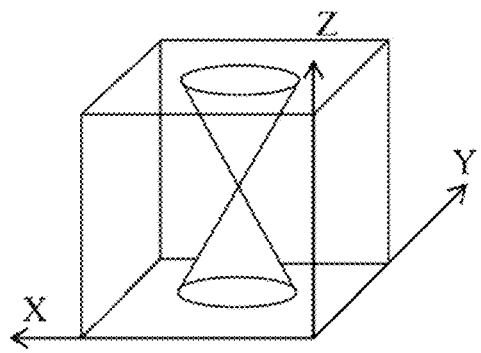
Figure 23C:
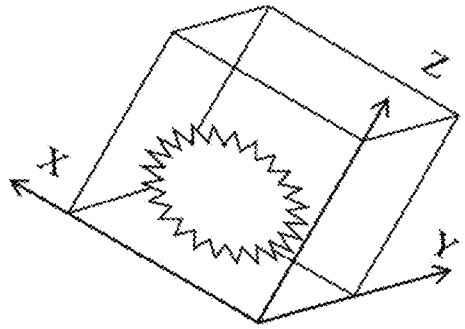
Figure 23D:
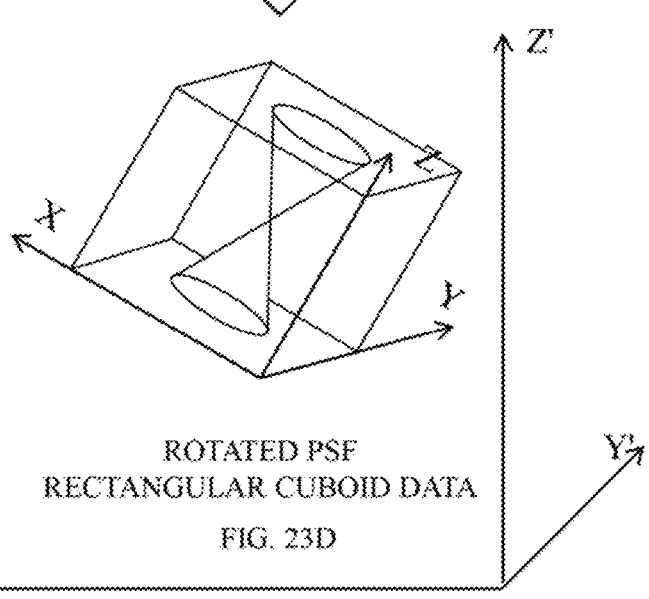

In FIG. 23C and FIG. 23D, the object rectangular cuboid data resulting from rotation and parallel movement and the PSF rectangular data resulting from rotation and parallel movement are generated by performing interpolation processing based on data of intersections obtained by slicing the object rectangular cuboid data and the PSF rectangular cuboid data illustrated in FIG. 23A and FIG. 23B by plural planes in parallel with the XY plane, YZ plane, and XZ plane at equivalent intervals. Note that as an interpolation method, a known method such as trilinear interpolation, tricubic interpolation, or nearest-neighbor interpolation can be used.

Based on the rotated object rectangular cuboid data and the rotated PSF rectangular cuboid data which are obtained in such a manner, composite images in observed planes of X'Y' plane, Y'Z' plane, and X'Z' plane can respectively be generated, the composite images having X' axis, Y' axis, and Z' axis as observation directions. Note that blurring functions used in respectively generating composite images in the observed planes of the X'Y' plane, Y'Z' plane, and X'Z' plane can be obtained by a similar procedure to the above embodiments by using blurring functions in which respective perpendicular axes to the observed planes of the X'Y' plane, Y'Z' plane, and X'Z' plane are assumed to be optical axes. Specifically, the observation direction is set to the Z' axis among the axes of the coordinate system X'Y'Z'. The directions of the left and right eyes of an observer are set as the X' axis. The axis orthogonal to the X' axis and the Z' axis is set as the Y' axis. It is possible to generate a stereo image in a free view point and at an arbitrary depth by using formula (17) in this new coordinate system X'Y'Z'.

[High-Speed Z-Scan by Microscope]

In a case where a Z-scan is performed at a high speed by an optical apparatus such as a microscope or a digital camera, in addition to moving a Z stage at a high speed as described above, for example, a variable focal length liquid lens may be used which is commercially available as a TAG lens(R) or the like. The variable focal length liquid lens causes a dynamic concentration change or refractive index change at the center of the liquid lens by applying an ultrasonic wave at a constant frequency of 60 kHz to a maximum of 1 MHz to the liquid lens and as a result changes the focal length at a high speed. By using the variable focal length liquid lens, it is possible to configure an optical system which is capable of varying the focal length and further the focal position at a high speed of 1 μsec or shorter not via mechanical movement at all but only by controlling an input voltage to an ultrasonic actuator and a resonance frequency. Composition is performed by an arbitrary blurring algorithm by using the microscope having such a high-speed Z-scan optical system, and it thereby becomes possible to perform almost real-time 3D observation.

[3D Display of Observed Image]

Next, a description will be made about an application example in which 3D display of an observed image is performed.

FIG. 24 illustrates a composition example of an image without a parallax by a blurring function of a confocal filter. FIG. 24A illustrates one original image among plural images photographed by a multi-photon microscope while a specimen (a transparent specimen of a brain organoid) is sliced at 10 μm intervals. FIG. 24B illustrates one example of a composite image without a parallax which is composited by applying an arbitrary blurring algorithm described in the above embodiments and at NA=0.1 (hereinafter, described as CF_NA0.1) of a confocal filter (CF (confocal)) enlarging a focus depth. Here, in a case of the multi-photon microscope, the focus depth of the photographed original image is in general shallow; however, because an arbitrary NA can be set by application of an arbitrary blurring algorithm of the present embodiment, a composite image whose focus depth is enlarged can be generated and observed.

Further, as described in formula (17), FIG. 14, and FIG. 15, the image processing device 100 and the image processing device 100A according to the present embodiment can generate a parallax image as seen from an arbitrary view point and can thus generate respective composite images for the right eye and the left eye for 3D display.

Here, there are health constraints on the maximum parallax amount in 3D display. According to the 3D Consortium Safety Guidelines Subcommittee in April 2010, in a case where appreciation is made in the standard viewing distance (the distance three times the height of a screen of a television), it is demanded to set the binocular parallax within a maximum of 3% of the horizontal length of a displaying display. In other words, the maximum parallax for each of the left and right eyes is within 1.5%. For example, because a display of a high-definition television (16:9) standard has a resolution of 1,920×1,080, the parallax has to be suppressed to a parallax of 1920*1.5%=28.8 pixels, approximately. Here, a sign * means multiplication.

As attributes of depth display in a case of 3D display, (1) "depth-display range", (2) "depth-display depth" and (3) "depth-focus depth" are defined. The attribute (1) represents a range of data in the depth direction and does not change in accordance with a blurring kernel (corresponding to a blurring function). For example, in a parallax range of 28 pixels, in a case where a z step (an interval of an image in the Z-axis direction (dz)) of a focus stack data (plural images in different positions in the Z-axis direction) is 150 nm and a shift of 1 pixel is provided per set of focus stack data, the "depth-display range" whose focus is set to a display plane becomes ±28 images, in other words, (150 nm)*(±28 images)=±4,200 nm. The "depth-display depth" as the attribute (2) represents a range within the range of the attribute (1), in which brightness being actually visible to an eye is present after processing by an arbitrary blurring algorithm. This changes in accordance with a type of the blurring kernel and the NA. Further, this also changes in accordance with brightness parameters (such as y value, contrast, and brightness). The types of the blurring kernel are a usual conventional PSF and a confocal PSF and can arbitrarily be set by a user as well. The blurring kernel by the conventional PSF is a geometrical-optical blurring kernel without diffraction or an aberration. This is a function in which a cross section orthogonal to the optical axis is expressed by a uniform circle, and in this function, the radius of the circle becomes dz*tan(asn(NA)) where the distance from the focus is denoted as dz and the numerical aperture is denoted as NA. Further, the intensity of the PSF is normalized by the area of the circle. Here, the confocal PSF is expressed by the square of the conventional PSF. Thus, the confocal PSF has a tendency where the intensity rapidly lowers when it is off the focus and the "depth-display depth" as the attribute (2) is limited to a narrow range from the focus position. Observation specialized in a part around the focal position can easily be performed by setting the type of the blurring kernel to the confocal. Further, the NA of a confocal blur is made small, and the "depth-display depth" can thereby be increased without degrading the resolution. When the NA of an objective lens is made small, a resolution limit drops, and the resolution is degraded; however, the resolution is not degraded even when the NA of the blurring kernel is made small. The focus depth as the attribute (3) is a focus depth in a usual meaning and represents a range in which two points are capable of being separated. This depends on the NA of the blurring kernel, and the focus depth becomes shallower as the NA becomes larger. In a case of using the blurring kernel of the conventional PSF, when the NA of the blurring kernel is made larger, the focus depth becomes shallower; however, because no pinhole effect as in a confocal microscope occurs, the "depth-display depth" is considerably deep and causes flare, and it becomes difficult to perform observation depending on a sample. In a case where the blurring kernel with a high NA is provided by using the blurring kernel of the confocal PSF, because the focus depth is shallow and the "depth-display depth" also becomes shallow, clear observation with less flare can be performed. In a case where the blurring kernel with a low NA is provided by using the blurring kernel of the confocal PSF, because the focus depth is deep and the "depth-display depth" also becomes deep, large depth observation with less flare can be performed. In addition, when as user-defined blurring kernels, kernels of the conventional PSF to the third power, fourth power, and n-th power are prepared, observation with much less flare can be performed.

(Method for Setting Parameter of Each Attribute in Depth Display in Case of 3D Display)

First, the maximum parallax amount of the attribute (1) is determined at the maximum display magnification on a display. In a case of a fluorescence microscope, it is common to acquire data at a pixel pitch of $\lambda/4NA$ (the NA is of the objective lens) based on microscope resolution $\lambda/2NA$ (the NA is of an objective lens) and the Nyquist condition. In a case of performing observation, it becomes possible to perform observation to the optical resolution limit in display at the same magnification (this means that display is performed while one pixel of a display element is caused to correspond to one pixel of an imaging element but does not mean an enlargement magnification of an observation target object on a display). Consequently, in a case where appreciation is performed with the display in the standard viewing distance, the same magnification becomes a substantially maximum observation magnification. This condition determines the maximum parallax amount of the attribute (1). In a case where the z step of the focus stack data is 150 nm and a shift of 1 pixel is provided per set of focus stack data, the "depth-display range" becomes (150 nm)*(±28 images)=±4,200 nm.

Next, the type of the blurring kernel and the NA of the blurring kernel are appropriately selected, and the attribute (2) and the attribute (3) are determined such that those become optimal for observation. In this case, when a range in which the intensity of the blurring kernel becomes a predetermined value (for example, 1% of the intensity of the focus) or less than the focus is defined as the range of the attribute (2), the type of the blurring kernel and the "depth-display range" are determined, and the NA of the blurring kernel which provides an optimal blur image intensity falling within the "depth-display range".

Further, when the display magnification is lowered, because calculation in which a parallax of 28 pixels is set based on 1.5% of the width of a screen at the same magnification, 1,920*1.5% becomes calculation with a parallax of 1,920*1.5%*50%=14 pixels at a display magnification of 50%, as the parallax amount capable of being displayed without a health problem, a parallax of 56 pixels in calculation at the same magnification can be provided. In a case where the z step of the focus stack data is 150 nm and a shift of 1 pixel is provided per set of focus stack data, the "depth-display range" whose focus is set to the display plane becomes (150 nm)*(±56 images)=±8,400 nm. In such a manner, the "depth-display range" may automatically be changed in accordance with the display magnification.

Further, user-defined blurring kernels are possible as the types of the blurring kernel, and the conventional PSF to the third power or fourth power is defined, for example. Those realize narrower display depths.

<Conditions for Setting 3D Stereo Display Magnifications for X, Y, and Z to 1:1:1>

Even under a condition in which image composition is performed while the parallax is set to 3% or lower for health reasons, because the depth width in the front-back direction exceeds the width of the display, setting the 3D stereo display magnifications for X, Y, and Z to 1:1:1 can sufficiently easily be realized. In an experiment, it has been observed that in a case of performing shape recognition of a nerve cell or the like, when the 3D stereo display magnifications of X, Y, and Z is set to 1:1:1, the three-dimensional shape can properly recognized as if the shape were actually handled.

Given that an interpupillary interval of eyes of a human is denoted as IPD, the distance from the eyes to a display (visual distance) is denoted as L, the relationship among those and an angle-of-convergence a to a display center (an angle formed by an attention point on the display and both of the eyes) is expressed by formula (19). Note that an average IPD is 65 nm, and L for a 26-inch display is approximately 1,000 mm.

$$IPD/2 = L*\tan(\alpha/2) \qquad (19)$$

To set the 3D stereo display magnifications of X, Y, and Z to 1:1:1, a defocus pitch dfcs for one pixel as a parallax at a pixel size Px of the display in a parallax direction is an amount given as Z-relative magnification Mz=1 in formula (20), a lateral displacement of an image is provided at a ratio of the defocus pitch dfcs for one pixel as a parallax, and image composition may be performed by an arbitrary blurring algorithm (in this case, image data of the defocus pitch less than one pixel as a parallax are thinned out and are not used for composition). The defocus pitch dfcs for one pixel as a parallax is expressed by formula (20).

$$dfcs = Px/\tan(\alpha/2)/Mz \qquad (20)$$

Figure 31:
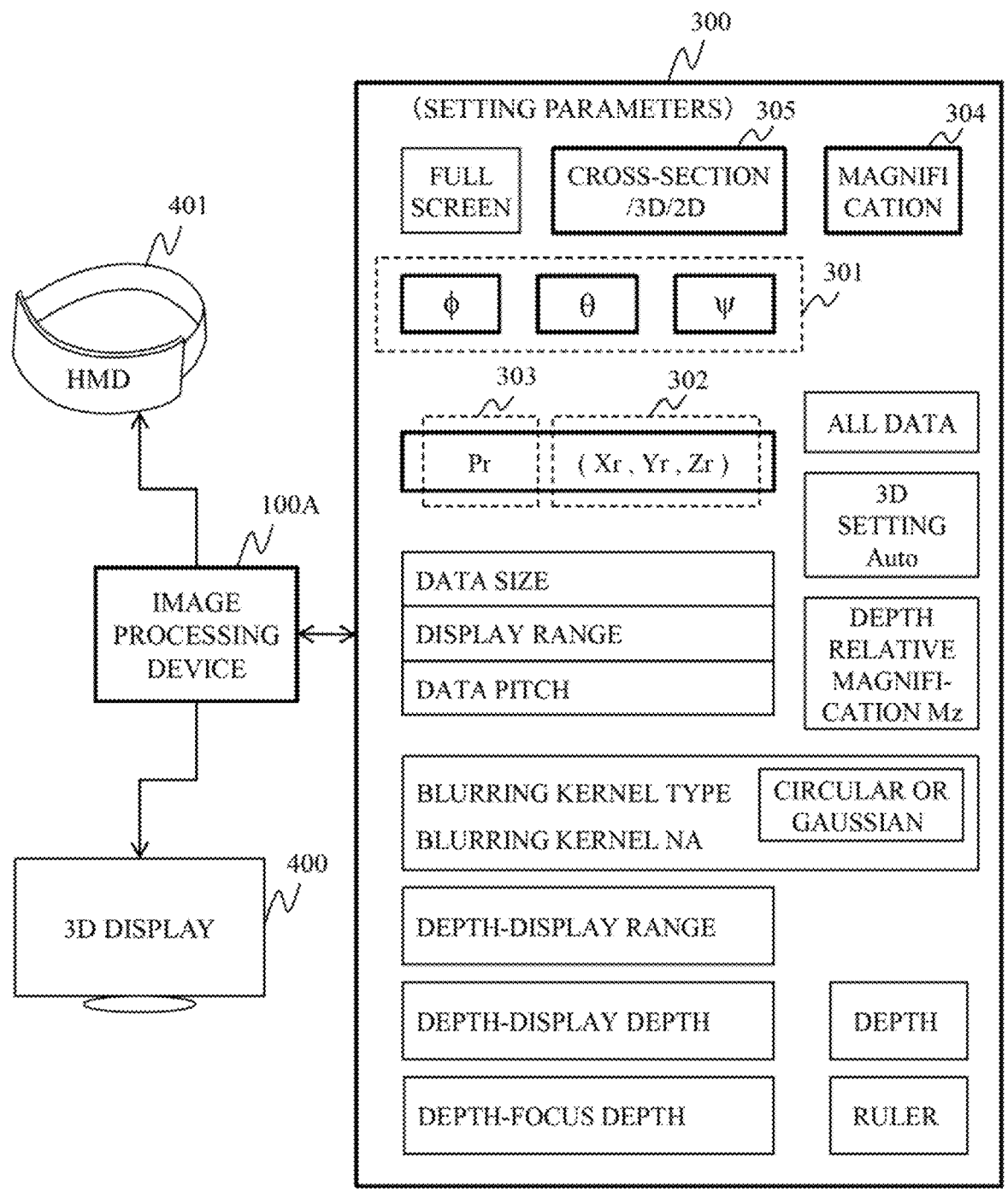
FIG. 31 is a diagram illustrating a use example of the image processing device according to the present embodiment.

For example, as illustrated in FIG. 31 described later, it is desirable that the Z-relative magnification Mz be displayed on a setting parameter screen and be capable of being input. In such a case, information of the interpupillary interval, the size of a display, the visual distance, and the pixel pitch is made capable of being input (not illustrated). Here, in the present embodiment, because the Z-axis direction corresponds to the depth direction, the Z-relative magnification Mz will be referred to as depth relative magnification Mz in the following description.

(Stereoscopic Display of Coordinate System XYZ with Scales)

For dimension measurement of an object or a sample, it is desirable to perform stereoscopic display of the coordinate system XYZ with scales. In order to realize this, the same sets of three-dimensional data of the coordinate system XYZ with scales (so-called Z stack data or focus stack data in which XY two-dimensional images are stacked with Z being a parameter and images include only coordinates but no information of an observation target) are prepared for the right eye and the left eye, respective XY images at each Z value of the focus stack data for the right eye and the left eye are displaced in mutually different directions in the X direction by pixels proportional to Z. When those are integrated in the Z-axis direction, image data for the right eye and the left eye are obtained which are capable of stereoscopic display. Because the depth relative magnification Mz is set to the same value as object display, a z step amount for one pixel as a parallax is set the same as dfcs of the object display. When those sets of image data are respectively added to image data of an object for the right eye and the left eye which are composited by an arbitrary blurring algorithm, an image can be obtained in which stereoscopic display of the coordinate system XYZ with scales and the object together can be performed. It is desirable that the origin of three-dimensional data of the coordinate system XYZ with scales and intervals of the scales can be changed by an input by a cursor or a keyboard. In the coordinate system XYZ with scales, a direction of the object already rotated may always be displayed, and the direction of the object not yet rotated may be displayed.

(Rotation of Object by Cursor)

An object may be rotated by a drag of the cursor and may be moved in parallel by drag with the shift key being pushed.

[Generation Examples of Parallax Image]

Figure 25A:
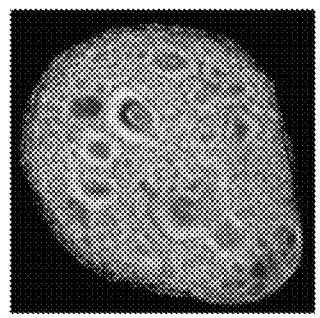
FIG. 25A-FIG. 25C is a diagram illustrating a generation example of a parallax image in which a blurring function is applied to point image intensity distribution, without an aberration or diffraction, of a confocal microscope and directions of both of left and right eyes of an observer are set as an X direction.
Figure 25B:
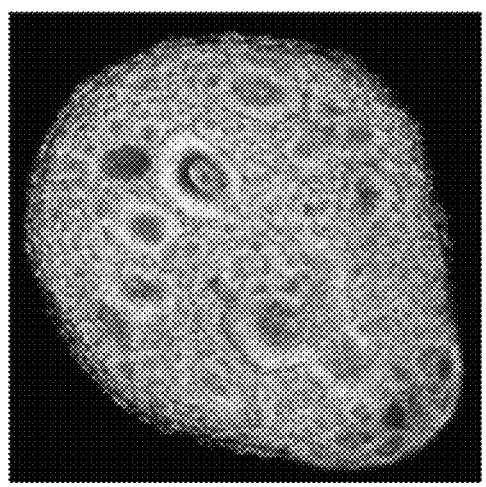
Figure 25C:
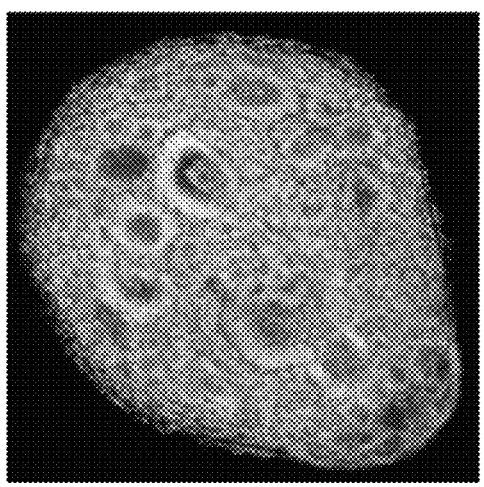

FIG. 25 illustrates a generation example of a parallax image in which a blurring function is applied to a point image intensity distribution, without an aberration or diffraction, of a confocal microscope and directions of both of the left and right eyes of an observer are set as the X direction (the horizontal direction on the page). FIG. 25A illustrates a composite image without a parallax at an NA of 0.1 which is illustrated in FIG. 24B. Here, in order to perform stereoscopy of a 3D image, left and right parallax images have to be generated. For example, an image for the left eye can be generated by compositing an image in which the view point is displaced to the left. In this case, as described in the above embodiments, calculation by formula (17) is performed. When a composite image by formula (17) is generated, processing is in order performed in which with the distance of re-focusing being the center, the image that is located one image in front is displaced to the right by one pixel, for example, the image that is located two images in front is displaced to the right by two pixels, for example, and the image that is located three images in front is displaced to the right by three pixels, for example. Conversely, processing is in order performed in which the image that is located one image in back from the distance of re-focusing is displaced to the left by one pixel, for example, the image that is located two images in back is displaced to the left by two pixels, for example, and the image that is located three images in back is displaced to the left by three pixels, for example. Here, the displacement direction of left or right is determined such that the direction is obtained in which the way of appearance is correct in accordance with the depth direction of data. In the opposite way, a protruding shape becomes a recessed shape. Note that when an image is displaced, the blurring function PSFa does not have to be displaced to the left or right. In such a manner, a CF_NA0.1 left-eye image illustrated in FIG. 25B can be generated from an image without a parallax at CF_NA0.1 of FIG. 25A. Similarly, as an image for the right eye, an image in which the view point is displaced to the right is generated. In this case, in image processing, processing is in order performed in which with the distance of re-focusing being the center, the image that is located one image in front is displaced to the left by one pixel, for example, the image that is located two images in front is displaced to the left by two pixels, for example, and the image that is located three images in front is displaced to the left by three pixels, for example. Conversely, processing is in order performed in which the image that is located one image in back from the distance of re-focusing is displaced to the right by one pixel, for example, and the image that is located two images in back is displaced to the right by two pixels, for example. By such an operation, a lateral displacement (shear) proportional to the Z axis is provided to three-dimensional data, with the distance of re-focusing being the center, along the X axis as the directions of both of the left and right eyes of an observer in the XY plane orthogonal to the Z axis as an observation direction. Note that similarly to the image for the right eye, when an image is displaced, the blurring function PSFa does not have to be displaced to the left or right. In such a manner, by calculation along formula (17), a CF_NA0.1 right-eye image illustrated in FIG. 25C can be generated from the image without a parallax at CF_NA0.1 of FIG. 25A.

Figure 26A:
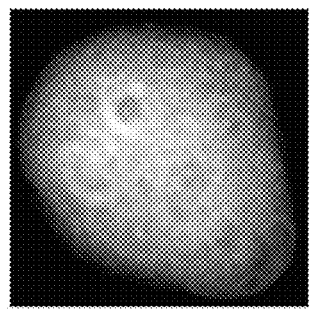
FIG. 26A-FIG. 26C is a diagram illustrating one example of a composite image to which point image intensity distribution, without an aberration or diffraction, of an epi-illumination microscope is applied as a blurring function.
Figure 26B:
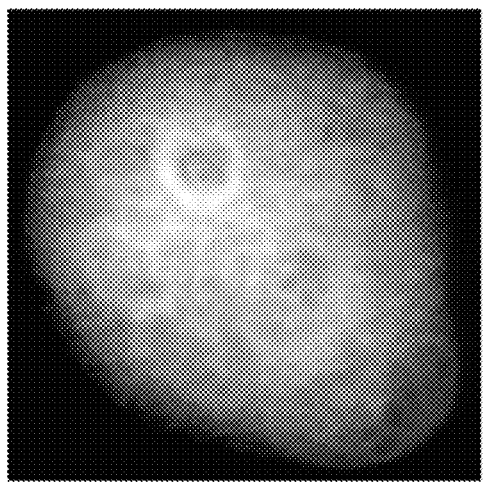
Figure 26C:
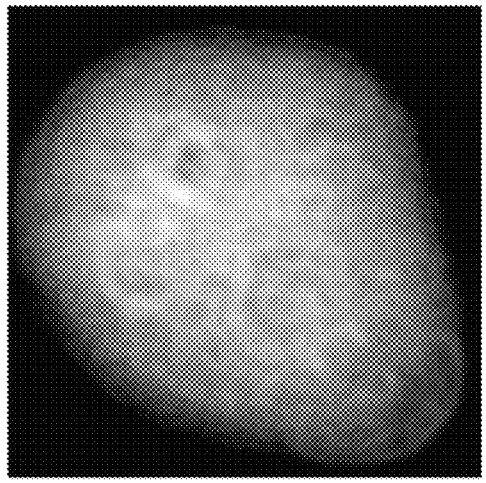

FIG. 26 illustrates one example of a composite image to which a point image intensity distribution, without an aberration or diffraction, of an epi-illumination microscope is applied as a blurring function. Note that FIG. 26A illustrates the original image corresponding to FIG. 24A. FIG. 26B illustrates one example of a composite image without a parallax which is composited at NA=0.1 (hereinafter, described as Conv_NA0.1) by reproducing a blurring function (Conv (conventional)) of an epi-illumination wide-field microscope by applying an arbitrary blurring algorithm described in the above embodiments. FIG. 26B illustrates one example of a left-eye image (Conv_NA0.1) which is generated by the same method as FIG. 25B and in which the directions of both of the left and right eyes of an observer are set as the X direction (the horizontal direction on the page). Similarly, FIG. 26C illustrates one example of a right-eye image (Conv_NA0.1) which is generated by the same method as FIG. 25C.

FIG. 27 illustrates a generation example of a parallax image in an XZ plane. Note that the image in the XZ plane illustrated in FIG. 27 is the image in the XZ plane in FIG. 21 which is displayed while being rotated at 90 degrees. FIG. 27A illustrates the original image in the XZ plane which is illustrated in FIG. 21A, and FIG. 27B illustrates one example of a composite image without a parallax which is composited at NA=0.25 (hereinafter, described as CF_NA0.25) of the confocal filter (CF) enlarging the focus depth. Further, FIG. 27C illustrates one example of a left-eye image (Conv_NA0.25) which is generated by the same method as FIG. 25B and in which the directions of both of the left and right eyes of an observer are set as the Z direction (the horizontal direction on the page). Similarly, FIG. 27D illustrates one example of a right-eye image (Conv_NA0.25) which is generated by the same method as FIG. 25C. Note that for the image in the YZ plane in FIG. 21, similarly to FIG. 27, parallax images for the left eye and the right eye can be generated.

In such a manner, because the image processing device according to the present embodiment can perform stereo imaging by compositing a parallax image in an arbitrary re-focus position and with an arbitrary blur amount (for example, CF_NA0.1, Conv_NA0.1, Conv_NA0.25, and so forth), stereopsis of a three-dimensional photographed object by a 3D display, a head mounted display, or the like becomes possible. Here, FIG. 25, FIG. 26, and FIG. 27 illustrate examples of generation of parallax images in an arbitrary re-focus position in each of the axis directions of the coordinate system XYZ and with an arbitrary blur amount; however, as described in FIG. 23, such generation of parallax images may be applied to a method for generating a composite image in a coordinate system X'Y'Z' resulting from rotation of the coordinate system XYZ at an arbitrary angle in each of the axis directions. Accordingly, because a parallax image in an arbitrary re-focus position in each axis direction of the coordinate system X'Y'Z' and with an arbitrary blur amount, it becomes possible to perform stereopsis of a specimen in a three-dimensional shape from an arbitrary direction and with an arbitrary blur amount.

[Examples of Operation Interface]

Figure 28A:
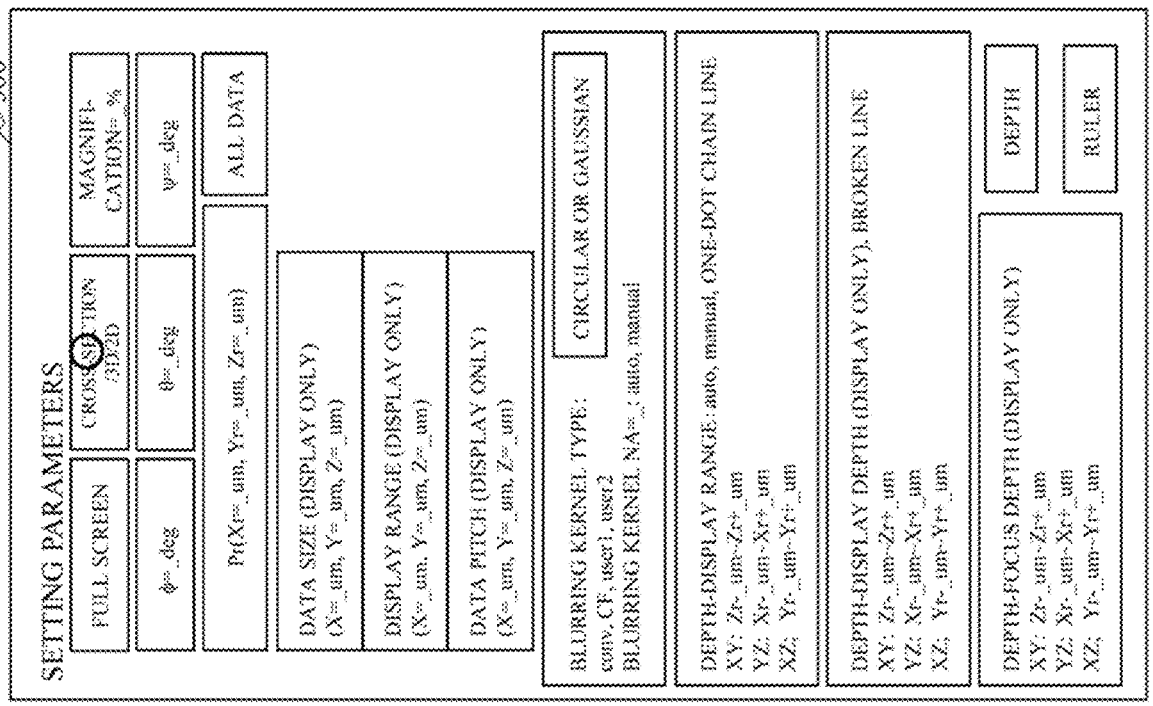
FIG. 28A-FIG. 28B is a diagram illustrating one example of an operation interface and a display image example of an image processing device according to the present embodiment.
Figure 28B:
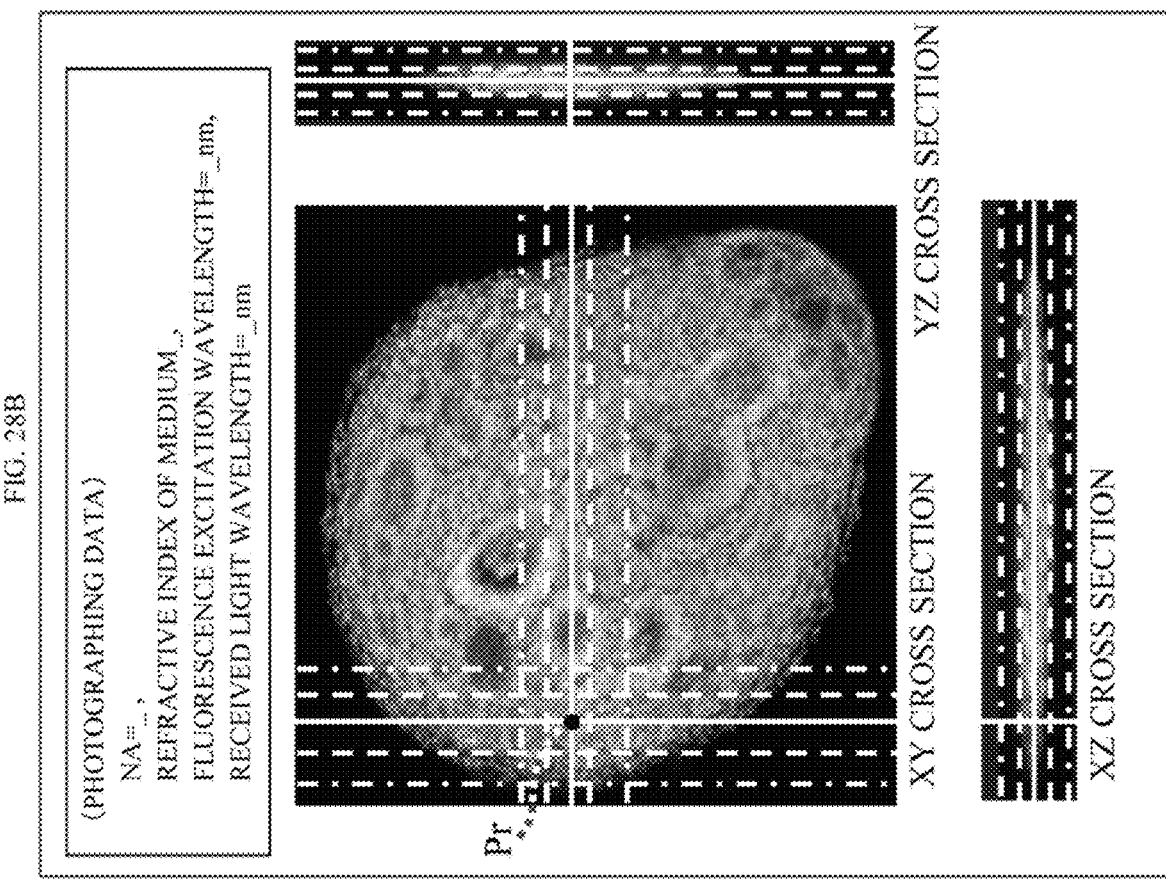

FIG. 28 illustrates one example of an operation interface and a display image example of the image processing device 100A according to the present embodiment. FIG. 28A illustrates one example of an operation interface 300 realized by the input device IM and the output device OM of the image processing device 100A described in FIG. 22, and a user sets setting parameters displayed on a display. Here, the output device OM in FIG. 22 corresponds to a 2D/3D display, a head mounted display, or the like, and the input device IM corresponds to a mouse, a keyboard, a touch panel, or the like. FIG. 28B illustrates one example of a display image based on the setting parameters in FIG. 28A. Here, a screen of the setting parameters illustrated in FIG. 28A and a screen of image display illustrated in FIG. 28B may be displayed side by side on one display, or the screen of the setting parameters and the screen of image display may be displayed on separate displays. Further, on a screen of a composite image illustrated in FIG. 28B, information of photographing data of an original image (the NA, the refractive index of a medium, a fluorescence excitation wavelength, a received light wavelength, and so forth) is displayed together with the composite image.

In FIG. 28A, by an image type selecting button "cross-section/3D/2D" of the operation interface 300, display of a cross-sectional image from raw focus stack data or a 3D image or 2D image resulting from processing by an arbitrary blurring algorithm can be selected. In the example of FIG. 28A, "cross section" surrounded by a circle is selected, and a cross-sectional image is displayed in FIG. 28B. In a setting region of "Pr(Xr,Yr,Zr)", the respective positions of cross sections in XY, YZ, and XZ of an image displayed in FIG. 28B are set. The coordinates of a point Pr are input by a cursor operation by a mouse or a keyboard. When the coordinates of the point Pr are determined, straight lines which pass through the point Pr and are parallel with the X, Y, and Z axes (solid line portions in the image in FIG. 28B) are displayed on the display, cross sections in XY, YZ, and XZ are simultaneously displayed, and which cross sections of an object are observed is clearly displayed. When a "full screen" button is pushed, an arbitrary cross section among three cross sections in XY, YZ, and XZ which is in advance selected can be displayed on the full screen. When an "all data" button is pushed, the whole set of data is displayed. The size of all data is displayed in "data size", and the magnification at this time is automatically displayed in "magnification=_%". Further, when the magnification is changed, the size of display is changed. When the magnification is set larger, a display range becomes narrower. In this case, the position of the display center does not change in each of the cross sections. In "data pitch", intervals in the data are displayed. Further, in "display range", the display range of the data is displayed, and for example, on the image in FIG. 28B, each of the cross sections can in parallel be moved upward, downward, leftward, or rightward by a drag of the mouse with the control key. Each of the cross sections in XY, YZ, and XZ is caused to move in parallel in a linked manner even after enlargement. A display region can thereby arbitrarily be changed. In cross-sectional display, rotation of an object is also possible. To rotate an object, the whole set of data is displayed by pushing the "all data" button, and the object is rotated with the center of all data being the center of rotation by a drag of the cursor with the Alt key. By rotation, angles $\phi$, $\theta$, and $\psi$ are determined (displayed in "$\phi$=_deg", "$\theta$=_deg", and "$\psi$=_deg" (or may be input by the keyboard)). As for the data resulting from the rotation, data of grid coordinates in each of the cross sections in XY, YZ, and XZ are calculated by the above-described affine transformation and interpolation means, and images are displayed on the screen.

Parameters for performing image composition by an arbitrary blurring algorithm on a cross-section display screen are set. The attributes of the depth display which are the attribute (1) "depth-display range", the attribute (2) "depth-display depth" and the attribute (3) "depth-focus depth" are displayed on the screen. As for the attribute (1) "depth-display range", arbitrary values can manually be input, or auto can be selected by which values are automatically calculated from the maximum binocular parallax determined based on health safety criteria and the depth relative magnification Mz. The default value of the depth relative magnification Mz is one. The depth relative magnification Mz can be set to an arbitrary value. Next, the blurring kernel is set. The blurring kernel is selected from confocal (displayed as CF), usual epi-illumination wide-field (displayed as conv), user-defined, and so forth (a user-defined blurring kernel is set as PSF^n (PSF to the n-th power) and is capable of making the depth shallower than the CF). For each of those, choices in which the cross section orthogonal to the optical axis exhibits a uniform circular distribution and a Gaussian distribution can be selected. In addition, the NA of the blurring kernel is set by any of auto (automatic), manual (manually input by the keyboard), and one-dot chain line (designated by the cursor on the image). When auto is selected, the NA is automatically set from information such as the depth relative magnification Mz and the "depth-display range" such that the intensity of the blurring kernel is changed in the "depth-display range" as the attribute (1) from the maximum to the minimum, for example, 100-fold. In this case, the "depth-display depth" becomes equivalent to the "depth-display range" (in a case where the display depth is set to not higher than 1% of a peak intensity). The "depth-display range" is displayed by one-dot chain lines on the images, and the "depth-display depth" is displayed by broken lines on the images in FIG. 28B. The "depth-focus depth" is calculated by $\lambda/NA^2$, for example. The values of the "depth-display depth" and the "depth-focus depth" are displayed in a GUI of the setting parameter screen of the operation interface 300. The blurring kernel determines the depth, the blur amount, and a blur image quality of a composite image. Note that the display of the broken lines and the one-dot chain lines of the "depth-display range" and the "depth-display depth" can be turned on and off by a "depth" button. Further, a "ruler" button can cause a 3D ruler for measurement to be displayed in 3D display and cause a 2D ruler for measurement to be displayed in 2D display.

Figure 30A:
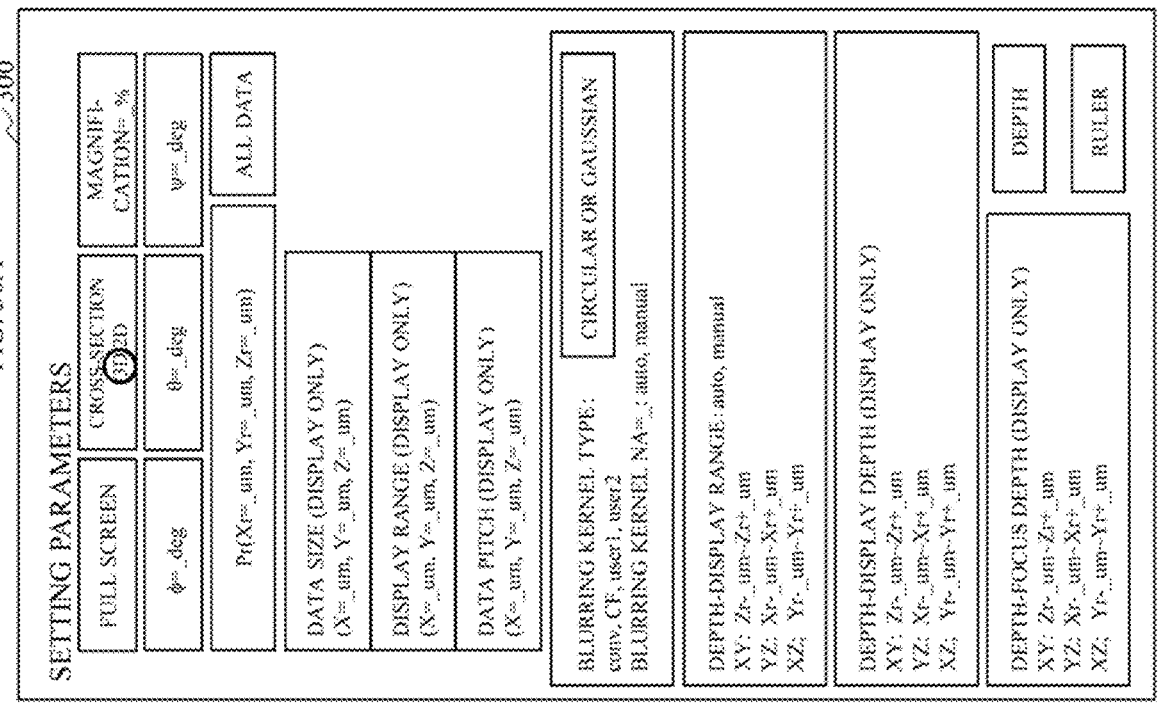
FIG. 30A-FIG. 30B is a diagram illustrating one example of the operation interface and the display image example of the image processing device according to the present embodiment.
Figure 30B:
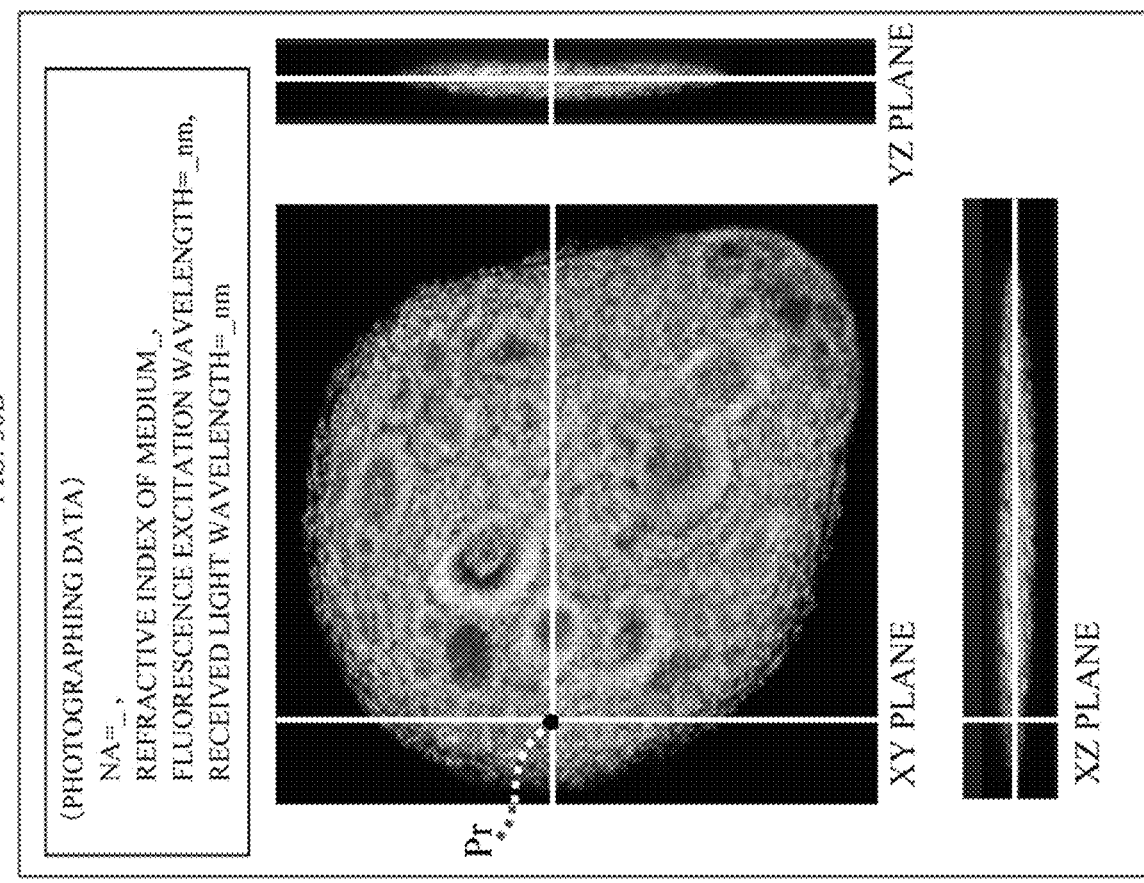

After setting the above parameters, when "3D" or "2D" of the image type selecting button "cross-section/3D/2D" is selected, images processed by an arbitrary blurring algorithm are displayed. For example, FIG. 29 illustrates images which are processed by an arbitrary blurring algorithm when "2D" is selected, and FIG. 30 illustrates images which are processed by an arbitrary blurring algorithm when "3D" is selected.

FIG. 31 illustrates a use example of the image processing device 100A according to the present embodiment. The operation interface 300 illustrated in FIG. 31 corresponds to the operation interface 300 described in FIG. 28 to FIG. 30. In FIG. 31, a description will be made about operation examples of an angle setting region 301, an observation position setting region 302, an observation point name region 303, a magnification setting region 304, and a cross-section/3D/2D selecting region 305. Here, the operation interface 300 is an interface for operating the image processing device 100A and for setting parameters in a case where an observed image is displayed on a 3D display 400 and a head mounted display (HMD) 401 and performs inputs of numerical values and selection of items by, for example, a touch panel, a keyboard, a mouse, or the like.

The angle setting region 301 is a region for respectively setting the rotational angles $\phi$, $\theta$, and $\psi$ of the X axis, Y axis, and Z axis which are described in FIG. 23 and formula (18). The rotation angles may be changed by a keyboard input or a "shift key+drag" operation by a cursor. For example, the rotation angles are set like 30 degrees in the region of rotation angle $\phi$, 15 degrees in the region of rotation angle $\theta$, and 10 degrees in the region of rotation angle $\psi$.

The observation position setting region 302 is a region for respectively setting a cross-sectional observation position in each axis of the X axis, Y axis, and Z-axis and the re-focus position. For example, a data processing range and the re-focus position are set so as to generate a composite image of Xr=+80 μm in a region for the X axis, Yr=50 μm in a region for the Y axis, and Zr=+100 μm in a region for the Z axis. Software is configured such that an input can be performed by a click of the mouse.

In the observation point name region 303, an image composited by parameters set by the angle setting region 301 and the observation position setting region 302 is registered in a memory or the like with a file name associated with the setting parameters. Then, in a subsequent operation, a user can easily perform observation of past processing data by selecting the file name reflecting the setting parameters.

The magnification setting region 304 is a region for setting a magnification amount in a case where an observed image is displayed on the 3D display 400 or the HMD 401. The magnification amount is set like 50%, 25%, or 10%, for example. The display size is automatically calculated with a set magnification, and display is performed. Accordingly, the image processing device 100A can enlarge or shrink an image displayed on the 3D display 400 or the HMD 401.

The cross-section/3D/2D selecting region 305 is a region for selecting which of display of a cross-sectional image, display of a 3D image of a composite image, and display of a 2D image of the composite image is performed on the 3D display 400 or the HMD 401, and for example, the characters of "cross-section", "3D", and "2D" are in order and repeatedly displayed at each time when the cross-section/3D/2D selecting region 305 is clicked with the mouse.

Furthermore, the image processing device 100A displays parallax images of a left-eye image and a right-eye image on the 3D display 400 or the HMD 401 in a state where "3D" is displayed in the cross-section/3D/2D selecting region 305 and displays an image without a parallax on the 3D display 400 or the HMD 401 in a state where "2D" is displayed. Further, in a state where "cross-section" is displayed, the cross-sectional image corresponding to a designated observed plane is displayed on the 3D display 400 or the HMD 401.

In such a manner, parameters such as an observation position and a type of a display image are set.

Meanwhile, as described in FIG. 28 to FIG. 30, parameters necessary for image composition by an arbitrary blurring algorithm are determined. First, the "depth-display range" is automatically or arbitrarily set by the above-described method. When the "depth-display range" is determined, it is displayed on graphics by one-dot chain lines or the like. The "depth-display depth" is determined by setting a blurring kernel type and a blurring kernel NA and is displayed on the graphics by broken lines or the like. Further, the "depth-focus depth" is also calculated. Note that the values of the "depth-display range", the "depth-display depth", and the "depth-focus depth" are displayed in the GUI of the setting parameter screen of the operation interface 300. When those parameters are determined, the image processing device 100A displays a composite image for which the coordinate system XYZ is rotated at an angle defined in each of the axis directions on the 3D display 400 or the HMD 401. Note that as for the "depth-display range" and the "depth-display depth", it is desirable that display be performed in a cross-section display mode or a 2D display mode, an observation region be thereby checked, and observation be performed by switching to a 3D mode is made. In the 3D mode, it is possible to measure dimensions of an object by performing display of axes with the above-described three-dimensional scales (rulers).

A 3D setting Auto button is a button for automatically calculating and setting all of settings including the above-described "depth-display range" and the blurring kernel NA. As a default, a circular confocal blurring kernel is selected, and the depth relative magnification Mz is set to one. The "depth-display depth" as intensity is set in a range of 100% to 1%. Those default values can be changed on a setting screen (not illustrated).

The depth display magnification Mz as a default is set to one, but an arbitrary value can be input.

Accordingly, the image processing device 100A according to the present embodiment can generate a 3D image with arbitrary (1) "depth-display range", (2) "depth-display depth", and (3) "depth-focus depth" by parameters set by the operation interface 300 and can display the 3D image on the 3D display 400 or the HMD 401.

As described in each of the embodiments in the foregoing, the image processing device 100 and the image processing device 100A generates one composite image by an arbitrary blurring algorithm based on plural sets of image data in a focus depth direction and can thus provide effects of removing noise components and improving an SN ratio of an image. Note that for example, it is desirable to set an acquisition pitch of an original image in a Z-axis direction to approximately the same interval, for example.

Further, in the image processing device 100 and the image processing device 100A, a step in the Z-axis direction in acquisition of an original image is made small to the extent that total illuminance (the number of acquired images× illuminance per image) becomes equivalent to illuminance in related art even in a case where the illuminance of excitation light cannot be lowered in view of the SN ratio, the number of acquired images in the Z-axis direction is increased, and illuminance per image can thereby be lowered inversely proportionally to the number of acquired images. Accordingly, it becomes possible for the image processing device 100 and the image processing device 100A to enhance resolution in the Z-axis direction in acquisition of an original image while suppressing damage to a biological sample as an observation target to the same extent as related art. Note that in the present embodiment, a description is made about an example where an original image is acquired in different focal positions in the Z-axis direction; however, an original image may be acquired in an X-axis direction or a Y-axis direction. In this case, understanding similar to the above-described embodiments is possible by switching coordinate axes.

[Procedure for Performing Stereo Image Generation at Arbitrary Depth in Free View Point]

In the following, a description will be made about a procedure for performing stereo image generation at an arbitrary depth in a free view point in a case of composition by using an arbitrary blurring algorithm along formula (17) and in a case of composition by not using an arbitrary blurring algorithm along formula (11).

[A] a Case of Composition by Using an Arbitrary Blurring Algorithm Along Formula (17)

Composition by using an arbitrary blurring algorithm is performed as follows.

(1) Rotation and Interpolation of Three-Dimensional Focus Stack Data

Three-dimensional focus stack data are rotated by the affine transformation or the like. After the rotation, interpolation is performed such that data are aligned at equivalent intervals in a coordinate system in which the observation direction is set to the Z axis and the directions of both of the left and right eyes of an observer are set as the X axis.

(2) Rotation and Interpolation of a Three-Dimensional Point Image Intensity Distribution of an Optical System A three-dimensional point image distribution of an optical system is rotated for the same amount as (1) by the affine transformation or the like. After the rotation, interpolation is performed such that data are aligned at equivalent intervals in a coordinate system in which the observation direction is set to the Z axis and the directions of both of the left and right eyes of the observer are set as the X axis.

(3) A Two-Dimensional Convolution of a Three-Dimensional Blurring Kernel

A two-dimensional convolution is performed for a circular cross section of an arbitrary three-dimensional blurring kernel, the circular cross section being orthogonal to the observation direction, with a cross section of the three-dimensional focus stack data resulting from the rotation, the cross section being orthogonal to the observation direction. This result will be referred to as new focus stack data in which the observation direction is set to the Z axis and the directions of both of the left and right eyes of the observer are set as the X axis. The focus of the three-dimensional blurring kernel is set to the re-focus distance.

(4) Stereo Imaging

A lateral displacement (shear) proportional to the Z axis is provided to three-dimensional data as a result of the above (3), with the distance of re-focusing being the center, along the X axis as the directions of both of the left and right eyes of the observer in an XY plane orthogonal to the Z axis as the observation direction. In other words, with respect to the new focus stack data, processing is in order performed in which with the distance of re-focusing being the center, proportionally to the Z axis, the image that is located one image in front is displaced to the right by one pixel, the image that is located two images in front is displaced to the right by two pixels, and the image that is located three images in front is displaced to the right by three pixels. Conversely, processing is in order performed in which the image that is located one image in back from the distance of re-focusing is displaced to the left by one pixel, the image that is located two images in back is displaced to the left by two pixels, and the image that is located three images in back is displaced to the left by three pixels. Note that the displacement direction of left or right is determined such that the direction is obtained in which the way of appearance is correct in accordance with the depth direction of data. In the opposite way, a protruding shape becomes a recessed shape. Further, the order of (4) and (3) may be opposite.

(5) Integration in the Observation Direction

The result of the above (4) is integrated in the observation direction. The result becomes two-dimensional data.

(6) A Two-Dimensional Convolution and Integration of the Three-Dimensional Blurring Kernel and a Three-Dimensional Point Image Intensity Distribution Resulting from the Rotation A two-dimensional convolution is performed for a circular cross section of an arbitrary three-dimensional blurring kernel, the circular cross section being orthogonal to the observation direction, with a cross section of the three-dimensional point image intensity distribution resulting from the rotation, the cross section being orthogonal to the observation direction. This result is integrated in the Z-axis direction as the observation direction. The result becomes two-dimensional data.

(7) Deconvolution

The two-dimensional data as a result of the above (5) is deconvolved by the two-dimensional data as a result of (6).

[B] A Case of Composition by not Using an Arbitrary Blurring Algorithm Along Formula (11)

Composition by not using an arbitrary blurring algorithm is performed as follows.

(1) A Three-Dimensional Deconvolution of 3D Focus Stack Data by an Optical PSF

Three-dimensional deconvolution processing by the optical PSF converts the 3D focus stack data to a three-dimensional object intensity distribution.

(2) Rotation and Interpolation of the Three-Dimensional Object Intensity Distribution The three-dimensional object intensity distribution is rotated by the affine transformation or the like. After the rotation, interpolation is performed such that data are aligned at equivalent intervals in a coordinate system in which the observation direction is set to the Z axis and the directions of both of the left and right eyes of the observer are set as the X axis.

(3) A Two-Dimensional Convolution of a Three-Dimensional Blurring Kernel

A two-dimensional convolution is performed for a circular cross section of an arbitrary three-dimensional blurring kernel, the circular cross section being orthogonal to the observation direction, with a cross section of a three-dimensional object intensity distribution resulting from the rotation, the cross section being orthogonal to the observation direction. This result will be referred to as new focus stack data in which the observation direction is set to the Z axis and the directions of both of the left and right eyes of the observer are set as the X axis. The focus of the three-dimensional blurring kernel is set to the re-focus distance.

(4) Stereo Imaging

A lateral displacement (shear) proportional to the Z axis is provided to three-dimensional data as a result of the above (3), with the distance of re-focusing being the center, along the X axis as the directions of both of the left and right eyes of the observer in a plane orthogonal to the observation direction. In other words, with respect to the new focus stack data, processing is in order performed in which with the distance of re-focusing being the center, proportionally to the Z axis, the image that is located one image in front is displaced to the right by one pixel, the image that is located two images in front is displaced to the right by two pixels, and the image that is located three images in front is displaced to the right by three pixels. Conversely, processing is in order performed in which the image that is located one image in back from the distance of re-focusing is displaced to the left by one pixel, the image that is located two images in back is displaced to the left by two pixels, and the image that is located three images in back is displaced to the left by three pixels. Note that the displacement direction of left or right is determined such that the direction is obtained in which the way of appearance is correct in accordance with the depth direction of data. In the opposite way, a protruding shape becomes a recessed shape.

(5) Integration in the Observation Direction

The result of the above (4) is integrated in the observation direction.

In such a manner, in a case of composition by using an arbitrary blurring algorithm along formula (17) and in a case of composition by not using an arbitrary blurring algorithm along formula (11), generation of stereo image at an arbitrary depth in a free view point can be performed. In the case of composition by using an arbitrary blurring algorithm along formula (17), a two-dimensional deconvolution is performed by division in the frequency domain and can be performed at a high speed by one step of linear computation, and it is possible to highly precisely remove an influence of a PSF. On the other hand, the three-dimensional deconvolution in formula (11) usually becomes a repeated estimation calculation, needs adjustment of parameters, takes time, and has difficulty in highly precisely removing an influence of a PSF.

Verification was performed on the present free view point stereo 3D-image generation technique. In the verification, a PSF of a liquid immersion NA1.49 confocal microscope without diffraction or an aberration was used. A confocal blur was set as a blur, the NA of a confocal blurring kernel was appropriately changed from 1.25 to 0.001, a free view point was at random changed around an X axis and Y axis with a 10-degree increment. It has been observed that an image of a point image which is generated in this condition always becomes a delta function. Based on this, it may be considered that the present free view point stereo 3D-image generation technique is a technique which can generate a high quality free view point stereo 3D image without occurrence of artifacts which are unavoidable in related art (such as a 3D deconvolution technique). Moreover, when actual data of a lens PSF are used, resolution can be enhanced more than an original image.

The present technique can of course generate a high quality free view point stereo 3D image when used for three-dimensional image data such as CT and MRI and can generate a stereo 3D image in a free view point when applied to three-dimensional image data generated by a CG (computer graphics) technique. Thus, it becomes possible to generate a natural free view point stereo 3D image for movie-showing without artifacts, for example, and it goes without saying that the present technique is applicable to wide range of applications.

Further, because the present technique can generate a stereo 3D image in a free view point even when used for focus stack three-dimensional image data obtained by focus bracketing photographing by a movie camera, it becomes possible to generate a natural free view point stereo 3D image for movie-showing without artifacts from a live-action image.

The detailed descriptions in the foregoing will make clear the features and advantages of the embodiments. It is intended that the claims encompass the features and advantages of the above-described embodiments without departing from the spirit and scope of rights. Further, a person having ordinary skill in the art would be able to easily conceive any improvements and changes. Accordingly, it is not intended that the scope of embodiments having inventiveness be not limited to the above-described embodiments, and embodiments may be based on appropriate improvements and equivalents included in the scope disclosed in the embodiments.

REFERENCE SIGNS LIST

10 IF unit
15, 15a(1) to 15a(N) preprocessing unit
16 rotation processing unit
17 FFT unit
20, 20a(1) to 20a(N) blurring processing unit
30, 30a integration unit
40, 40a sharpening processing unit
50 IFFT unit
90 control unit
100, 100A image processing device
100a image processing unit
110 photographing lens
120 diaphragm
130 imaging unit
140 frame memory
150 operation member
151 release button
152 power source switch
160 display unit
170 storage IF unit
180 storage medium
190 prism
195a, 195b reflection surface
200 imaging device
210 camera body
220 photographing aperture
300 operation interface
301 angle setting region
302 observation position setting region
303 observation point name region
304 magnification setting region
305 cross-section/3D/2D selecting region
400 3D display
401 head mounted display (HMD)
CAM camera
IM Input device
OM output device

The invention claimed is:

1. An image processing device comprising:
a first processing unit which executes blurring processing in a common focus position on each of a plurality of images in mutually different focus positions;
an integration unit which generates an integrated image resulting from integration of the plurality of images on which the blurring processing is executed; and
a second processing unit which generates a composite image having a predetermined blur degree by executing sharpening processing on the integrated image generated by the integration unit based on information in which optical information indicating optical characteristics of an optical system in which the plurality of images are acquired and a blur degree of the blurring processing in the common focus position are composited together along a depth direction of the plurality of image.

2. The image processing device according to claim 1, wherein
the second processing unit executes the sharpening processing on the integrated image generated by the integration unit based on a convolution, along the depth direction of the plurality of images, of the optical information indicating the optical characteristics of the optical system in which the plurality of images are acquired and the blur degree of the blurring processing in the common focus position.

3. The image processing device according to claim 1, wherein
the second processing unit executes the sharpening processing on the integrated image generated by the integration unit based on an intensity sum, along the depth direction of the plurality of images, of the optical information indicating the optical characteristics of the optical system in which the plurality of images are acquired and the blur degree of the blurring processing in the common focus position.

4. The image processing device according to claim 1, wherein
as the optical information indicating the optical characteristics of the optical system in which the plurality of images are acquired, an intensity sum of the optical characteristics in planes perpendicular to the depth direction is used.

5. The image processing device according to claim 1, wherein
the second processing unit executes the sharpening processing on the integrated image generated by the integration unit based on a convolution, which is aligned in the depth direction, of the optical information indicating the optical characteristics of the optical system in which the plurality of images are acquired and the blur degree of the blurring processing in the common focus position.

6. The image processing device according to claim 1, wherein
the blur degree of the blurring processing in the common focus position is a blur degree corresponding to an instructed focal length and an instructed diaphragm value of an imaging device.

7. The image processing device according to claim 1, wherein
in a case where each of the plurality of images has plurality of color components which are mutually different, the first processing unit executes the blurring processing on each of the plurality of images with respect to each of the color components,
the integration unit generates the integrated image for each of the color components, and
the second processing unit executes the sharpening processing of the integrated image with respect to each of the color components.

8. The image processing device according to claim 1, wherein
the blurring processing by the first processing unit and the sharpening processing by the second processing unit are executed in a frequency domain.

9. The image processing device according to claim 1, further comprising:
a preprocessing unit, which in a case where each of the plurality of images has a plurality of color components which are mutually different, causes the common focus position of each of the color components to agree with each other by moving the plurality of images of each of the color components in the depth direction, wherein
the second processing unit causes the common focus position in a point spread function of each of the color components to agree with each other in accordance with the movement of the plurality of images of each of the color components.

10. The image processing device according to claim 9, wherein
in a case where the plurality of color components are an R component, a G component, and a B component, the preprocessing unit causes the common focus position of each of the color components to agree with each other by moving the plurality of images of the G component other than an image in the common focus position in the depth direction, and
the second processing unit causes the common focus position in the point spread function of each of the color components to agree with each other in accordance with the movement of the plurality of images of the G component.

11. The image processing device according to claim 1, wherein
the second processing unit generates a composite image in an arbitrary view point by shifting, by predetermined amounts, the plurality of images and the optical information in planes perpendicular to an optical axis of the optical system.

12. The image processing device according to claim 11, wherein
the second processing unit generates a composite image for a left eye and a composite image for a right eye for stereoscopy based on a binocular parallax amount which is set in advance.

13. The image processing device according to claim 12, wherein
the second processing unit:
performs processing to more largely displace an image to right as more approaching to a view point and to more largely displace an image to left as more separated from the view point with a focus position being a center when an image for the left eye is generated; and
performs processing to more largely displace an image to the left as more approaching to the view point and to more largely displace an image to the right as more separated from the view point with the focus position being the center when an image for the right eye is generated.

14. The image processing device according to claim 1, wherein
a rotation processing unit is further provided which generates a plurality of images in which at least one axis of axes of three-dimensional coordinates is rotated at an arbitrary rotation angle with respect to the plurality of images, and
the first processing unit executes the blurring processing in a common focus position on each of the plurality of images rotated by the rotation processing unit.

15. The image processing device according to claim 14, further comprising:
an operation interface for setting at least one of a blur degree of the blurring processing, a binocular parallax amount, and a rotation angle.

16. A non-transitory computer readable medium storing instructions that, when executed, cause a computer to execute processing of:
- executing blurring processing in a common focus position on each of a plurality of images in mutually different focus states;
- generating an integrated image resulting from integration of the plurality of images on which the blurring processing is executed; and
- generating a composite image having a predetermined blur degree by executing sharpening processing on the generated integrated image based on information in which optical information indicating optical characteristics of an optical system in which the plurality of images are acquired and a blur degree of the blurring processing in the common focus position are composited together along a depth direction of the plurality of images.

17. The non-transitory computer readable medium storing instructions according to claim 16, that when executed, further cause the computer to execute processing of:
- performing rotation processing to generate a plurality of images in which at least one axis of axes of three-dimensional coordinates is rotated at an arbitrary rotation angle with respect to the plurality of images and executing the blurring processing in a common focus position on each of the plurality of images rotated by the rotation processing.

18. An image processing method comprising:
- executing blurring processing in a common focus position on each of a plurality of images in mutually different focus states;
- generating an integrated image resulting from integration of the plurality of images on which the blurring processing is executed; and
- generating a composite image having a predetermined blur degree by executing sharpening processing on the generated integrated image based on information in which optical information indicating optical characteristics of an optical system in which the plurality of images are acquired and a blur degree of the blurring processing in the common focus position are composited together along a depth direction of the plurality of image.

19. The image processing method according to claim 18, further comprising:
- performing rotation processing to generate a plurality of images in which at least one axis of axes of three-dimensional coordinates is rotated at an arbitrary rotation angle with respect to the plurality of images and executing the blurring processing in a common focus position on each of the plurality of images rotated by the rotation processing.

20. An imaging device that forms an image, the imaging device comprising:
- at least one photographing lens;
- at least one imaging element; and
- the image processing device according to claim 1, the image processing device generating a composite image having a predetermined blur degree based on a plurality of images acquired by using the photographing lens and the imaging element.

\* \* \* \* \*